United States Patent

Lucamarini et al.

(10) Patent No.: US 10,153,848 B2
(45) Date of Patent: Dec. 11, 2018

(54) OPTICAL DEVICE, A TRANSMITTER FOR A QUANTUM COMMUNICATION SYSTEM AND A QUANTUM COMMUNICATION SYSTEM

(71) Applicant: Kabushiki Kaisha Toshiba, Minato-ku (JP)

(72) Inventors: Marco Lucamarini, Cambridge (GB); Bernd Matthias Frohlich, Cambridge (GB); Zhiliang Yuan, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/425,416

(22) Filed: Feb. 6, 2017

(65) Prior Publication Data
US 2017/0237505 A1 Aug. 17, 2017

(30) Foreign Application Priority Data

Feb. 16, 2016 (GB) .................................. 1602739.3

(51) Int. Cl.
*H04B 10/70* (2013.01)
*H04B 10/516* (2013.01)
(Continued)

(52) U.S. Cl.
CPC ......... *H04B 10/70* (2013.01); *H04B 10/5161* (2013.01); *H04B 10/6165* (2013.01); *H04L 9/0852* (2013.01); *H04L 9/0858* (2013.01)

(58) Field of Classification Search
CPC .......................... H04B 10/70; H04B 10/5161; H04B 10/6165; H04L 9/0858; H04L 9/0852
(Continued)

(56) References Cited

U.S. PATENT DOCUMENTS 6,529,601 B1 * 3/2003 Townsend ............. H04L 9/0858
359/229
7,925,171 B2 * 4/2011 Ooi ...................... H04B 10/505
398/192

(Continued)

FOREIGN PATENT DOCUMENTS

EP 1 848 128 A1 10/2007
GB 2525399 A 10/2015
(Continued)

OTHER PUBLICATIONS

United Kingdom Serch Report (with Written Opinion) dated Aug. 12, 2016 in United Kingdom Application 1602739.3 filed on Feb. 16, 2016.

(Continued)

*Primary Examiner* — Juan A Torres
(74) *Attorney, Agent, or Firm* — Oblon, McClelland, Maier & Neustadt, L.L.P.

(57) ABSTRACT

A transmitter for a continuous variable quantum communication system, the transmitter including a coherent light source and a first controller to apply a first signal to the coherent light source such that the coherent light source generates coherent light. The transmitter also including a first optical component to produce optical intensity modulation. The transmitter including a second controller to apply a second signal to the optical component such that a light pulse is emitted during a period of time that a first part of the generated light is received, and a light pulse is emitted during a period of time that a second part of the generated light is received. A phase control element and an intensity control element encode information in a continuum of values of the phase and amplitude of an emitted light pulse.

17 Claims, 26 Drawing Sheets

(51) Int. Cl.
    *H04B 10/61* (2013.01)
    *H04L 9/08* (2006.01)
(58) Field of Classification Search
    USPC .......................................................... 398/185
    See application file for complete search history.

(56) References Cited

U.S. PATENT DOCUMENTS

| | | | | |
|---|---|---|---|---|
| 2004/0250111 | A1* | 12/2004 | Flusberg | H04L 9/0858 380/281 |
| 2007/0212079 | A1 | 9/2007 | Ooi et al. | |
| 2008/0085121 | A1* | 4/2008 | Tomaru | H04B 10/85 398/138 |
| 2009/0074425 | A1* | 3/2009 | Tanaka | H04B 10/5051 398/185 |
| 2015/0304051 | A1* | 10/2015 | Yuan | H04B 10/70 398/188 |

FOREIGN PATENT DOCUMENTS

| | | |
|---|---|---|
| JP | 2000-511016 A1 | 8/2000 |
| JP | 2007-158415 | 6/2007 |
| JP | 2008-92484 | 4/2008 |
| JP | 2010-114662 | 5/2010 |
| JP | 2016-1868 A | 1/2016 |
| WO | WO 97/32410 | 9/1997 |

OTHER PUBLICATIONS

Paul Jouguet, et al., "Experimental demonstration of long-distance continuous-variable quantum key distribution", Nature Photonics, vol. 7, 2013, 4 pgs.

Bing Qi, et al., ", Generating the Local Oscillator "Locally" in Continuous-Variable Quantum Key Distribution Based on Coherent Detection", Physical Review X 5, 2015, 12 pgs.

Stefano Pirandola, et al., "High-rate measurement-device-independent quantum cryptography", Nature Photonics, vol. 9, 2015, 7 pgs.

Ross J. Donaldson, et al., "Experimental Implementation of a Quantum Optical State Comparison Amplifier", Physical Review Letters 114, 2015, 5 pgs.

* cited by examiner

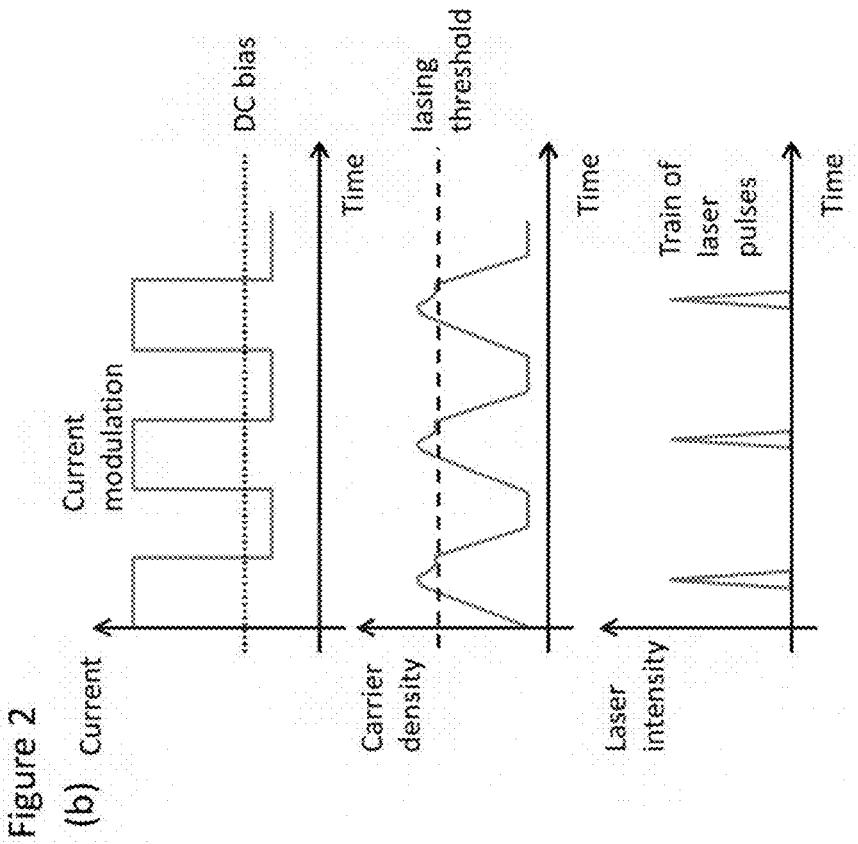
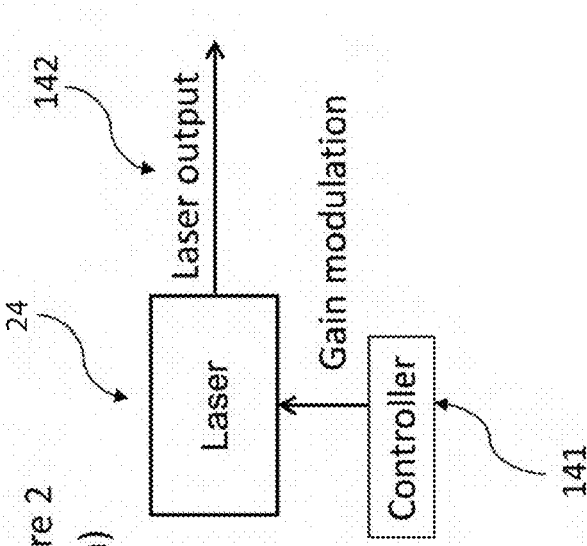
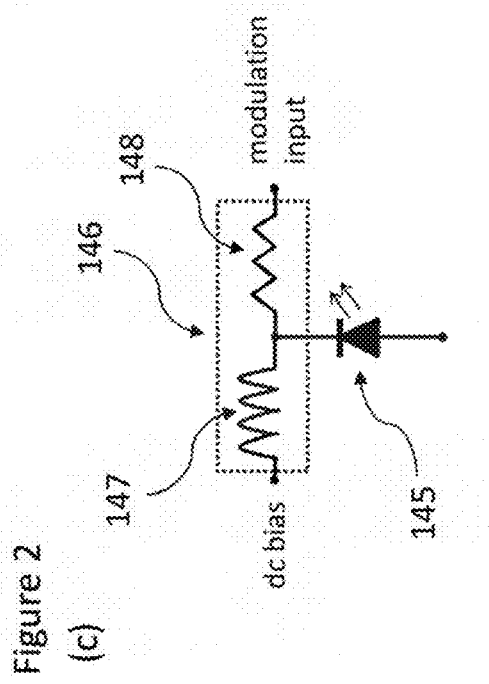
Figure 2

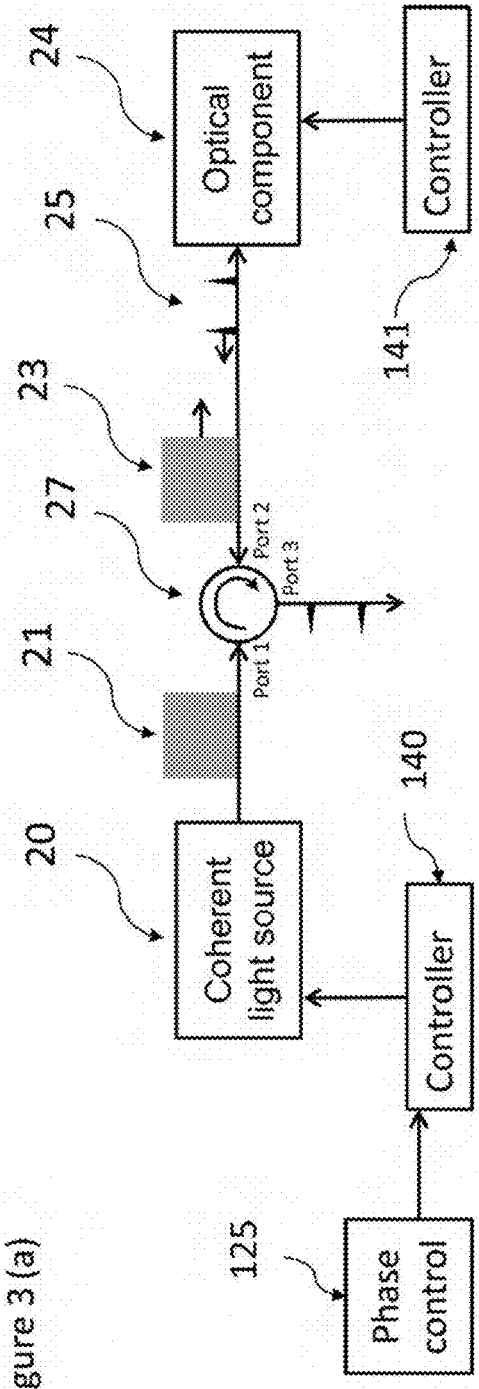
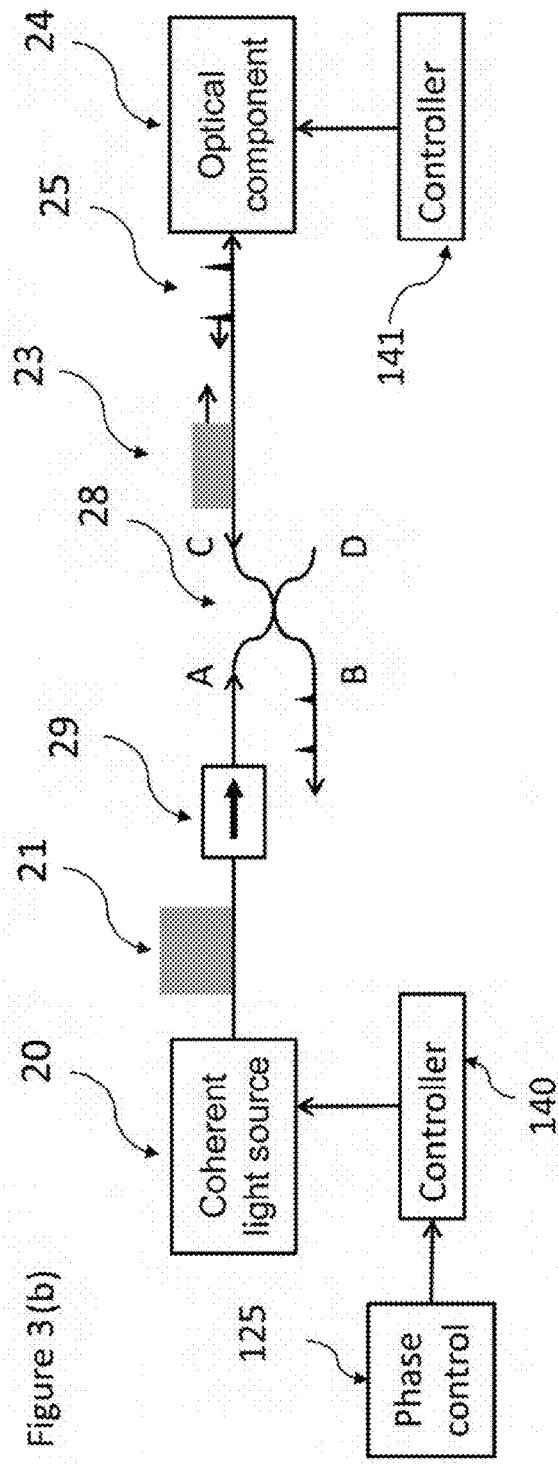
Figure 3(a)
Figure 3(b)

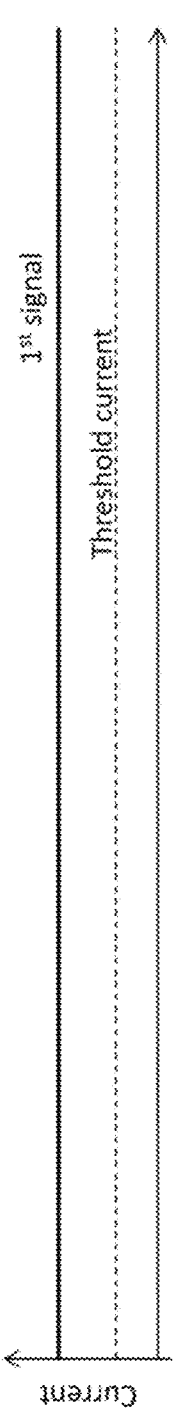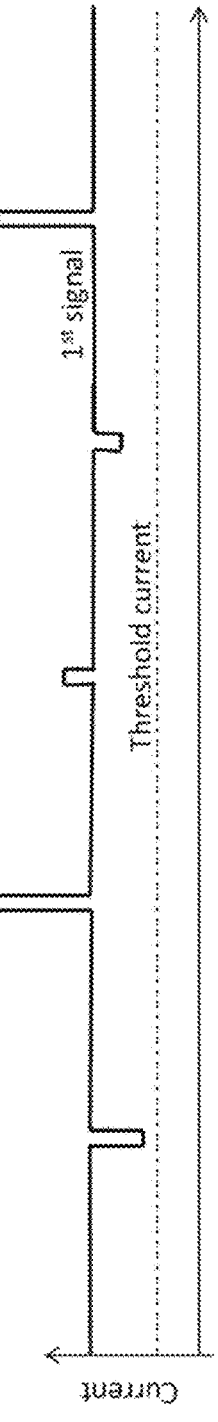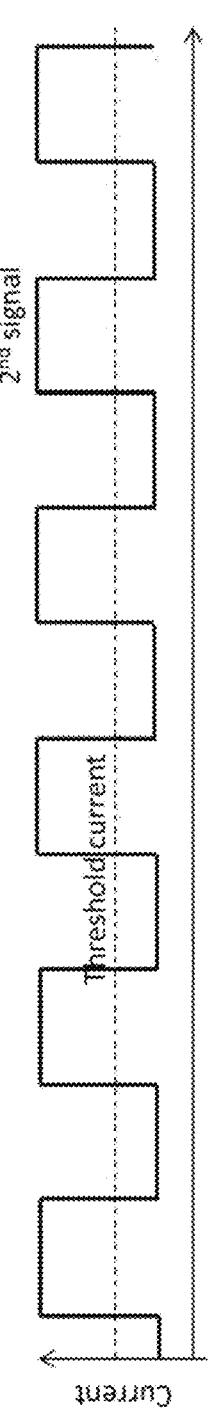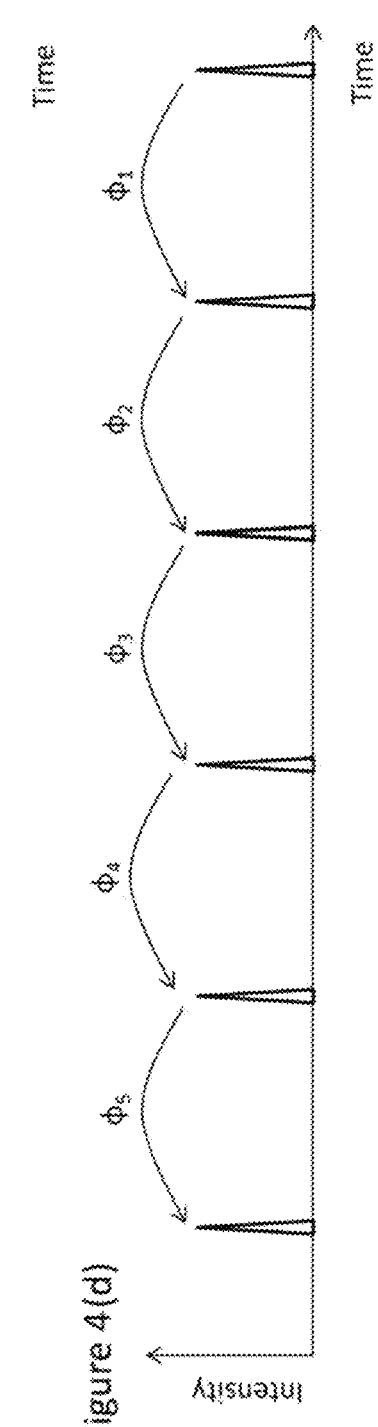

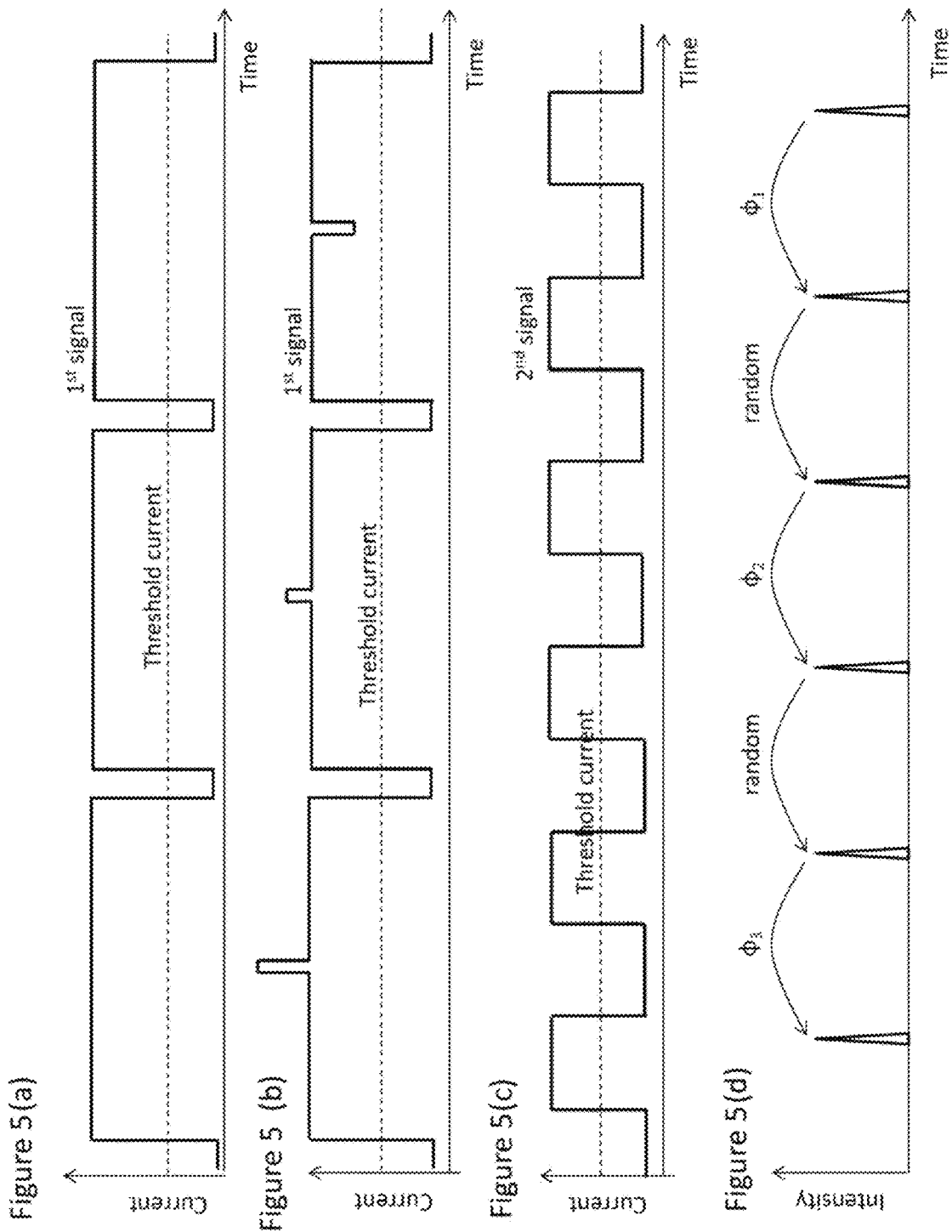

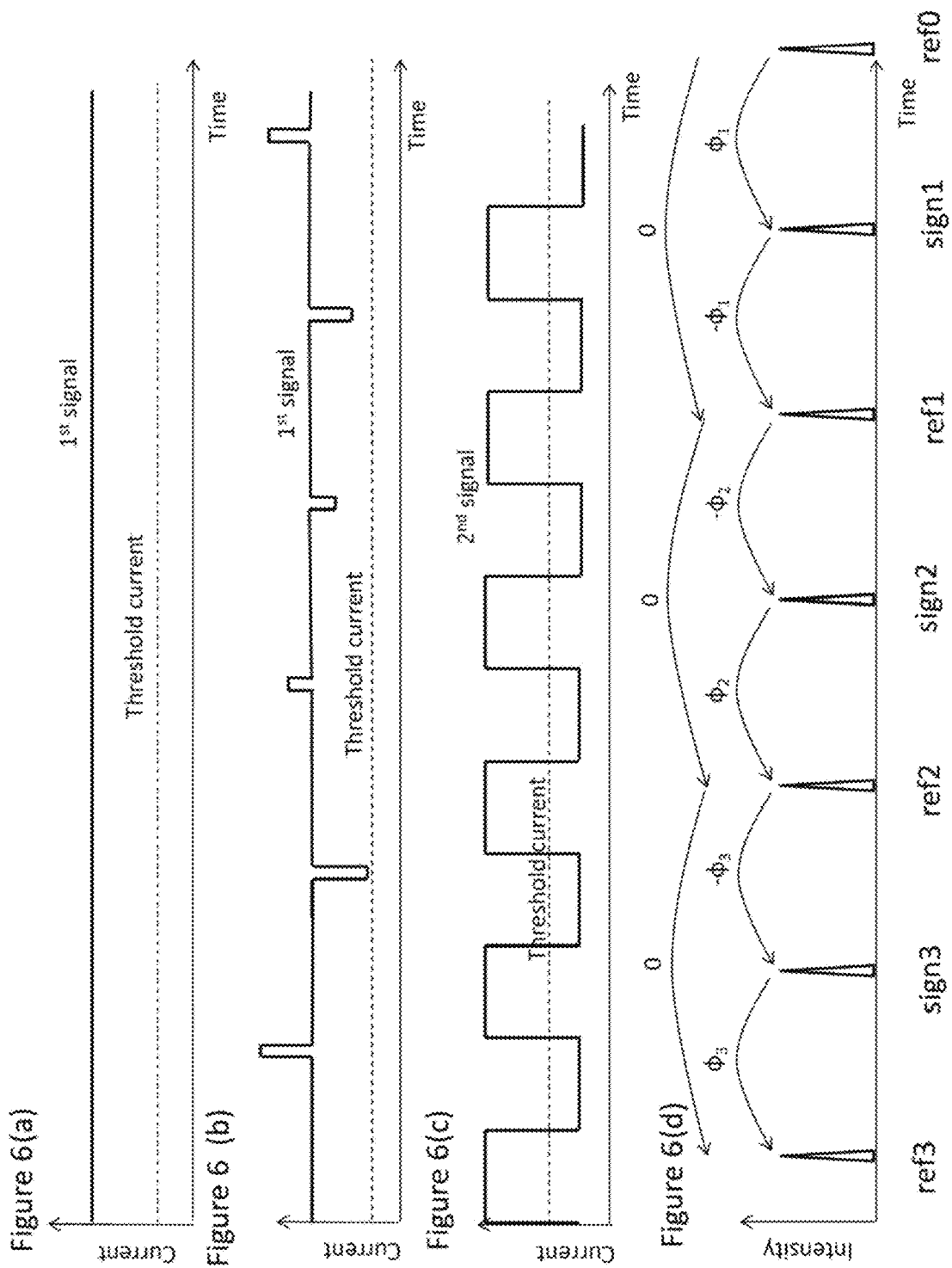

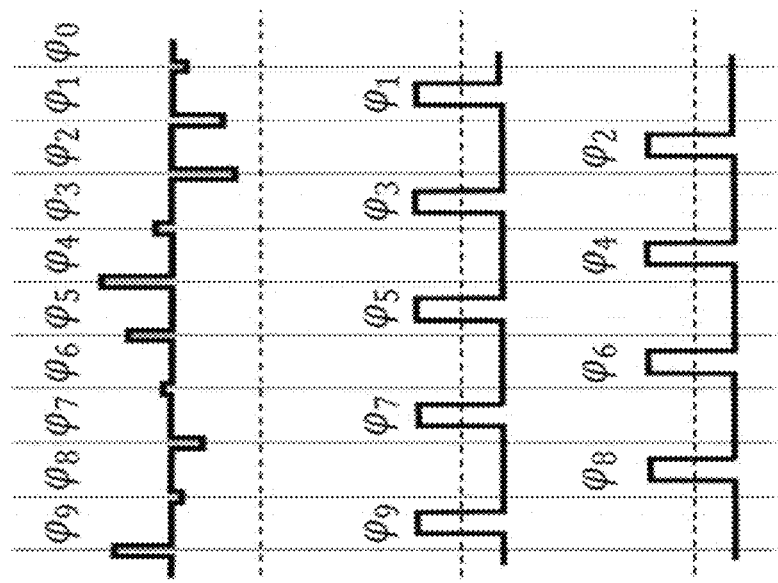
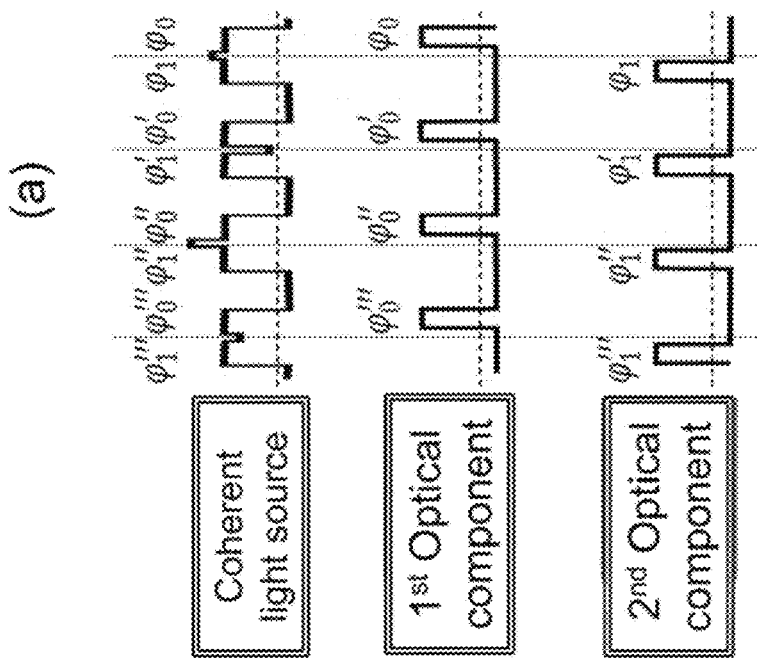
Figure 8 (a)
Figure 8 (b)

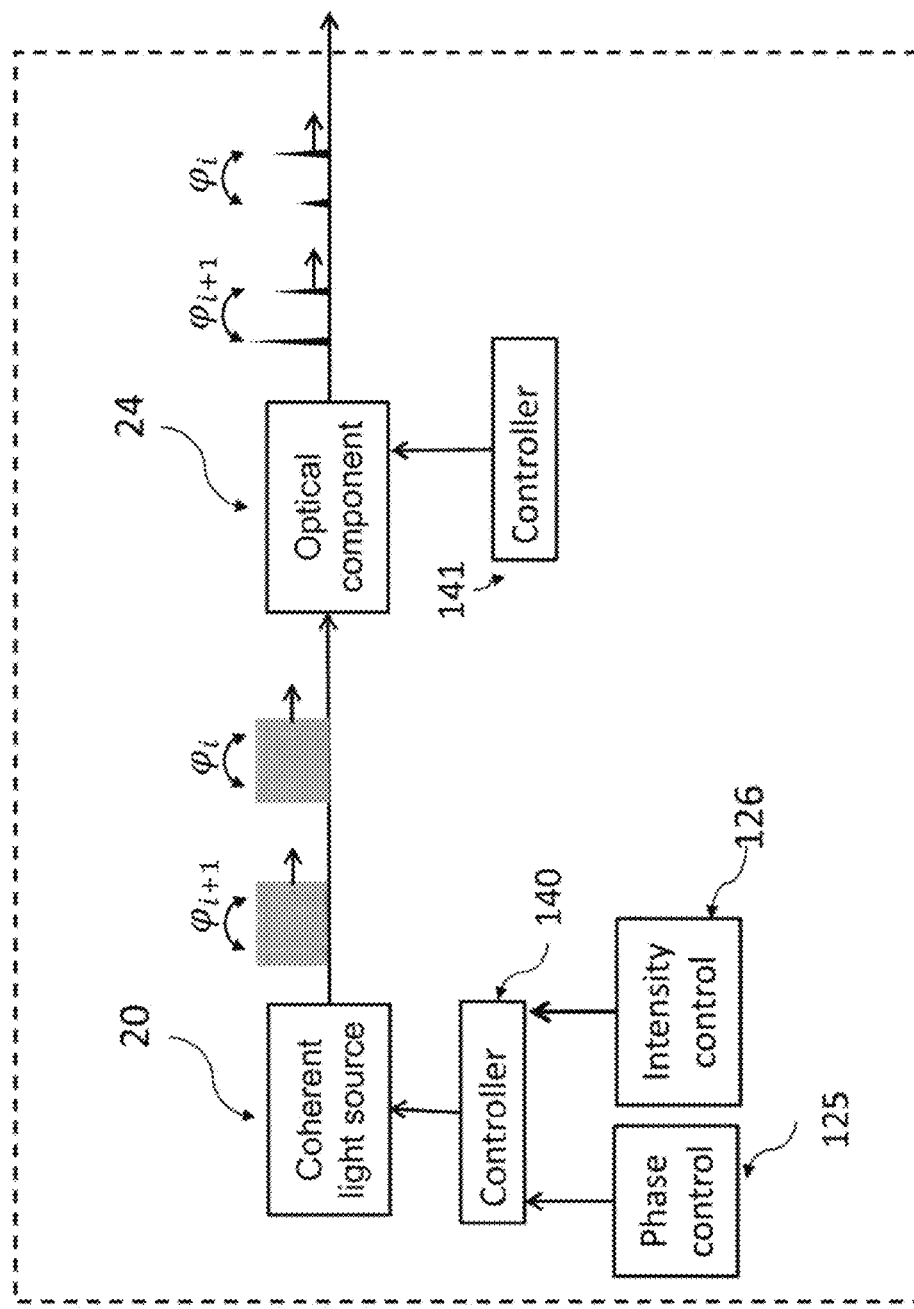

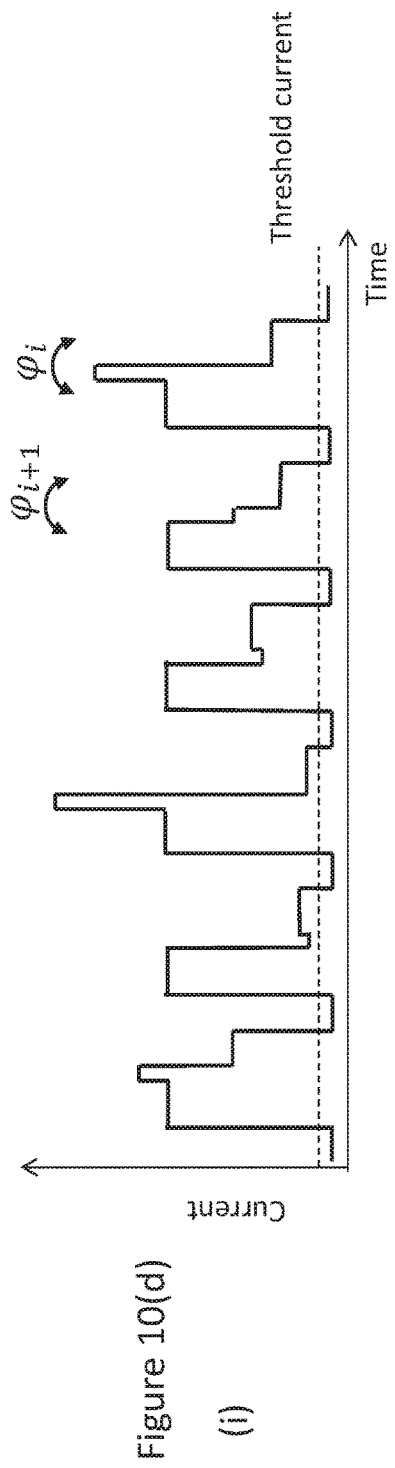
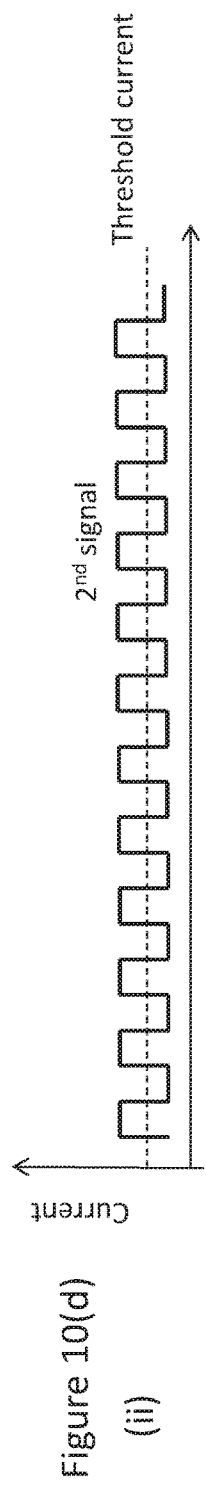
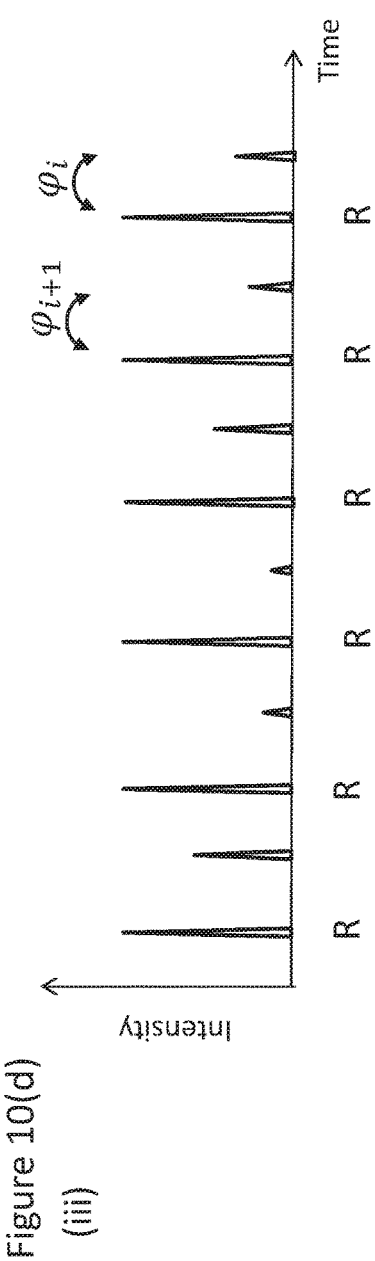
Figure 10(d) (i)
Figure 10(d) (ii)
Figure 10(d) (iii)

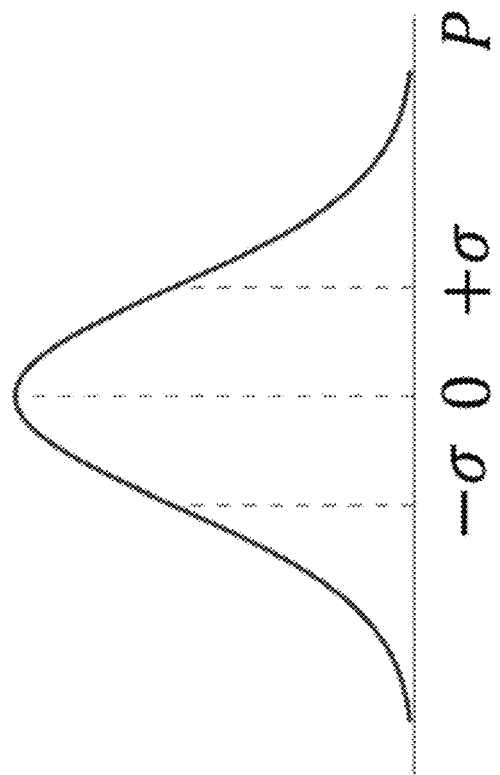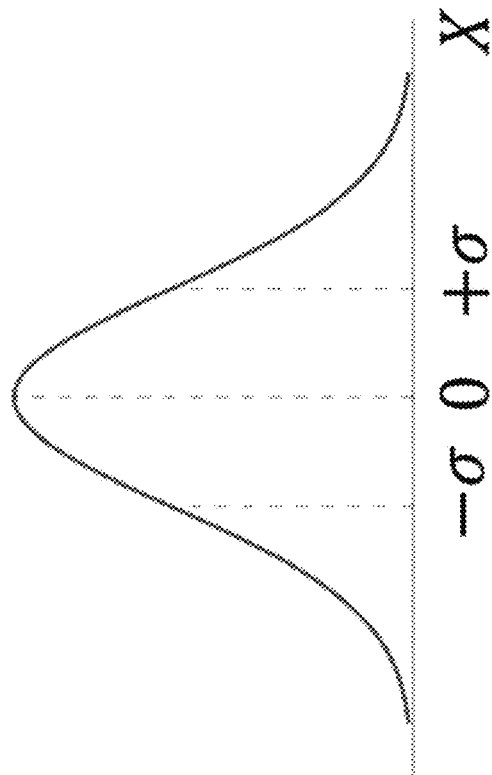
Figure 12

OPTICAL DEVICE, A TRANSMITTER FOR A QUANTUM COMMUNICATION SYSTEM AND A QUANTUM COMMUNICATION SYSTEM

FIELD

Embodiments described herein relate generally to optical devices, transmitters for quantum communication systems, and quantum communication systems.

BACKGROUND

In a quantum communication system, information may be sent between a transmitter and a receiver by encoded light pulses.

Quantum key distribution (QKD) is a technique which results in the sharing of cryptographic keys between two parties; a transmitter, often referred to as "Alice", and a receiver, often referred to as "Bob".

BRIEF DESCRIPTION OF THE FIGURES

Embodiments will now be described with reference to the following figures:

FIG. 2(a) is a schematic illustration of a gain-switched semiconductor laser;

FIG. 2(b) shows the current applied to a gain switched laser, the resulting carrier density and the emitted light pulses;

FIG. 2(c) is a schematic illustration of an electrical driving circuit for a semiconductor gain-switched laser;

FIG. 3(a) is a schematic illustration of an optical device in accordance with an embodiment, comprising an optical circulator;

FIG. 3(b) is a schematic illustration of an optical device in accordance with an embodiment, comprising a beam splitter;

FIG. 4(a) is a schematic illustration of a first signal applied to the coherent light source;

FIG. 4(b) is a schematic illustration of the first signal, modulated by the phase control element;

FIG. 4(c) is a schematic illustration of the second signal applied to the optical component;

FIG. 4(d) is a schematic illustration of the light pulses emitted from the optical component;

FIG. 5(a) is a schematic illustration of a first signal applied to the coherent light source;

FIG. 5(b) is a schematic illustration of the first signal, modulated by the phase control element;

FIG. 5(c) is a schematic illustration of the second signal applied to the optical component;

FIG. 5(d) is a schematic illustration of the light pulses emitted from the optical component;

FIG. 6(a) is a schematic illustration of a first signal applied to the coherent light source;

FIG. 6(b) is a schematic illustration of the first signal, modulated by the phase control element;

FIG. 6(c) is a schematic illustration of the second signal applied to the optical component;

FIG. 6(d) is a schematic illustration of the light pulses emitted from the optical component;

FIG. 8(a) is a schematic illustration of a first signal applied to the coherent light source and modulated by the phase control element, the second signal applied to the first optical component and the third signal applied to the second optical component;

FIG. 8(b) is a schematic illustration of a first signal applied to the coherent light source and modulated by the phase control element, the second signal applied to the first optical component and the third signal applied to the second optical component;

FIG. 10(c) is a schematic illustration of transmitter for a continuous variable quantum communication system in accordance with an embodiment;

FIG. 10(d)(i) is a schematic illustration of a first signal applied to the coherent light source, FIG. 10(d)(ii) of a second signal applied to the optical component and FIG. 10(d)(iii) of the emitted light pulses;

FIG. 12 is a schematic illustration of a normal distribution for the variable X and a normal distribution for the variable P;

DETAILED DESCRIPTION

Figure 1:
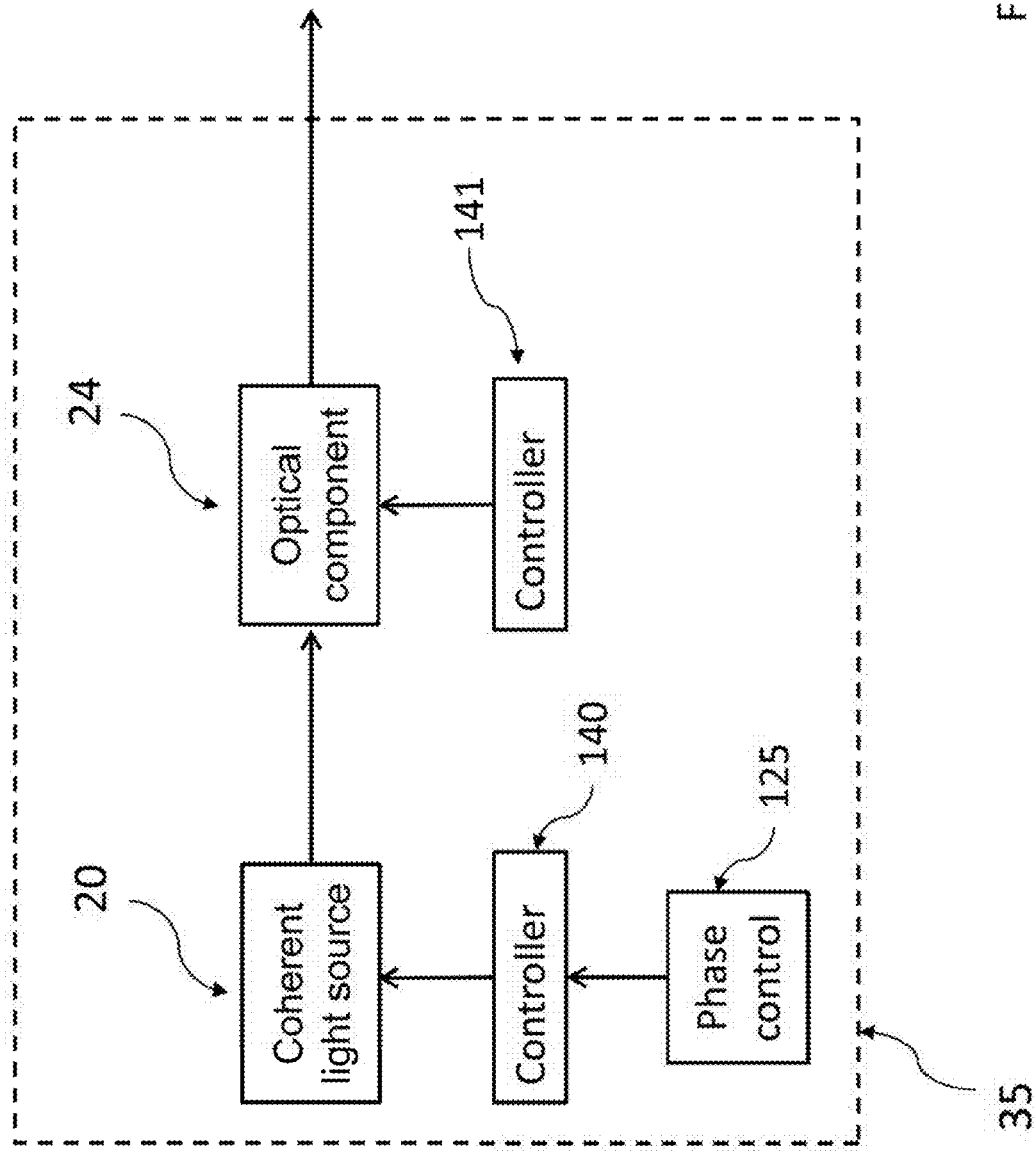
FIG. 1 is a schematic illustration of an optical device in accordance with an embodiment.

According to an embodiment, there is provided a transmitter for a continuous variable quantum communication system, the transmitter comprising:
a coherent light source;
a first controller, configured to apply a first signal to said coherent light source such that said coherent light source generates coherent light;
a phase control element, configured to apply perturbations to said first signal, each perturbation producing a phase shift between parts of the generated coherent light;
a first optical component, configured to produce optical intensity modulation, wherein said coherent light source is configured to supply said generated light to said optical component;
a second controller, configured to apply a second signal to said optical component such that a light pulse is emitted during a period of time that a first part of the generated light is received, and a light pulse is emitted during a period of time that a second part of the generated light is received;
an intensity control element, configured to modulate the amplitude of an emitted light pulse;
wherein the phase control element and the intensity control element are configured to encode information in a continuum of values of phase and amplitude of an emitted light pulse.

The second part of the first signal may be the part after one perturbation is applied for example, i.e. the second part of the first signal may be the adjacent, subsequent part. However, the second part of the first signal may be a part after several further perturbations have been applied, i.e. the second part of the first signal may be a part other than the adjacent, subsequent part. The parts of the first signal are the parts between the applied perturbations. The parts of the coherent light are the parts generated between each applied perturbation. Thus the applied perturbations segment the generated coherent light into parts, each part being shifted in phase compared to the previously generated part by the applied perturbation. Where the coherent light is pulsed, the first part may be the first part of a coherent light pulse and the second part may be the second part of the same coherent light pulse. However, the second part may be a part of another coherent light pulse, i.e. the part of another coherent light pulse before the applied perturbation or the part after the applied perturbation.

In an embodiment, the phase control element and the intensity control element are configured to encode information in a continuum of values of both the phase and amplitude of an emitted light pulse. The phase control element and the intensity control element are configured to modulate the phase and the amplitude of an emitted light pulse to produce a coherent state. In an embodiment, the light pulses carry information such as the value of an in-phase component or an in-quadrature component of a coherent state.

In an embodiment, the phase difference between a light pulse emitted during a period of time that the first part of the generated light is received and a light pulse emitted during a period of time that the adjacent, subsequent part of the generated light is received is one of a continuous range of values between 0 and an upper limit. In an embodiment, the upper limit is $2\pi$. In an embodiment, the relative phase of emitted signal light pulses to reference light is a continuum of values randomly selected from a uniform distribution in the interval $[0, 2\pi]$.

In an embodiment, the transmitter further comprises:
a processor, configured to:
generate a first random number and a second random number;
calculate a first amplitude from the first random number and the second random number and a first phase from the first random number and the second random number;
wherein the phase control element is configured to apply the perturbation to produce a phase shift corresponding to the first phase and the intensity control element is configured to apply an amplitude modulation corresponding to the first amplitude.

In an embodiment, the first random number and the second random number are each selected randomly from a normal distribution centred in zero and with variance $V=\sigma^2$. In an embodiment, the variance is 10. In an embodiment, the variance is 100. In an embodiment, the variance is 150.

Alternatively, the first amplitude and first phase value may be generated directly. The first amplitude may be randomly selected from a continuum of non-negative values with a Rayleigh distribution with scale parameter $\sigma$. The first phase may be randomly selected from a continuum of values with a uniform distribution in the interval $[0, 2\pi]$. This automatically obtains X and P following a Gaussian distribution with variance $\sigma^2$.

In an embodiment, the coherent light source is a laser. The coherent light source may be a semiconductor laser or a fibre laser. The coherent light source may be a gain switched laser.

In an embodiment, the optical component is a laser, for example a gain-switched laser. The optical component may be a semiconductor laser or a fibre laser. Alternatively, the optical component may be an intensity modulator or an optical amplifier.

In an embodiment, the first signal is a periodic signal and the coherent light source generates pulses of coherent light, and wherein the phase control element is configured to apply a perturbation to the first signal once each period, producing a phase shift between a first part of the generated coherent light pulse and a second part of the generated coherent light pulse, and wherein the light pulses emitted during the periods of time that said first part of the generated light pulses is received are reference light pulses and the light pulses emitted during the periods of time that said second part of the generated light pulses is received are signal light pulses.

In an embodiment, the second controller is configured to apply the time varying second signal to the first optical component such that a light pulse is emitted during a period of time that the first part of the generated light pulse is received, and a light pulse is emitted during a period of time that the second part of the generated light pulse is received. The transmitter may further comprise a polarisation modulator configured to apply a polarisation modulation to every other pulse.

In an embodiment, the transmitter further comprises:
a second optical component configured to produce optical intensity modulation, wherein said coherent light source is configured to supply said generated light to said second optical component;
a third controller, configured to apply a third signal to said second optical component such that a light pulse is emitted during a period of time a second part of the generated light pulse is received;
wherein the second controller is configured to apply the second signal to said first optical component such that a light pulse is emitted during a period of time that a first part of the generated light pulse is received.

The transmitter may further comprise a polarising beam splitter configured to apply a polarisation to pulses emitted from the second optical component.

In an embodiment, the first controller is configured to apply the first signal to said coherent light source such that said coherent light source generates continuous wave coherent light.

The phase control element is configured to apply a perturbation to the first signal periodically, producing a phase shift between each adjacent part of the generated coherent light pulse.

In an embodiment, the second controller is configured to apply the second signal to said optical component such that a light pulse is emitted during each period of time that a part of the generated light pulse is received. The emitted light pulses are signal light pulses.

In an embodiment, the transmitter further comprises:
 a second optical component configured to produce optical intensity modulation, wherein said coherent light source is configured to supply said generated light to said second optical component;
 a third controller, configured to apply a third signal to said second optical component such that a light pulse is emitted during the periods of time that alternate parts of the generated light are received;
 wherein the second controller is configured to apply the second signal to said first optical component such that a light pulse is emitted during the periods of time that the other parts of the generated light are received.

In one embodiment, the phase control element is configured to apply perturbations such that alternate perturbations cancel the previous phase shifts. The phase difference between the light pulses emitted during the periods of time that the parts of the generated light corresponding to the alternate perturbations are received is substantially zero, wherein these light pulses are the reference light pulses and the light pulses emitted during the remaining periods of time are the signal light pulses.

In an embodiment, the phase control element applies a perturbation such that each even phase shift cancels the associated odd phase shift, to create a random phase for the signal pulses and a constant zero phase for the reference pulses.

In an embodiment, the amplitude of the emitted signal light pulses is a continuum of non-negative values randomly selected from a Rayleigh distribution with scale parameter $\sigma$. In an embodiment, $\sigma^2$ is 150 photons. In an embodiment, $\sigma^2$ is 100 photons. In an embodiment, $\sigma^2$ is 10 photons.

The intensity control element may be configured to modulate the amplitude of the first signal, such that the amplitude of the generated coherent light is varied. Alternatively, the intensity control element is configured to modulate the amplitude of the second signal, such that the amplitude of the emitted light pulses is varied. Alternatively, the intensity control element is an intensity modulator.

In an embodiment, the emitted light pulses have a duration of greater than 10 ns. This reduces the electrical noise of the measurement. In an embodiment, the emitted light pulses have a duration of greater than 100 ns.

In an embodiment, there is more than 1 photon in each emitted light pulse. This allows more key bits to be measured from a single detection. In an embodiment, there are more than 10 photons in each emitted light pulse.

In an embodiment, each emitted signal light pulse has around 1 to 100 photons. In an embodiment, each emitted signal light pulse has around 1 to 10 photons.

In an embodiment, each emitted reference light pulse has around $10^7$ to $10^9$ photons. In an embodiment, each emitted reference light pulse has around 100 to $10^8$ photons.

In an embodiment, there is provided a continuous variable quantum communication system comprising the transmitter of any preceding claim and a receiver, the transmitter configured to send the emitted light pulses to the receiver, the receiver configured to optically combine a signal light pulse and reference light.

In an embodiment, the signal light pulses are emitted light pulses received at the receiver.

The reference light may be locally generated, or may be further emitted light pulses received at the receiver.

In an embodiment, the reference light is reference light pulses emitted from the transmitter and received at the receiver and the signal light pulses are signal light pulses emitted at the transmitter and received at the receiver, and the receive comprises:
 a delay element, configured to cancel a delay between the signal and reference light pulses;
 a modulation element, configured to select between measurement of an in-phase component and an in-quadrature component.

The signal light pulses and reference light pulses are optically combined at a beam combiner, for example a 50:50 beam splitter. The modulation element is configured to select between a measurement of the component of the signal light pulse in-phase with the reference light pulse and the component of the signal light pulse in quadrature with the reference light pulse when the signal light pulse and reference light pulse are combined. The modulation element may be a phase modulator, configured to select between a phase shift of 0 and a phase shift of $\pi/2$.

The receiver further comprises a first and second light detector, configured to measure the outputs of the beam combiner.

A phase shift of 0 applied to the reference light pulse corresponds to a measurement of the component of the signal light pulse in-phase with the reference light pulse, which corresponds to a measurement of X at the combiner. A phase shift of $\pi/2$ corresponds to a measurement of the component of the signal light pulse in quadrature with the reference light pulse, which corresponds to a measurement of P at the combiner.

The value of X or P is determined from the outputs of the photon detector.

In an embodiment, the receiver comprises:
 a light source, configured to generate local reference light;
 a combining component, comprising a first beam combiner and a second beam combiner, the combining component configured to:
  split the local reference light into a first part and a second part and split the received light pulses into a first part and a second part;
  apply a first phase shift between the second part of the received light pulses and the second part of the local reference light;
  combine the first part of the received light pulses and the first part of the local reference light on the first beam combiner; and
  combine the second part of the received light pulses and the second part of the local reference light on the second beam combiner;
 a first light detector and a second light detector, configured to detect the outputs of the first beam combiner;
 a third light detector and a fourth light detector, configured to detect the outputs of the second beam combiner;

a processor, configured to:
    receive information relating to the outputs of the first beam combiner and the second beam combiner;
    determine the phase of the local reference light relative to the received reference light pulse;
    determine a component of the signal light pulse in quadrature with the received reference light pulse and a component of the signal light pulse in quadrature with the received reference light pulse.

In an embodiment, the receiver comprises:
a first splitting element, configured to direct the signal light pulses to a first optical path and the reference light pulses to a second optical path;
a light source, configured to generate local reference light;
a second splitting element, configured to split the local reference light into a first part and a second part;
a first combining component, comprising a first beam combiner and a second beam combiner, the first combing component configured to:
    split the first part of the local reference light into a third part and a fourth part and split the signal light pulses into a first part and a second part;
    apply a first phase shift between the second part of the signal light pulses and the fourth part of the local reference light;
    combine the first part of the signal light pulses and the third part of the local reference light on the first beam combiner; and
    combine the second part of the signal light pulses and the fourth part of the local reference light on the second beam combiner;
a first light detector and a second light detector, configured to detect the outputs of the first beam combiner;
a third light detector and a fourth light detector, configured to detect the outputs of the second beam combiner;
a second combining component, comprising a third beam combiner and a fourth beam combiner, the second combining component configured to:
    split the second part of the local reference light into a fifth part and a sixth part and split the received reference light pulses into a first part and a second part;
    apply a first phase shift between the second part of the received reference light pulses and the sixth part of the local reference light;
    combine the first part of the received reference light pulses and the fifth part of the local reference light on the first beam combiner; and
    combine the second part of the received reference light pulses and the sixth part of the local reference light on the second beam combiner;
a fifth light detector and a sixth light detector, configured to detect the outputs of the third beam combiner;
a seventh light detector and a eighth light detector, configured to detect the outputs of the fourth beam combiner;
a processor, configured to:
    receive information relating to the outputs of the first beam combiner, the second beam combiner, the third beam combiner and the fourth beam combiner;
    determine the phase of the local reference light relative to the received reference light pulse;
    determine the phase of the local reference light relative to the signal light pulse; and
    determine a component of the signal light pulse in quadrature with the received reference light pulse and a component of the signal light pulse in quadrature with the received reference light pulse.

In an embodiment, there is provided an optical device comprising:
a coherent light source;
a first controller, configured to apply a first signal to said coherent light source such that said coherent light source generates coherent light;
a phase control element, configured to apply perturbations to said first signal, each perturbation producing a phase shift between parts of the generated coherent light;
a first optical component configured to produce optical intensity modulation and a second optical component configured to produce optical intensity modulation, wherein said coherent light source is configured to supply said generated light pulses to said first optical component and said second optical component;
a second controller, configured to apply a second signal to said first optical component such that a light pulse is emitted during the period of time that a first part of the generated light is received;
a third controller, configured to apply a third signal to said second optical component such that a light pulse is emitted during the period of time that a second part of the generated light is received.

In an embodiment, the first signal is a periodic signal and the coherent light source generates pulses of coherent light, and wherein the phase control element is configured to apply a perturbation to the first signal once each period, producing a phase shift between a first part of the generated coherent light pulse and a second part of the generated coherent light pulse;
    the second controller is configured to apply the second signal to said first optical component such that a light pulse is emitted during the periods of time that said first part of the generated light pulses is received;
    the third controller is configured to apply the third periodic signal to said second optical component such that a light pulse is emitted during the periods of time that said second part of the generated light pulses is received.

In an embodiment, the first optical component is arranged on a first optical path and the second optical component is arranged on a second optical path. The device may comprise a beam splitter to direct the coherent light down both optical paths.

The optical paths may combine at a further beam splitter, which may be a polarising beam splitter for example.

Further components, for example polarisation rotators, intensity modulators, attenuators and delay elements may be included on one or both of the optical paths.

In an embodiment, the device comprises one or more further optical components configured to produce optical intensity modulation, wherein said coherent light source is configured to supply said generated light pulses to said further optical components, for example through a 1×N coupler.

In an embodiment, there is provided an optical device comprising;
a coherent light source;
a first controller, configured to apply a first signal to said coherent light source such that said coherent light source generates continuous wave coherent light;
a phase control element, configured to apply perturbations to said first signal, each perturbation producing a phase shift between parts of the generated coherent light, and alternate perturbations cancelling the previous phase shifts;

a first optical component configured to produce optical intensity modulation, wherein said coherent light source is configured to supply said generated light to said first optical component;

a second controller, configured to apply a time varying signal to said first optical component such that a light pulse is emitted during each period of time that a part of the generated light is received, wherein the phase difference between the light pulses emitted during the periods of time that the parts of the generated light corresponding to the alternate perturbations are received is substantially zero.

In an embodiment, the phase control element applies a perturbation such that each even phase shift cancels the associated odd phase shift, to create a random phase for the signal pulses and a constant zero phase for the reference pulses.

In an embodiment, there is provided a quantum communication method, comprising:

applying perturbations to a first signal, applying the first signal to a coherent light source such that said coherent light source generates coherent light, each perturbation producing a phase shift between parts of the generated coherent light;

supplying the coherent light to an optical component configured to produce optical amplification;

applying a second signal to said optical component such that a light pulse is emitted during a period of time that a first part of the generated light is received, and a light pulse is emitted during a period of time that a second part of the generated light is received;

applying an amplitude modulation, wherein information is encoded in a continuum of values of the phase and amplitude of an emitted signal light pulse;

sending emitted signal light pulses to a receiving unit;

optically combining the signal light pulses and reference light at the receiving unit to decode the information.

In an embodiment, the first signal is a pulsed signal, and the perturbations are applied once to each pulse of the first signal.

In an embodiment, the method comprises:

generating a first random number X and a second random number P;

calculating a first amplitude from the first random number and the second random number and a first phase from the first random number and the second random number;

applying the perturbation to produce a phase shift corresponding to the first phase;

applying the amplitude modulation corresponding to the first amplitude.

In an embodiment, the first random number and the second random number are each selected randomly from a normal distribution centred in zero and with variance $V=\sigma^2$. In an embodiment, the variance is 10 photons. In an embodiment, the variance is 100 photons. In an embodiment, the variance is 150 photons.

In an embodiment, the amplitude of the emitted signal light pulses is a continuum of non-negative values randomly selected from a Rayleigh distribution with scale parameter $\sigma$. In an embodiment, $\sigma^2$ is 150 photons. In an embodiment, $\sigma^2$ is 100 photons. In an embodiment, $\sigma^2$ is 10 photons.

In an embodiment, the relative phase of the emitted signal light pulses from the reference signal light pulses is a continuum of values randomly selected from a uniform distribution in the interval $[0, 2\pi]$.

In an embodiment, the information assignment during encoding can be based on a grid in the phase space X-P.

In an embodiment, there is provided a continuous variable quantum communication system comprising a first transmitter, a second transmitter and a receiver, the first transmitter comprising:

a first coherent light source;

a first controller, configured to apply a first signal to said first coherent light source such that said first coherent light source generates coherent light;

a first phase control element, configured to apply perturbations to said first signal, each perturbation producing a phase shift between parts of the generated coherent light;

a first optical component, configured to produce optical intensity modulation, wherein said first coherent light source is configured to supply said generated light to said first optical component;

a second controller, configured to apply a second signal to said first optical component such that a light pulse is emitted during a period of time that a first part of the generated light is received, and a light pulse is emitted during a period of time that a second part of the generated light is received;

an first intensity control element, configured to modulate the amplitude of an emitted light pulse;

wherein the first phase control element and the first intensity control element are configured to encode information in a continuum of values of the phase and amplitude of an emitted light pulse;

the second transmitter comprising:

a second coherent light source;

a third controller, configured to apply a third signal to said second coherent light source such that said second coherent light source generates coherent light;

a second phase control element, configured to apply perturbations to said third signal, each perturbation producing a phase shift between parts of the generated coherent light;

a second optical component, configured to produce optical intensity modulation, wherein said second coherent light source is configured to supply said generated light to said second optical component;

a fourth controller, configured to apply a fourth signal to said second optical component such that a light pulse is emitted during a period of time that a first part of the generated light is received, and a light pulse is emitted during a period of time that a second part of the generated light is received;

a second intensity control element, configured to modulate the amplitude of an emitted light pulse;

wherein the second phase control element and the second intensity control element are configured to encode information in a continuum of values of the phase and amplitude of an emitted light pulse;

and wherein the first transmitter and second transmitter are configured to send emitted light pulses to the receiver, the receiver configured to optically combine a signal light pulse from the first transmitter and a signal light pulse from the second transmitter and configured to optically combine a reference light pulse from the first transmitter and a reference light pulse from the second transmitter.

In an embodiment the first signal in the first transmitter is a periodic signal and the first coherent light source generates pulses of coherent light, and wherein the first phase control element is configured to apply a perturbation to the first signal once each period, producing a phase shift between a first part of the generated coherent light pulse and a second part of the generated coherent light pulse, and wherein the light pulses emitted during the periods of time that said first part of the generated light pulses is received are reference light pulses and the light pulses emitted during the periods of time that said second part of the generated light pulses is received are signal light pulses.

In an embodiment the third signal in the second transmitter is a periodic signal and the second coherent light source generates pulses of coherent light, and wherein the second phase control element is configured to apply a perturbation to the third signal once each period, producing a phase shift between a first part of the generated coherent light pulse and a second part of the generated coherent light pulse, and wherein the light pulses emitted during the periods of time that said first part of the generated light pulses is received are reference light pulses and the light pulses emitted during the periods of time that said second part of the generated light pulses is received are signal light pulses.

In an embodiment, the receiver comprises a processor, configured to:
  receive the phase difference between the reference light pulse from the first transmitter and the reference light pulse from the second transmitter;
  determine the difference between the component of the signal light pulse from the first transmitter in phase with the reference light pulse from the first transmitter and the component of the signal light pulse from the second transmitter in phase with the reference light pulse from the second transmitter;
  determine the sum of the component of the signal light pulse from the first transmitter in quadrature with the reference light pulse from the first transmitter and the component of the signal light pulse from the second transmitter in quadrature with the reference light pulse from the second transmitter.

In an embodiment, the processor is configured to determine the phase difference between the reference light pulse from the first transmitter and the reference light pulse from the second transmitter.

FIG. 1(a) is a schematic illustration of an optical device 35 in accordance with an embodiment. The optical device 35 is configured to output light pulses.

The optical device comprises a coherent light source 20 optically coupled to an optical component 24.

The optical device 35 comprises a coherent light source 20 connected to a first aperture of an optical component 24 by a waveguide, for example an optical fibre. Alternatively, the light pulses may travel between the components of the optical device 35 through free space, meaning that no waveguides are required to connect the components such as the coherent light source 20 and the optical component 24.

In an embodiment, the optical component 24 is a gain-switched laser. In one embodiment, the gain-switched laser 24 is a semiconductor laser. In an alternative embodiment, the gain-switched laser 24 is a fibre laser. Alternatively, the optical component 24 may be an intensity modulator or an optical amplifier.

A coherent light source is a light source that generates coherent light, in other words a light source that generates light with a constant relative phase. In one embodiment, the coherent light source 20 is a semiconductor laser diode. In one embodiment, the coherent light source 20 is a gain-switched semiconductor laser diode. Further examples of a coherent light source include fibre lasers and solid state lasers. It is to be understood that in practice, light generated by a laser is not perfectly coherent. However, a laser is considered to be a coherent light source because the generated light has a high level of coherence.

In some cases, the phase difference may drift over time due to ambient temperature changes or changes of the driving conditions of the coherent light source 20 for example. These drifts may be compensated for by the phase control element 125.

The operation of a gain-switched laser is described later in relation to FIGS. 2(a) to (c).

The optical device 35 comprises a first controller 140, configured to apply a first signal to said coherent light source 20 such that said coherent light source 20 generates coherent light.

The optical device 35 further comprises a phase control element 125, configured to apply perturbations to the first signal. This will be described in more detail later.

The optical device 35 further comprises a second controller 141, configured to apply a second signal to the optical component 24. The second signal is time varying signal which causes light pulses to be emitted from the optical component 24 every time the second signal switches above a threshold. These light pulses are then emitted from the optical device 35.

The first controller 140, phase control element 125 and the second controller 141 may be a single component for example.

In operation, the coherent light source 20 generates coherent light. The coherent light is emitted from coherent light source 20 and enters optical component 24. Coherent light from coherent light source 20 enters the optical component 24. Second controller 141 applies a time varying signal to optical component 24 such that a plurality of light pulses are emitted.

Each time the optical component 24 is switched above the threshold, the emitted light pulse has a fixed phase relation to the injected coherent light.

For example, the coherent light source 20 may be pulsed and the optical component 24 may be switched above the threshold twice during the time that each coherent light pulse is incident, therefore two coherent emitted light pulses with the same difference between the emission time of each pulse are generated each time a coherent light pulse is incident. A first pair of light pulses (pulse 1 and pulse 2) is emitted during a period when a first long coherent light pulse is incident. Pulses generated during a period when one long coherent light pulse is incident are referred to as intra-period. A second pair of light pulses (pulse 3 and pulse 4) is generated when a second long coherent light pulse is incident and a third pair of pulses (pulse 5 and pulse 6) is generated when a third long coherent light pulse is incident. The time between emission of pulse 1 and 2 is the same as the time between emission of pulse 3 and 4 and the same as the time between emission of pulse 5 and 6. Pulse 1 and pulse 2 are intra-period. Pulse 3 and pulse 4 are intra-period. Pulse 5 and pulse 6 are intra-period. The first pair of pulses, second pair of pulses and third pair of pulses have a fixed phase relation.

When no phase modulation is applied at the phase control element 125, the relative phase of the pairs is the same for each pair. The phase difference between pulse 1 and pulse 2 is the same as the phase difference between pulse 3 and pulse 4 and the phase difference between pulse 5 and pulse 6. The phase difference between any two consecutive intra-period pulses is the same for all periods. Pulses generated during periods when different coherent light pulses are incident are referred to as inter-period. For example, pulse 1 and pulse 3 are inter-period, pulse 2 and pulse 3 are inter-period, pulse 4 and pulse 5 are inter-period, pulse 1 and pulse 6 are inter-period. The phase difference between two inter-period pulses (pulse 2 and pulse 3 for example) is not fixed, and is random. For example, the phase difference between pulse 2 and pulse 3 has a random relationship to the phase difference between pulse 4 and pulse 5.

When continuous wave coherent light is injected into the optical component 24, and no phase modulation is applied at the phase control element 125, all of the pulses emitted with regular emission times will have the same phase difference between adjacent pulses. For example, where three light pulses (pulse 1, pulse 2 and pulse 3) are generated during a period when coherent wave light is incident, with the time between the emission of pulse 1 and pulse 2 the same as the time between the emission of pulse 2 and pulse 3, the phase difference between pulse 1 and pulse 2 is the same as the phase difference between pulse 2 and pulse 3.

The phase difference between two consecutive inter-period pulses is only truly random if there is no phase coherence between consecutive long light pulses generated by the coherent light source 20. For a coherent light source 20 such as a semiconductor gain-switched laser, the laser emission is started by spontaneous emission. This is a random process, which means that the phase of the generated coherent light pulse will be random. In order that the random process of spontaneous emission is responsible for starting the laser emission for all coherent light pulses, the laser cavity needs to be completely empty before each coherent light pulse is generated. The number of photons in the cavity decays exponentially as soon as the carrier density falls below the lasing threshold. It may take around 100 ps until most of the photons have left the cavity, ensuring that no phase coherence exists with the subsequently generated coherent light pulse.

It is possible to tailor the phase coherence of the pulse sequence emitted from the optical component 24, for example producing a pair of pulses which have a fixed phase relation followed by a second pair of pulses which have a random phase compared to the first pair but have the same fixed phase relation with each other. Any number of coherent pulses can be followed by a second different number of coherent pulses, building up a tailored sequence of light pulses.

In an embodiment, the optical component 24 is a gain-switched semiconductor laser. A semiconductor laser can be periodically switched above and below the lasing threshold by application of a time varying current. The second controller 141 is connected to gain-switched laser 24, and modulates the gain of the laser, by applying a current through an electrical connection for the case of a semiconductor gain-switched laser 24.

In order to switch the gain-switched laser 24 above the lasing threshold, the second controller 141 may supply the second signal, which may be a time varying current, to an AC input of a bias-T connected to the gain-switched laser 24. A DC bias current may be supplied to a DC input. In one embodiment, the time varying current has a square type wave form. In one embodiment, the second signal has a frequency of the order of 1 GHz. In one embodiment, the second signal has a frequency of the order of 1 MHz. In an alternative embodiment, the time varying current is an electrical sine wave generated by a frequency synthesizer. The time varying current can comprise signals with arbitrary pulse shape.

The gain-switched laser 24 has a good extinction ratio between the state when pulses are emitted and the "off" state. In one embodiment, the duration of each of the emitted light pulses is greater than 200 ps. In one embodiment, the duration of each of the emitted light pulses is greater than 10 ns. In one embodiment, the duration of each of the emitted light pulses is of the order of a hundred nanoseconds.

The period of the second signal may be selected depending on conditions of the system used.

Coherent light from coherent light source 20 enters the optical cavity of the gain-switched laser 24 and causes coherence seeding of the gain-switched laser 24. The term coherence seeding can refer to laser seeding, or seeding by a coherent light source other than a laser.

During operation of the gain-switched laser 24 without injection of light from coherent light source 20, i.e. without coherence seeding, when the gain-switched laser 24 is switched above the lasing threshold a light pulse is initiated by spontaneous emission, and the phase difference between the generated light pulses is random. When the light from coherent light source 20 is injected into the gain-switched laser 24 and the gain-switched laser 24 is switched above the lasing threshold, a pulse is initiated by stimulated emission caused by the injected coherent light. This is called coherence seeding.

In order for coherence seeding to occur, the frequency of the injected light must match the frequency of the gain-switched laser 24 to within a certain range. In one embodiment, the difference in the frequency of the light supplied by the coherent light source 20 and the frequency of the gain-switched laser 24 is less than 30 GHz. In some embodiments, where the gain-switched laser 24 is a distributed feedback (DFB) laser diode the frequency difference is less than 100 GHz. In other embodiments, where the seeded laser is a Fabry-Perot laser diode, the frequency difference is less than 3 Terahertz.

When coherence seeding occurs, each time the gain-switched laser 24 is switched above the lasing threshold, the generated light pulse has a fixed phase relation to the injected coherent light.

For successful coherence seeding the fraction of the coherent light 23 that enters the optical cavity of the laser has to be within certain limits which depend on the type of gain-switched laser that is used. In one embodiment, the optical power of the injected coherent light is at least 1000 times lower than the optical output power of the gain-switched laser 24. In one embodiment, the optical power of the injected coherent light is at least 100 times lower than the optical output power of the gain-switched laser 24.

The coherent light source 20 can comprise a fixed optical attenuator that reduces the intensity of the long light pulses emitted. Alternatively, the coherent light source 20 can comprise an adjustable optical attenuator that is adjusted only slowly. The intensity of the generated pulses depends on the intensity of the coherent light. With the correct driving conditions, no pulses are generated at all if no coherent light is injected. The coherent light source can therefore comprise an intensity modulator that varies the intensity of the generated long light pulses before they are supplied to the gain-switched laser 24, in order to vary the intensity of the generated emitted light pulses. The optical device 35 can comprise a second optical attenuator that reduces the intensity of the emitted light pulses generated by the gain-switched laser 24, or an intensity modulator that varies the intensity of the emitted light pulses generated by the gain-switched laser 24.

FIG. 2(a) shows a schematic illustration of a gain-switched semiconductor laser. A gain-switched laser generates light when the laser is switched above the lasing threshold and generates almost no light when the laser is switched below the lasing threshold. Laser 24 has a second controller 141 which allows modulation of the gain of the laser by modification of the pump power. The gain can be modulated in a time varying manner. Driving the laser in this manner can generate short laser pulses, of the order of picoseconds in duration, at the laser output 142.

If laser 24 is a semiconductor laser then it can be pumped electrically, by applying a current. In order to modulate the gain of a semiconductor laser, the second controller 141 modulates the current applied to the laser.

If laser 24 is a fiber laser or solid state laser, it can be pumped optically. In order to modulate the gain of a fiber laser or solid state laser the second controller 141 modulates the optical input applied to the laser.

FIG. 2(b) shows three graphs illustrating a gain modulation of a semiconductor gain-switched laser. The upper graph shows the current applied to the laser on the vertical axis, with time on the horizontal axis. The DC bias is indicated by a horizontal dotted line. The current applied to the laser has the form of a series of current modulation pulses. The wave is a square-type waveform. In this case, the current is not reduced to zero in between the current modulation pulses, but only reduced to a bias value, which is indicated by the dotted line.

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases.

The laser output generated by the modulation signal is shown in the lower graph. The vertical axis shows the laser intensity, with time on the horizontal axis. The laser outputs light when the carrier density is above the lasing threshold. Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

The rapid increase of the photon density causes a decrease in the carrier density. This in turn decreases the photon density, which increases the carrier density. At this point the current modulation pulse is timed to switch back down to the DC bias level, and the laser emission dies off quickly. The laser output therefore consists of a train of short laser pulses as shown in the lower graph.

The optical component may be driven with a 1 GHz clock rate and a 1 ns period, with a 50% duty cycle, to produce such pulses.

Other light pulse intensity profiles are possible. For example, the light pulses may be generated with at least two local maxima in the temporal intensity profile. The light pulses may have a spike-like temporal intensity profile followed by a plateau-like temporal intensity profile. The plateau-like part of the light pulse may have a longer duration than the spike-like part of the light pulse. The plateau-like part of the light pulse is emitted in a steady state and has a sharp wavelength distribution. Pulses with such intensity profiles may be generated with around a 1 MHz clock rate, corresponding to a 1 µs period and having a 90% duty cycle. Pulses emitted from the optical component with such an intensity profile will be clean optical pulses, producing good interference.

In order to generate such a light pulse, the DC bias is higher than that used to generate the light pulses in FIG. 2(b). As a result, the carrier density increases more rapidly and reaches the lasing threshold at a much earlier time. When the carrier density is above the lasing threshold, a lasing action can be triggered by a spontaneously emitted photon inside the laser cavity. Due to the time uncertainly of spontaneous emission, the carrier density can reach much higher than the lasing threshold before lasing commences.

Initially the light intensity will overshoot and quickly reduce the carrier density. This generates a spike-like part of the light pulse. The length of the delay between the application of the voltage modulation pulse and the generation of the output light depends on several parameters, such as the laser type, cavity length and AC driving current.

The reduction in the carrier density decreases the photon density in the laser cavity. As lasing is a stimulated emission process, the emission rate is proportional to the cavity photon density. Therefore, the photon emission rate is reduced to allow the re-build up of the carrier density, increasing the light intensity. This competing process causes oscillations of the light intensity. This causes the profile of the spike-like part of the light pulse, which consists of a peak. The spike-like part of the light pulse therefore comprises the initial increase, then decrease of photon density.

At the point that the photon density increases for the second time, this is the beginning of the plateau-like part. The oscillations in the photon density are strongly damped, and therefore at this point there is a steady-state emission, in which the intensity is substantially constant. In one embodiment, the intensity does not vary more than 20% of the maximum value. The laser pulse ends when the voltage pulse ends and switches the voltage to the bias value again.

FIG. 2(c) shows a schematic illustration of an electrical driving circuit for a semiconductor gain-switched laser. The semiconductor gain-switched laser is laser diode 145. The cathode of laser diode 145 is connected to bias-T 146 comprising inductor 147 and resistor or capacitor 148. Via inductor 147 a DC bias current is sent through the laser diode. This provides the gain bias, that is the minimum level of the current indicated by the dotted line in FIG. 3(b). Via resistor or capacitor 148 an AC modulation current is sent through the laser diode, providing the gain modulation needed for gain-switching the laser above and below the lasing threshold.

For the gain switched laser 24, the modulation input to the bias-T 146 is provided by second controller 141. For the coherent light source 20, the modulation input to the bias-T 146 is provided by second controller 141.

A second waveguide, for example an optical fibre, may be connected to a second aperture of the gain-switched laser 24. Thus the coherent light from the coherent light source 20 is injected through the first aperture and the generated light pulses are emitted from the second aperture in the gain-switched laser 24. The gain-switched laser apertures can be mirrors. The gain-switched laser resonator can comprise one very highly reflecting mirror and one mirror with lower reflectivity. This means that almost all of the photons inside the resonator will leave through the lower reflecting mirror. In order to cause coherence seeding, coherent light is therefore supplied to the gain-switched laser 24 through the highly reflecting mirror. The intensity of the light incident on the highly reflecting mirror must be large enough that enough light enters the laser cavity for the coherence seeding to take place. The pulses generated in the gain-switched laser 24 then exit through the mirror with lower reflectivity. The mirror with higher reflectivity is therefore the first aperture (through which coherent light is supplied) and the mirror with lower reflectivity is the second aperture (through which the emitted light pulses are emitted). Both the first and second aperture need to be accessible. This can require modifications to a laser design. The reflectivity of the mirror on which the coherent light is incident may be reduced in order to allow enough light to enter the cavity to cause laser-seeding.

Alternatively, light may be injected into and emitted from the same aperture of the gain switched laser 24. A light distribution device may be used to separate the generated emitted light pulses from the coherent light pulses.

FIG. 3(*a*) is a schematic illustration of an optical device in accordance with an embodiment, in which a light distribution device is an optical circulator 27. Coherent light source 20 is connected to port 1 of optical circulator 27 by an optical waveguide, for example an optical fibre. Port 2 of said circulator is connected to gain-switched laser 24 by an optical waveguide. Optical circulator 27 is configured such that light entering port 1 of the optical circulator 27 exits through port 2, and light entering the optical circulator 27 through port 2 exits through port 3.

Coherent light source 20 generates light 21, which travels along the optical waveguide and enters port 1 of optical circulator 27. Light 21 mainly exits through port 2 of the circulator, although a small fraction of the light may be absorbed or exit through port 3. Light 21 exits the circulator as light 23, which exits port 2 of optical circulator 27 and travels along the optical waveguide which is connected to gain-switched laser 24. Light 23 is injected into gain-switched laser 24. The gain-switched laser 24 is seeded by the coherent light and generates laser pulses which are phase coherent.

Second controller 141 applies a time varying signal to gain-switched laser 24 such that gain-switched laser 24 is switched above the lasing threshold a plurality of times during the time that coherent light 23 is incident on the gain-switched laser 24. Gain-switched laser 24 therefore emits pulses 25 into the optical waveguide connected to the gain switched laser 24, and travels along the waveguide in the opposite direction to the coherent light 23. Pulses 25 enter port 2 of the optical circulator 27 and exit port 3 of the optical circulator 27 into an optical waveguide, for example an optical fibre.

FIG. 3(*b*) is a schematic illustration of an optical device in accordance with an embodiment, in which the light distribution device is an optical beam splitter 28. Coherent light source 20 is connected to a port of an optical isolator 29 by an optical waveguide, such as an optical fibre. A second port of optical isolator 29 is connected to port A of beam splitter 28 by a second optical waveguide, such as an optical fibre. Optical isolator is configured to allow light to pass which enters via the first port, but to prevent light from passing which enters via the second port. In an alternative embodiment that does not comprise an optical isolator, the output of the coherent light source is directly connected to port A of beam splitter 28 by a single optical waveguide such as an optical fibre. An optical waveguide such as an optical fibre connects port C of the beam splitter 28 to gain-switched laser 24.

Coherent light source 20 emits coherent light 21. A first fraction of the light entering beam splitter 28 through port A exits through port C of the beam splitter. A second fraction entering the beam splitter 28 through port A exits through port D of the beam splitter. The first fraction of coherent light 23 that exits port C travels along the optical waveguide and is injected into the gain-switched laser 24. A second controller 141 applies a time varying current to the gain-switched laser 24, and coherence seeding occurs as described previously. The light pulses 25 generated by gain-switched laser 24 are emitted back into the optical waveguide, and travel along the waveguide in an opposite direction to the coherent light 23. The light pulses 25 enter beam splitter 28 through port C. A first fraction of the light pulses exits the beam splitter 28 through port A and a second fraction exits through port B. The output from port B is equivalent to the output of the device described in FIG. 1.

The first fraction of the emitted light pulses exiting said beam splitter through port A is stopped at optical isolator 29. Optical isolator 29 therefore prevents light emitted from gain-switched laser 24 from entering coherent light source 20 and causing a disturbance in said light source. The output at port D of beam splitter 28 can be used for monitoring purposes.

In an alternative embodiment, the optical component 24 is an optical amplifier 24. In one embodiment, optical amplifier 24 is a semiconductor optical amplifier (SOA). The optical amplifier 24 is controlled by the second controller 141. The second controller 141 controls the emission time of the light pulses from the optical amplifier 24. The coherent light source 20 supplies coherent light to the optical amplifier 24. During a period when the coherent light is supplied, the second controller 141 switches the optical amplifier 24 into an "on" state for a plurality of periods, such that the optical device 35 can output light pulses.

The second controller 141 switches the optical amplifier 24 between an "on" state and an "off" state by applying a time-varying signal. The optical amplifier 24 is therefore gain-switched. The threshold is the point at which the second signal applied by the second controller 141 switches the optical amplifier into an "on" state.

In order to modulate the gain of a SOA 24, the second controller 141 applies a time varying signal, for example a time varying current which may have the form of a series of current modulation pulses. When a current modulation pulse is applied to the SOA 24, the injected carriers increase the carrier density and light inputted into the SOA 24 is amplified sufficiently by stimulated emission to generate an output. At this point the current modulation pulse is timed to switch back down to the DC bias level, and the output dies off quickly. The output therefore consists of a train of emitted light pulses.

When the SOA 24 is switched into an "on" state, the incident coherent light is amplified and emitted from the SOA 24. When the SOA 24 is switched into an "off" state, incoming light is absorbed. A second waveguide, for example an optical fibre is connected to a second aperture of the optical amplifier 24.

Coherent light source 20 generates a light which enters SOA 24. The second controller 141 applies the time varying current to SOA 24 such that SOA 24 is switched into an "on" state for periods of time and switched into an "off" state for the periods between the "on" periods. The duration of the periods of time for which the SOA 24 is in an "off" state may be longer than the duration of the periods of time for which the SOA 24 is in an "on" state. In one embodiment, the duration of each of the emitted light pulses is greater than 200 ps. In one embodiment, the duration of each of the emitted light pulses is greater than 10 ns.

As for the case when the optical component is a semiconductor gain-switched laser, a first pair of pulses emitted from SOA 24 when a first coherent light pulse is incident and a second pair of pulses emitted from SOA 24 when a second coherent light pulse is incident with the same difference in emission time have a fixed phase relation. The phase difference between the first pair of pulses is the same as the phase difference between the second pair of pulses. However, the phase difference between two pulses emitted during periods when different long light pulses were incident is random.

The SOA 24 may be switched into the "on" state multiple times during the period when coherent light is incident, generating a pulse sequence of coherent laser pulses. All of the pulses emitted during a period when the same coherent light is incident have a fixed phase relation.

Alternatively, the optical component 24 may be an intensity modulator 24. An intensity modulator modulates the intensity of incoming light pulses. In an "off" state, the intensity modulator reduces the intensity of the light to a low level. In an "on" state, the intensity modulator allows a larger fraction of the incoming light to exit. The intensity modulator is switched between an "on" state and an "off" state a plurality of times when the light from the coherent light source is present in order to generate light pulses. As for the case when the optical component is a semiconductor gain-switched laser, a first pair of pulses emitted from intensity modulator 24 when a first coherent light pulse is incident and a second pair of pulses emitted from intensity modulator 24 when a second coherent light pulse is incident have a fixed phase relation. The phase difference between the first pair of pulses is the same as the phase difference between the second pair of pulses. However, the phase difference between two pulses emitted during periods when different long light pulses were incident is random.

An intensity modulator may modulate the intensity of the light by changing the absorption coefficient of the material in the modulator, for example an electro-absorption modulator. An electro-absorption modulator is a semiconductor device for which the voltage applied to the device changes the absorption coefficient, and therefore the intensity of light travelling through the device. In another embodiment the intensity modulator is based on a Mach-Zehnder interferometer. A Mach-Zehnder based intensity modulator changes the phase difference between the two arms of the interferometer to modulate the output intensity.

Phase modulation can be performed by controlling the phase of the light generated by the coherent light source 20 with the phase control element 125. Coherent light source 20 may generate light pulses. The phase of a second part of the light pulse 121 generated by coherent light source 20 may be modulated with respect to the first part of the light pulse by phase control element 125. Alternatively, the phase control element can apply phase modulation a plurality of times during a period when one light pulse is generated. Alternatively, the coherent light source 20 may generate CW coherent light. In this case, periods may be defined, and the phase of the part of the CW light emitted during each period can be modulated with respect to the phase of the part of the CW light emitted during the previous period.

Phase control element 125 may apply a perturbation to the coherent light source 20 at regular intervals. Where the coherent light source 20 is configured to generate pulsed coherent light, the perturbations may be timed to occur substantially halfway through the generation of each light pulse. The perturbation changes the phase between parts of the coherent light, producing a certain phase difference between a first part of the coherent light and a second part of the coherent light. The perturbation is controlled, in other words, the same perturbation will always cause the same phase shift. The amplitude of the perturbation that is applied affects the phase shift that is generated.

The coherent light source 20 may be a semiconductor laser, for which the phase change is applied by applying a short current pulse to the coherent light source 20 during the time that the coherent light is generated. The perturbation is thus a current pulse.

Coherent light sources other than semiconductor lasers may have other means to modulate the phase of the long light pulse. Thus in other embodiments, means other than an applied current are used to modulate the phase of the coherent light pulse. These means include increasing the pumping power for a short time during the long pulse emission. For a fibre laser, an optical pulse added to the optical pump signal can be used to modulate the phase of the long light pulse.

The phase change between adjacent parts of the coherent light may not be an abrupt transition, but may occur over a portion of the light. The second signal is controlled such that light pulses are not generated when a transition portion of the light is present in the optical component 24.

The first controller 140 is configured to apply a first signal to the coherent light source 20 so that the coherent light source generates coherent light.

The phase control element 125 is configured apply perturbations to the first signal, each perturbation producing a phase shift between parts of the generated coherent light.

The generated coherent light is supplied to the optical component 24. The second controller 141 is configured to apply the second signal to the optical 24 such that a light pulse is emitted during a period of time that a first part of the generated light is received, and a light pulse is emitted during a period of time that a second part of the generated light is received.

In an embodiment, the first controller is configured to apply the first signal to said coherent light source such that said coherent light source generates continuous wave coherent light. FIG. 4(a) shows the form of the first signal applied to the coherent light source 20 by the first controller 140 in order to generate continuous wave light.

The first signal may be a DC current applied to the coherent light source 20, where the coherent light source 20 is a semiconductor laser.

FIG. 4(b) shows the first signal applied to the coherent light source 20 when modified by phase control element 125. A perturbation is added to the signal at regular intervals. The amplitude of the perturbation is varied to control the phase shift that is generated.

The perturbation may be a smaller current pulse added to the signal. The current pulse is timed such that it is applied at regular intervals. The phase control element can be a separate element that generates the smaller current pulses, which are then combined with the DC current signal shown in FIG. 4(a).

For each perturbation, the direction of flow of electric charge in the current pulse may be the same as that of the first signal, or opposite. Thus each current pulse may increase the amplitude of the first signal or decrease the amplitude of the first signal, by varying amounts. This corresponds to phase shifts in opposite directions, for example, a current pulse which increases the amplitude of the first signal by a first amount corresponds to a phase shift of +θ, a current pulse which decreases the amplitude of the first signal by the first amount corresponds to a phase shift of −θ.

A first part of the coherent light is generated corresponding to a first part of the first signal. A second part of the coherent light is generated corresponding to a second part of the first signal. The second part of the first signal may be the part after a perturbation is applied for example. The second part of the first signal may be the part after several further perturbations have been applied. Thus the first and second part may be adjacent parts or may be any parts of the signal.

The "parts" of the first signal are the parts between the perturbations. The parts of the coherent light are the parts generated between each perturbation. Thus the applied perturbations segment the generated coherent light into parts, each part being shifted in phase compared to the previously generated part by the applied perturbation.

FIG. 4(c) shows the second signal applied to optical component 24 by the second controller 141. The second signal may be a current for example. The signal comprises a square wave, of a magnitude such that the optical component 24 is switched periodically above the threshold, i.e. into an "on" or lasing state. The first pulse is applied when a first part of the coherent light is present. The first pulse is timed such that the optical component 24 is switched above the threshold during the section of the time when each part of the coherent light is present in the optical component 24.

The perturbation applied to the first signal and the signal applied to the optical component 24 can be synchronised in order that the timing of the generation of the light pulses at the optical component corresponds to the times when the parts of the coherent light is present.

The output laser pulses are shown in FIG. 4(d). The square pulses are timed such that one light pulse is emitted during the time that a first part of the coherent light is incident, a second is emitted during the time that a second part of the coherent light is incident, and so on. The required length of the square pulses will depend on several parameters, such as the laser type, cavity length and pumping power.

The phase difference between the first pulse and second pulse is $\varphi_1$, the phase difference between the second pulse and third pulse is $\varphi_2$, the phase difference between the third pulse and the fourth pulse is $\varphi_3$ and so on. The phase differences between the pulses are determined by the phase modulation applied by the phase control element 125.

In an embodiment, the first signal is a periodic signal and the coherent light source generates pulses of coherent light. The phase control element is configured to apply a perturbation to the first signal once each period, producing a phase shift between a first part of the generated coherent light pulse and a second part of the generated coherent light pulse.

The second controller 141 applies a periodic second signal to the optical component 24. The periodic signal may be a periodic current for example. The second signal switches the optical component 24 above the threshold once during the period when the first part of each coherent light pulse is present, such that a pulse is emitted from the optical component 24. The second signal also switches the optical component 24 above the threshold once during the period when the second part of each coherent light pulse is present, such that a second pulse is emitted. The phase difference between the each pulse in the pair of pulses is determined by the phase shift applied to the second part of the coherent light pulse. For the first set of pulses emitted from the optical component 24 driven as shown in FIG. 5, the phase difference between the pulses is $\phi_1$. For the second set of pulses, the phase difference between the two pulses is $\phi_2$ and so on.

FIG. 5(a) shows the form of the first signal applied to the coherent light source 20. The signal has the form of a series of square type pulses, where the duration of the periods between the pulses is shorter than the duration of the pulses. The signal can be formed by combining an AC current with a DC bias current via a bias-T for example.

FIG. 5(b) shows the first signal applied to the coherent light source 20 when modified by phase control element 125. A perturbation is applied to the first signal once each period, at around the midpoint of each signal pulse, producing a phase shift between a first part of the generated coherent light pulse and a second part of the generated coherent light pulse.

The perturbation may comprise a smaller current pulse added through the AC input of the bias tee for example. The current pulse is timed such that it coincides with the midpoint of the upper section of one of the square pulses. The phase control element can be a separate element that generates the smaller current pulses, which are then combined with the square pulse AC signal shown in FIG. 5(a). The combined signal is then inputted to the AC input of the bias tee.

Again, for each perturbation, the direction of flow of electric charge in the current pulse may be the same as that of the first signal, or opposite. Thus each current pulse may increase the amplitude of the first signal or decrease the amplitude of the first signal, by varying amounts. This corresponds to phase shifts in opposite directions, for example, a current pulse which increases the amplitude of the first signal by a first amount corresponds to a phase shift of +θ, a current pulse which decreases the amplitude of the first signal by the first amount corresponds to a phase shift of −θ.

FIG. 5(c) shows the second periodic signal applied to optical component 24 by the second controller 141. The signal comprises a square wave, of a magnitude such that the optical component 24 is switched periodically above the threshold. The first pulse is applied when the first part of the coherent light pulse is present. The first pulse of the second signal is timed such that the optical component 24 is switched above the threshold during the section of the time when the first part of the coherent light pulse is present in the optical component 24. The second pulse of the second signal is timed such that the optical component 24 is switched above the threshold during the section of the time when the second part of the coherent light pulse is present. The first signal applied to the coherent light source 20 and second signal applied to the optical component 24 can be synchronised in order that the timing of the generation of the emitted pulses corresponds to the time when the correct section of the coherent light pulse is present. For example, both signals can be synchronised to a master clock signal.

The emitted laser pulses are shown in FIG. 5(d). The square pulses of the second signal are timed such that one light pulse is emitted during the time that the first part of the coherent light pulse is incident, and a second is emitted during the time that the second half of the coherent light pulse is incident. The required length of the square pulses of the second signal will depend on several parameters, such as the laser type, cavity length and pumping power.

Where the coherent light source 20 is a semiconductor gain-switched laser, a driving circuit applies a time varying current such that the coherent light source 20 is switched periodically above the lasing threshold, generating light pulses. The current applied to the coherent light source 20 has the form of a series of current modulation pulses. The current may not be reduced to zero in between the current modulation pulses, but only to a bias value. The coherent light source 20 outputs light when the carrier density is above the lasing threshold. To generate longer pulses, the gain bias is chosen to be closer to the lasing threshold. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. The laser pulse ends when the current pulse ends and switches the current to the bias value again.

In one embodiment, the duration of each of the long light pulses is greater than or equal to 200 ns. In one embodiment, the period between the long light pulses is greater than or equal to 100 ns.

The optical component 24 is switched above the threshold twice during the time that the coherent light pulse is incident, emitting two light pulses.

Each time the optical component 24 is switched above the threshold, the emitted light pulse has a fixed phase relation to the injected coherent light. The optical component 24 is switched above the threshold twice during the time that each coherent light pulse is incident, therefore two coherent emitted light pulses with the same difference between the emission time of each pulse are generated each time a coherent light pulse is incident. A first pair of light pulses (pulse 1 and pulse 2) is generated during a period when a first coherent light pulse is incident. A second pair of light pulses (pulse 3 and pulse 4) is generated when a second coherent light pulse is incident and a third pair of pulses (pulse 5 and pulse 6) is generated when a third coherent light pulse is incident. Pulse 1 and pulse 2 are intra-period. Pulse 3 and pulse 4 are intra-period. Pulse 5 and pulse 6 are intra-period.

The phase difference between the first pair of pulses is $\varphi_1$, the phase difference between the second pair of pulses is $\varphi_2$ and the phase difference between the third pair of pulses is $\varphi_3$. The phase differences between the intra-period pulses is determined by the phase modulation applied by the phase control element 125.

Pulse 1 and pulse 3 are inter-period, pulse 2 and pulse 3 are inter-period, pulse 4 and pulse 5 are inter-period, pulse 1 and pulse 6 are inter-period. The phase difference between two inter-period pulses (pulse 2 and pulse 3 for example) is not fixed, and is random. For example, the phase difference between pulse 2 and pulse 3 has a random relationship to the phase difference between pulse 4 and pulse 5.

One of the light pulses in each pair is designated as the signal light pulse, the other light pulse is designated the reference light pulse. The first pulse in each pair may be designated as the signal pulse, in order to avoid noise from the reference pulse affecting the signal pulse.

For a coherent light source such as a semiconductor gain-switched laser, the coherent light pulses generated exhibit a frequency chirp at the front of the pulse due to the change of the index of refraction inside the laser cavity related to the changing carrier density. For coherence seeding therefore the middle part of the long pulses may be used, where the laser is emitting in steady-state. Emitted light pulses from the optical component 24 are therefore not emitted when the start of the coherent light pulse is supplied.

In an embodiment, the first controller is configured to apply the first signal to said coherent light source 20 such that said coherent light source 20 generates continuous wave coherent light. The phase control element 125 is configured to apply perturbations such that alternate perturbations cancel the previous phase shifts. The phase difference between the light pulses emitted during the periods of time that the parts of the generated light corresponding to the alternate perturbations are received is substantially zero.

FIG. 6(*a*) shows the form of the first signal applied to the coherent light source 20 by the first controller 140 in order to generate continuous wave light.

The first signal may be a DC current applied to the coherent light source 20, where the coherent light source 20 is a semiconductor laser.

FIG. 6(*b*) shows the first signal applied to the coherent light source 20 when modified by phase control element 125. A perturbation is added to the signal at regular intervals. The amplitude of the perturbation is varied to control the phase shift that is generated.

The perturbation may be a current pulse added to the signal. The current pulse is timed such that it is applied at regular intervals. The phase control element can be a separate element that generates the current pulses, which are then combined with the DC current signal shown in FIG. 4(*a*).

The perturbations form pairs. Each pair of perturbations comprises a first perturbation and a second perturbation of equal and opposite magnitude. Every other perturbation, i.e. alternate perturbations cancel the previous applied phase shift.

Where the perturbation is a current pulse, the first perturbation may be a positive current pulse of a first magnitude, and the second perturbation a negative current pulse of the first magnitude, the third perturbation a positive current pulse of a second magnitude and the fourth perturbation a negative current pulse of the second magnitude, the fifth perturbation a negative current pulse of a third magnitude and the sixth perturbation a positive current pulse of the third magnitude and so on.

Thus for each pair of perturbations, the direction of flow of electric charge in the current pulse is opposite and the magnitude is the same. Thus each pair of current pulses increases the amplitude of the first signal and then decreases the amplitude of the first signal, by the same amount. This corresponds to phase shifts in opposite directions, for example, the first current pulse increases the amplitude of the first signal by a first amount corresponding to a phase shift of $+\theta$, the next current pulse in the pair decreases the amplitude of the first signal by the first amount, corresponding to a phase shift of $-\theta$.

A first part of the coherent light is generated corresponding to a first part of the first signal. A second part of the coherent light is generated corresponding to a second part of the first signal. The second part of the first signal may be the part after a perturbation is applied for example. The second part of the first signal may be the part after several further perturbations have been applied. The parts of the first signal are the parts between the perturbations. The parts of the coherent light are the parts generated after each perturbation. Thus the applied perturbations segment the generated coherent light into parts, each part being shifted in phase compared to the previously generated part by the applied perturbation. The phase shift applied to each alternate part cancels that applied to the previous part.

FIG. 6(*c*) shows the second signal applied to optical component 24 by the second controller 141. The second signal may be a current for example. The second signal comprises a square wave, of a magnitude such that the optical component 24 is switched periodically above the threshold, i.e. into an "on" or lasing state. The first pulse is applied when a first part of the coherent light is present. The first pulse is timed such that the optical component 24 is switched above the threshold during the section of the time when the first part of the coherent light is present in the optical component 24. The second pulse is timed such that the optical component is switched above the lasing threshold during the section of the time when a second part of the coherent light is present and so on.

The perturbation applied to the first signal and the signal applied to the optical component 24 can be synchronised in order that the timing of the generation of the light pulses at the optical component corresponds to the times when the parts of the coherent light is present.

The output laser pulses are shown in FIG. 6(d). The square pulses are timed such that one light pulse is emitted during the time that a first part of the coherent light is incident, a second is emitted during the time that a second part of the coherent light is incident, and so on. The required length of the square pulses will depend on several parameters, such as the laser type, cavity length and pumping power.

The phase difference between the light pulses emitted during the periods of time that the parts of the generated light corresponding to the alternate perturbations are received is substantially zero.

The phase difference between the first pair of pulses is $\varphi_1$, the phase difference between the second pair of pulses is $\varphi_2$ and the phase difference between the third pair of pulses is $\varphi_3$. The phase differences between the intra-period pulses is determined by the phase modulation applied by the phase control element 125.

The phase difference between the first pulse and the third pulse is substantially 0. The phase difference between the third pulse and the fifth pulse is substantially 0. Alternate pulses have a phase difference of substantially zero.

In general, the length of the emitted pulses depends on the length of the optical pulses coming from the coherent light source 20.

Figure 6E:
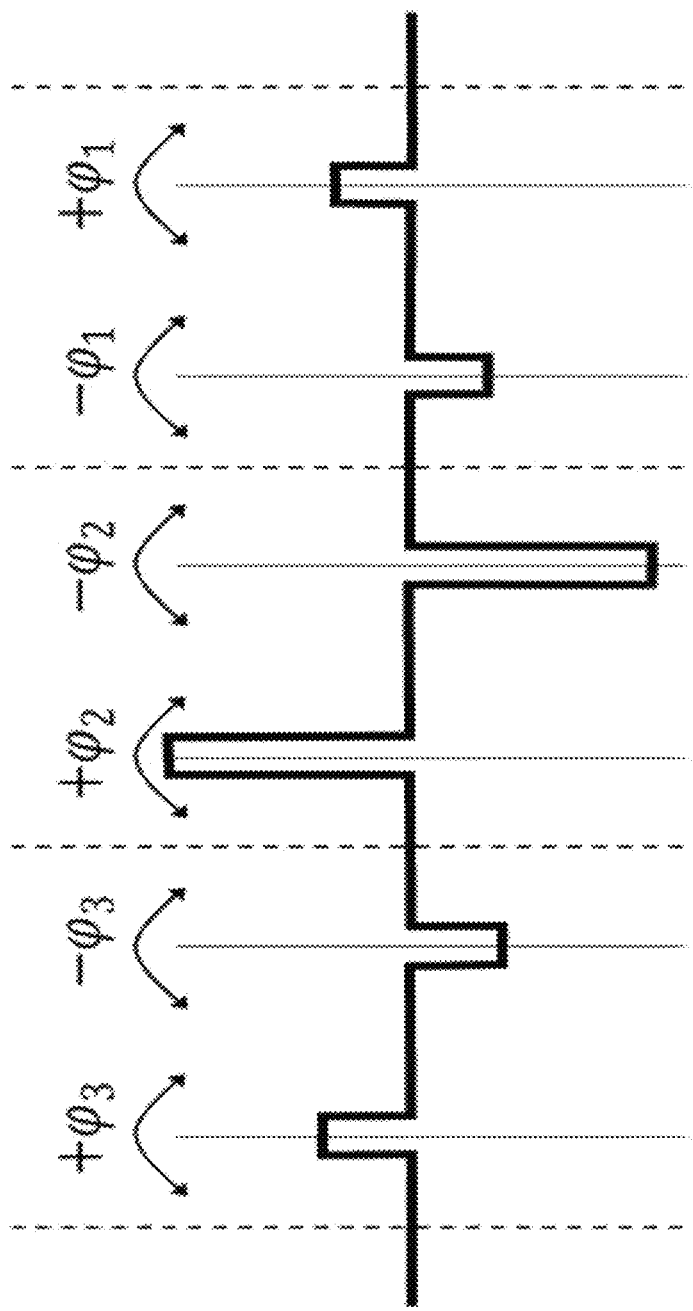
FIG. 6(e) is a schematic illustration of the first signal, modulated by the phase control element.

FIG. 6(e) shows another example of the first signal applied to the coherent light source, where the alternate perturbations cancel the previous phase shifts. The phase difference between the parts of the coherent light corresponding to the parts of the first signal separated by the perturbations are shown. The first perturbation applies a phase shift of $+\psi_1$, the second perturbation applies a phase shift of $-\psi_1$, the third perturbation applies a phase shift of $-\psi_2$, the fourth perturbation applies a phase shift of $+\psi_2$, the fifth perturbation applies a phase shift of $-\psi_3$, the fourth perturbation applies a phase shift of $+\psi_3$, and so on.

Figure 7:
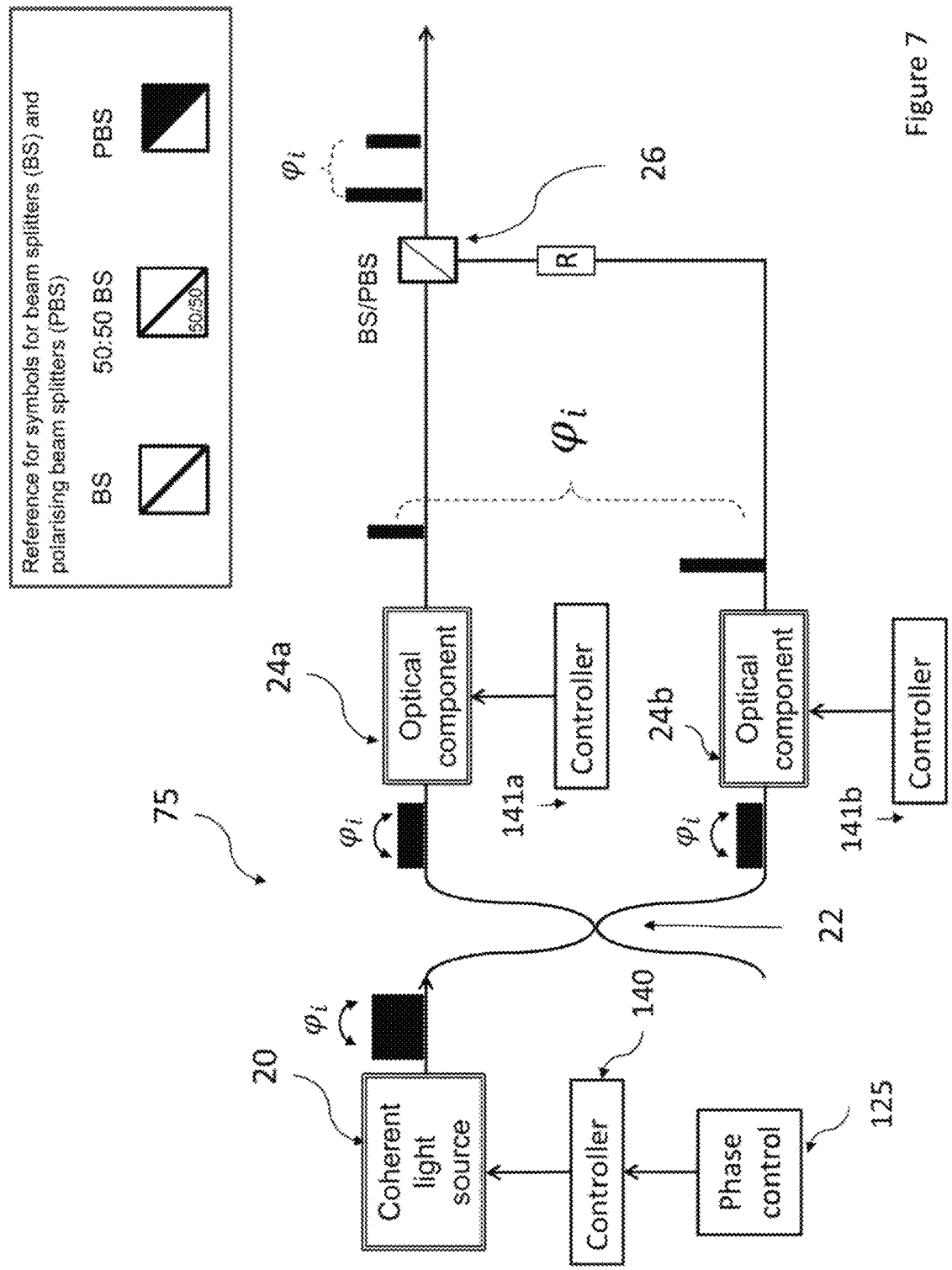
FIG. 7 is a schematic illustration of an optical device in accordance with an embodiment, comprising two optical components.

FIG. 7 is a schematic illustration of an optical device 75 in accordance with an embodiment. The optical device 75 is configured to output light pulses.

The symbols used generally throughout the figures to represent a beam splitter, a 50:50 beam splitter and a polarising beam splitter are also shown in the figure, as a reference.

The optical device 75 comprises a coherent light source 20 optically coupled to a first optical component 24a and a second optical component 24b.

The coherent light source 20 may be coupled to the first optical component 24 and the second optical component via a beam splitter 22.

Further components such as the optical circulator or further beam splitter described in relation to FIGS. 3(a) and 3(b) may couple the coherent light source 20 to the first component 24a. Further components such as the optical circulator or further beam splitter described in relation to FIGS. 3(a) and 3(b) may couple the coherent light source 20 to the second component 24b.

In an embodiment, the first optical component 24a is a gain-switched laser. In one embodiment, the gain-switched laser 24a is a semiconductor laser. In an alternative embodiment, the gain-switched laser 24a is a fibre laser. Alternatively, the first optical component 24a may be an intensity modulator or an optical amplifier.

In an embodiment, the second optical component 24b is a gain-switched laser. In one embodiment, the gain-switched laser 24b is a semiconductor laser. In an alternative embodiment, the gain-switched laser 24b is a fibre laser. Alternatively, the second optical component 24b may be an intensity modulator or an optical amplifier.

The optical device 75 comprises a first controller 140, configured to apply a first signal to said coherent light source 20 such that said coherent light source 20 generates coherent light.

The optical device 75 further comprises a phase control element 125, configured to apply perturbations to the first signal. The phase control element 125 is configured apply perturbations to the first signal, each perturbation producing a phase shift between parts of the generated coherent light.

The generated coherent light is supplied to the first optical component 24a. A second controller 141a is configured to apply a second signal to the first optical component 24a such that a light pulse is emitted during a period of time that a first part of the generated light is received. The second signal is a time varying signal which causes light pulses to be emitted from the optical component 24a every time the second signal switches above a threshold. These light pulses are then emitted from the optical device 75.

The generated coherent light is also supplied to the second optical component 24b. A third controller 141b is configured to apply a third signal to the second optical component 24b such that a light pulse is emitted during a period of time that a second part of the generated light is received. The third signal is a time varying signal which causes light pulses to be emitted from the second optical component 24b every time the second signal switches above a threshold. These light pulses are then emitted from the optical device 75.

The first controller, second controller and third controller may be synchronised, for example by a master clock signal.

In operation, the coherent light source 20 generates coherent light. The coherent light is emitted from coherent light source 20 and enters the beam splitter 22. The beam splitter splits the coherent light between the first optical component 24a and the second optical component 24b.

Coherent light from coherent light source 20 enters the first optical component 24a. Second controller 141a applies a time varying signal to first optical component 24a such that a plurality of light pulses are emitted.

Each time the first optical component 24a is switched above the threshold, the emitted light pulse has a fixed phase relation to the injected coherent light.

Coherent light from coherent light source 20 also enters the second optical component 24b. Third controller 141b applies a time varying signal to second optical component 24b such that a plurality of light pulses are emitted.

Each time the second optical component 24b is switched above the threshold, the emitted light pulse has a fixed phase relation to the injected coherent light.

The phase difference between a light pulse emitted from the first optical component 24a and a light pulse emitted from the second optical component 24*b* is thus the same as the phase difference between the part of the coherent light present when the light pulse was emitted from the first optical component 24*a* and the part of the coherent light present when the light pulse was emitted from the second optical component 24*b*.

The output from the first optical component 24*a* and the second optical component 24*b* may be combined onto a single waveguide. The optical device may comprise a beam splitter 26 which combines the two outputs. The optical device 75 thus comprises two "arms", formed by the beam splitter 22 and the beam splitter 26. A first arm comprises the first optical component 24*a* and a second arm comprises the second optical component 24*b*.

The light pulses emitted from the first optical component 24*a* and the light pulses emitted from the second optical component 24*b* are emitted during a time period that a different part of the coherent light is present. The output from the first optical component 24*a* is thus displaced in time from the output of the second optical component 24*b* when combined on a single waveguide. Alternatively, a delay component may be included on one of the arms of the optical device. The delay component may increase or reduce the displacement in time between the light pulses emitted from the first optical component 24*a* and the light pulses emitted from the second optical component 24*b*. The delay component may shift the outputs by one or more times the period of the light pulses. Thus the time delay between output pulses corresponding to adjacent parts of the coherent light pulses can be zero or non-zero. Furthermore, the point at which the pulses are emitted during period when the part of the coherent light is present can be used to tune the time delay between the pulses. The time delay between the pulses in the output waveguide is thus determined by the propagation times in the waveguides before and after the optical components, and it can be fine-tuned by shifting the electrical driving signals.

The beam splitter 26 may be a polarising beam splitter and a 90° polarisation rotator may be included in one arm. The emitted pulses from the optical components will therefore have orthogonal polarisation in the output waveguide. In this case, when the output from the first optical component 24*a* and the output from the second optical component 24*b* are combined, they will have orthogonal polarisation. If the time delay between a pulse from the first optical component 24*a* and a pulse from the second optical component 24*b* is set to zero, and the intensity of the two pulses is the same, the device emits a single pulse with a polarisation which can be set by the phase perturbation in the coherent light source. The resulting polarisation depends on the phase difference between the two pulses entering the beam splitter 26. The beam splitter 22, the two arms and the beam splitter 26 form a balanced Mach-Zehnder interferometer, whose output depends on the phase difference between the two arms.

Generally, a polarising beam splitter 26 itself may rotate the polarisation of one of the inputs, in which case a separate rotator need not be included. Alternatively, the optical fibre for one arm may be connected to the polarising beam splitter with an angle of 90 degrees, again meaning that a separate rotator need not be included.

In this device, a coherent light source 20, for example a "master laser, is coupled to two optical components, for example, "slave" lasers via a beam splitter 22. The coherent light source 20 generates light which is phase modulated by applying a perturbation, for example in the middle of a coherent light pulse. This is to generate a phase shift between parts of the coherent light. The optical components are each driven with a signal, for example a periodic electrical signal to generate optical pulses. A second controller 141*a* ensures that the first optical component 24*a* generates a pulse during the time it receives a first part of the coherent light, and a third controller 141*b* ensures that the second optical component 24*b* generates a pulse during the time it receives a second part of the coherent light. The second controller 141*a* and the third controller 141*b* may be a single component for example. The first controller 140 may also be integrated with this component.

Two pulses emitted by the two optical components during a period when a single coherent light pulse is present have a fixed phase relation with a phase difference that is determined by the phase perturbation applied to the coherent light source. The output of first optical component 24*a* and second optical component 24*b* may then be coupled into a single output waveguide with a beam splitter 26.

Additional elements can be included such as intensity modulators, for example slow attenuators or fast modulators and/or polarisation controllers before or after each of the first optical component 24*a* and the second optical component 24*b*.

The emitted pulses from the optical components may have different intensities. The intensity of the two pulses can be set separately, by controlling the amplitude of the second signal and third signal, or by including intensity modulators on one or both arms for example. Alternatively, the beam splitter 22 may be an unequal beam splitter, and may inject more coherent light into second optical component 24*b*, for example, allowing a fixed intensity difference to be set between the outputs of the first optical component 24*a* and the second optical component 24*b*.

The optical device 75 may comprise further optical components. The coherent light source 20 may supply light to the further optical components, through a 1×N coupler for example.

In an embodiment, the first signal is a periodic signal and the coherent light source generates pulses of coherent light. The phase control element is configured to apply a perturbation to the first signal once each period, producing a phase shift between a first part of the generated coherent light pulse and a second part of the generated coherent light pulse.

The second controller 141*a* applies a periodic second signal to the first optical component 24*a*. The periodic signal may be a periodic current for example. The second signal switches the optical component 24 above the threshold once during the period when the first part of each coherent light pulse is present, such that a pulse is emitted from the optical component 24.

The third controller 141*b* applies a periodic third signal to the second optical component 24*b*. The periodic signal may be a periodic current for example. The third signal switches the second optical component 24*b* above the threshold once during the period when the second part of each coherent light pulse is present, such that a second pulse is emitted.

The phase difference between the each pulse in the pair of pulses is determined by the phase shift applied to the second part of the coherent light pulse. For the first set of pulses emitted from first optical component 24*a* and the second optical component 24*b* shown in FIG. 8(*a*), the phase difference between the pulses is $\phi_1$. For the second set of pulses, the phase difference between the two pulses is $\phi_1'$ and so on.

FIG. 8(*a*) shows the form of the first signal applied to the coherent light source 20 when modified by phase control element 125. A perturbation is applied to the first signal once each period, at around the midpoint of each signal pulse, producing a phase shift between a first part of the generated coherent light pulse and a second part of the generated coherent light pulse. The signal has the same form described in relation to FIGS. 5(a) and (b).

FIG. 8(a) also shows the second periodic signal applied to first optical component 24a by the second controller 141a. The signal comprises a square wave, of a magnitude such that the first optical component 24a is switched periodically above the threshold. The pulses are applied when the first part of the coherent light pulse is present. The first pulse of the second signal is timed such that the first optical component 24a is switched above the threshold during the section of the time when the first part of the coherent light pulse is present in the first optical component 24a.

FIG. 8(a) also shows the third periodic signal applied to second optical component 24b by the third controller 141b. The signal comprises a square wave, of a magnitude such that the optical component 24 is switched periodically above the threshold. The pulses of the second signal are timed such that the second optical component 24b is switched above the threshold during the section of the time when the second part of the coherent light pulse is present.

The first signal applied to the coherent light source 20, the second signal applied to the first optical component 24a and the third signal applied to the second optical component 24b can be synchronised in order that the timing of the generation of the emitted pulses corresponds to the time when the correct section of the coherent light pulse is present. For example, both signals can be synchronised to a master clock signal.

Each time the optical component 24 is switched above the threshold, the emitted light pulse has a fixed phase relation to the injected coherent light. The first optical component 24a is switched above the threshold once during the time that each coherent light pulse is incident, and the second optical component 24b is switched above the threshold once during the time that each coherent light pulse is incident. There is a delay between the time that the first optical component is switched above the threshold and the time that the second optical component 24b is switched above the threshold. Therefore two coherent emitted light pulses with the same difference between the emission time of each pulse are generated each time a coherent light pulse is incident on the two optical components. A first pair of light pulses (pulse 1 and pulse 2) is generated during a first period when a first coherent light pulse is incident. A second pair of light pulses (pulse 3 and pulse 4) is generated when a second coherent light pulse is incident and a third pair of pulses (pulse 5 and pulse 6) is generated when a third coherent light pulse is incident. Pulse 1 and pulse 2 are intra-period. Pulse 3 and pulse 4 are intra-period. Pulse 5 and pulse 6 are intra-period.

The phase difference between the first pair of pulses is $\varphi_1$, the phase difference between the second pair of pulses is $\varphi_1'$ and the phase difference between the third pair of pulses is $\varphi_1''$. The phase differences between the intra-period pulses is determined by the phase modulation applied by the phase control element 125.

Pulse 1 and pulse 3 are inter-period, pulse 2 and pulse 3 are inter-period, pulse 4 and pulse 5 are inter-period, pulse 1 and pulse 6 are inter-period. The phase difference between two inter-period pulses (pulse 2 and pulse 3 for example) is not fixed, and is random. For example, the phase difference between pulse 2 and pulse 3 has a random relationship to the phase difference between pulse 4 and pulse 5.

In an embodiment, the first controller is configured to apply the first signal to said coherent light source 20 such that said coherent light source 20 generates continuous wave coherent light. FIG. 8(b) shows the form of the first signal applied to the coherent light source 20 by the first controller 140 in order to generate continuous wave light when modified by phase control element 125. A perturbation is added to the signal at regular intervals. The amplitude of the perturbation is varied to control the phase shift that is generated. The first signal corresponds to that shown in FIGS. 4(a) and (b).

A first part of the coherent light is generated corresponding to a first part of the first signal. A second part of the coherent light is generated corresponding to a second part of the first signal. The second part of the first signal may be the part after a perturbation is applied for example. The second part of the first signal may be the part after several further perturbations have been applied.

FIG. 8(b) also shows the second signal applied to first optical component 24a by the second controller 141a. The signal comprises a square wave, of a magnitude such that the first optical component 24a is switched periodically above the threshold, i.e. into an "on" or lasing state. A first pulse is applied when a first part of the coherent light is present. The first pulse is timed such that the optical component 24a is switched above the threshold during the section of the time when the first part of the coherent light is present in the optical component 24. A pulse is applied to the first optical component 24a corresponding to the time when every other part of the coherent light is present.

FIG. 8(b) also shows the third signal applied to second optical component 24b by the third controller 141b. The signal comprises a square wave, of a magnitude such that the second optical component 24b is switched periodically above the threshold, i.e. into an "on" or lasing state. A first pulse is applied when a second part of the coherent light is present. The first pulse is timed such that the second optical component 24b is switched above the threshold during the section of the time when the second part of the coherent light is present in the second optical component 24b. A pulse is applied to the second optical component 24a corresponding to the time when every other part of the coherent light is present, i.e. the alternate parts to the pulses applied to the first optical component 24a.

The perturbation applied to the first signal, the second signal and the third signal can be synchronised in order that the timing of the generation of the light pulses at the optical components corresponds to the times when the correct parts of the coherent light are present.

The phase difference between the first pulse emitted from the first optical component 24a and first pulse emitted from the second optical component 24b, i.e. the second pulse emitted from the device is $\varphi_2$. The phase difference between the second pulse and third pulse is $\varphi_3$, the phase difference between the third pulse and the fourth pulse is $\varphi_4$ and so on. The phase differences between the pulses is determined by the phase modulation applied by the phase control element 125.

Further combinations of phase modulation patterns and pulse emission from the two or more optical components are possible.

Figure 9A:
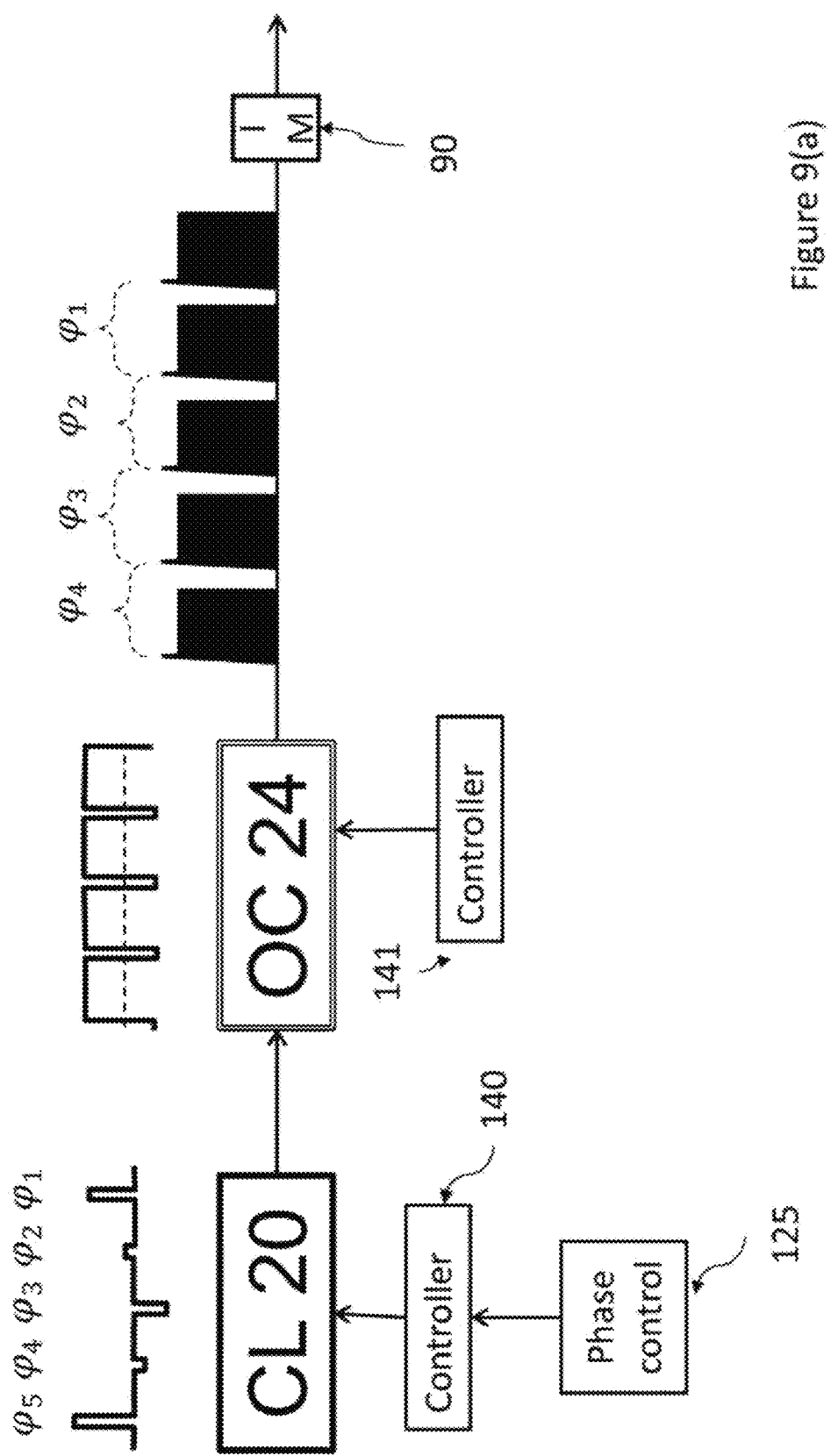
FIG. 9(a) is a schematic illustration of a transmitter for a continuous variable quantum communication system in accordance with an embodiment.
Figure 9B:
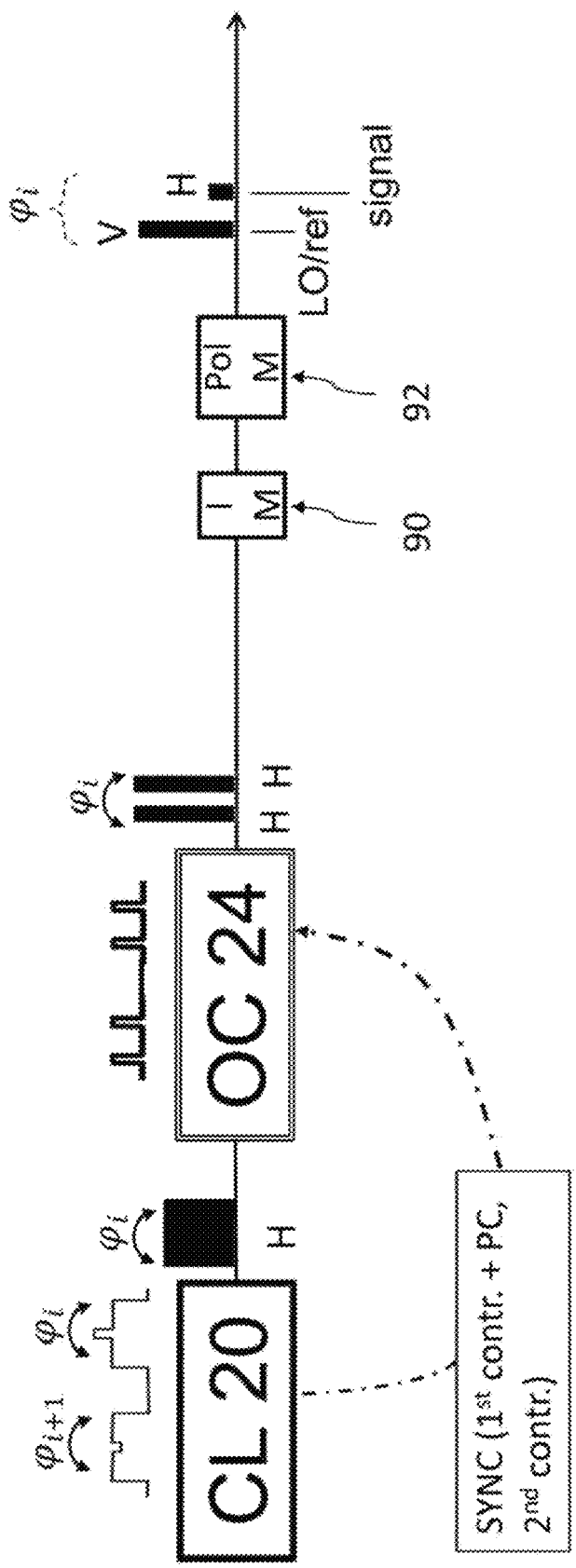
FIG. 9(b) is a schematic illustration of a transmitter for a continuous variable quantum communication system in accordance with an embodiment.
Figure 9C:
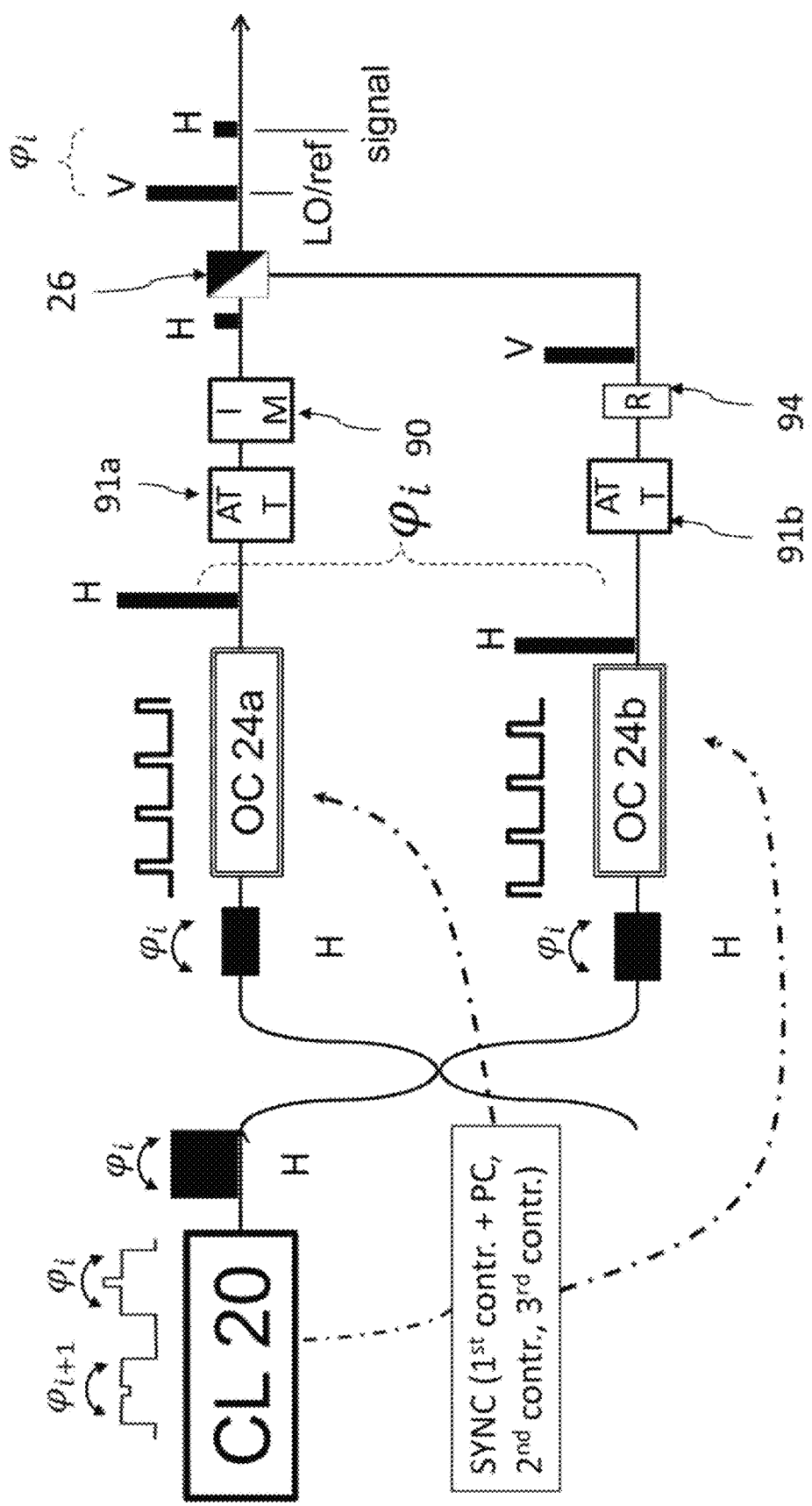
FIG. 9(c) is a schematic illustration of a transmitter for a continuous variable quantum communication system in accordance with an embodiment, comprising a first optical component and a second optical component.

FIG. 9(a) is a schematic illustration of a transmitter for a continuous variable quantum communication system in accordance with an embodiment.

The transmitter comprises a coherent light source 20. A first controller 140 is configured to apply a first signal to the coherent light source 20 such that it generates coherent light, as described previously. The first signal may be a periodic signal or a constant signal, such that the coherent light source 20 emits pulsed or continuous wave coherent light. A phase control element 125 is configured to apply perturbations to the first signal, each perturbation producing a phase shift between parts of the generated coherent light. In this case, the phase modulation corresponds to that described in relation to FIG. 4 above, but other modulation patterns can be applied.

The transmitter further comprises an optical component 24, which may be a light source, optical amplifier or intensity modulator for example. The coherent light source 20 supplies the coherent light to said optical component 24. There may be one or more further optical components 24 also supplied by the coherent light source 20. The coherent light source 20 and the optical component 24 may be optically coupled as described previously, for example through a beam splitter or an optical circulator.

A second controller 141 is configured to apply a second signal to the optical component 24 such that a light pulse is emitted during the period of time each part of the coherent light is received. Different emission patterns are possible, for example the optical component 24 may emit a light pulse during every other part of the coherent light, or two or more light pulses during each part. In this case, the optical component 24 emits long light pulses, having at least two local maxima in the temporal intensity profile and having a spike-like temporal intensity profile followed by a plateau-like temporal intensity profile. However, shorter light pulses with a single maximum in the temporal intensity profile may be emitted.

The transmitter further comprises an intensity control element, configured to modulate the amplitude of an emitted light pulse. In this case, the intensity control element is an intensity modulator 90 arranged after the optical component 24, such that an intensity modulation is applied directly to the light pulses emitted from the optical component 24, however other intensity control elements may be used, as described below.

The phase control element 125 and the intensity control element 90 are configured to encode information in a continuum of values of the phase and amplitude of an emitted light pulse. This will be described in more detail later. Each of the emitted pulses is a signal pulse.

As described previously, the first controller 140, second controller 141 and phase control element 125 may be integrated in a single component.

FIG. 9(*b*) is a schematic illustration of a transmitter for a continuous variable quantum communication system in accordance with an embodiment. In this case, the first controller 140, second controller 141 and phase control element 125 are shown integrated in a single component, but may alternatively be separate components.

The transmitter comprises the coherent light source 20, optical component 24 and intensity modulator 90 as described in relation to FIG. 9(*a*).

The phase modulation is applied as described in relation to FIG. 5 above. Thus the optical component 24 emits pairs of light pulses, with a phase difference between the first light pulse in the pair and the second light pulse in the pair controlled by the phase shift produced by the perturbation applied to the first signal.

The intensity modulator 90 is arranged after the optical component 24, such that the intensity of one of the light pulses in the pair may be modulated.

One of the light pulses in each pair is designated as the signal light pulse, the other light pulse is designated the reference light pulse.

The phase control element 125 and the intensity control element 90 are configured to encode information in a continuum of values of the phase difference between the signal and reference light pulse in each pair and the amplitude of the signal light pulse. This will be described in more detail later.

The transmitter may comprise two or more intensity modulators 90, in order to reduce the intensity of the signal light pulses to much lower than that of the reference light pulses. For example, the transmitter may comprise a first intensity modulator, configured to reduce the intensity of the signal light pulses by a constant amount. In an embodiment, the first intensity modulator reduces the intensity of the signal light pulses by a constant amount to less than 150 photons. In an embodiment, the first intensity modulator reduces the intensity of the signal light pulses by a constant amount to around 100 photons. In an embodiment, the first intensity modulator reduces the intensity of the signal light pulses by a constant amount to around 10 photons. In an embodiment, the first intensity modulator also reduces the intensity of the reference light pulses to around $10^8$ photons.

The second intensity modulator then encodes information in the amplitude of the signal light pulse, by modulating the intensity further below the maximum value set by the first intensity modulator. In other words, the first intensity modulator determines the maximum of the amplitude for the signal pulses. This maximum represents the "variance" of the Gaussian distribution used to select X and P, as described below. Within this maximum value, the amplitude is further modulated by the second intensity modulator.

The transmitter also comprises a polarisation control element. The polarisation control element may be a polarization modulator 92 configured to flip the polarization of one pulse in each pair by 90 degrees, such that the polarization of one pulse is orthogonal to the polarization of the other pulse. A polarization modulator 92 is a device which allows modulation of the birefringence in an optical medium by applying a voltage, in other words, the refractive index of a first polarization mode can be changed with respect to the refractive index of a second orthogonal polarization mode by applying a voltage. This effect is present for example in a Pockels cell, but other devices, based on GaAs for example, exist. Tuning the birefringence allows rotation of the polarization of incoming light because it changes the relative phase between the two polarization modes. The polarisation control element is controlled by a controller, and synchronised to the light pulse emission time, such that a polarisation modulation is only applied to every other light pulse emitted.

FIG. 9(*c*) is a schematic illustration of a transmitter for a continuous variable quantum communication system in accordance with an embodiment, comprising a first optical component 24*a* and a second optical component 24*b*. Further optical components may be included. The first controller 140, second controller 141*a*, third controller 141*b* and phase control element 125 are shown integrated in a single component, but may alternatively be separate components.

The coherent light source 20, first optical component 24*a* and second optical component 24*b* may be optically coupled as described previously, for example through a beam splitter.

The phase modulation is applied as described in relation to FIG. 8(*a*) above. Thus the first optical component 24*a* and second optical component 24*b* emit pairs of light pulses, with one light pulse in the pair emitted from the first optical component 24*a* and the other light pulse emitted from the second optical component 24*b*. The phase difference between the first light pulse in the pair and the second light pulse in the pair is controlled by the phase shift produced by the perturbation applied to the first signal.

The transmitter comprises an intensity modulator 90 as described in relation to FIG. 9(a), arranged on a first arm, after the first optical component. The intensity modulator 90 is configured such that the intensity of one of the light pulses in the pair may be modulated.

One of the light pulses in each pair is designated as the signal light pulse, the other light pulse is designated the reference light pulse. In this case, the light pulse emitted from the second optical component 24b is designated the reference light pulse, however the light pulse emitted from the first optical component 24a may be the reference light pulse.

The phase control element 125 and the intensity control element 90 are configured to encode information in a continuum of values of the phase difference between the signal and reference light pulse in each pair and the amplitude of the signal light pulse. This will be described in more detail later.

The transmitter may comprise further components. For example, the transmitter shown in FIG. 9(c) comprises a first attenuator 91a on the first arm and a second attenuator 91b on the second arm. In an embodiment, the first attenuator 91a reduces the intensity of the light pulses to around 100 photons. In an embodiment, the first attenuator 91a reduces the intensity of the light pulses to around 10 photons. In an embodiment, the second attenuator 91b reduces the intensity of the light pulses to around $10^8$ photons.

The transmitter also comprises a polarisation rotator 94. The polarisation rotator flips the polarization of light pulses passing through the rotator by 90 degrees. A polarization rotator 94 may be a half wave plate for example. The polarisation rotator is located on one of the arms of the transmitter, in this case on the second arm. Light pulses emitted from the second optical component 24b pass through the polarisation rotator 94 and thus have orthogonal polarisation to light pulses emitted from the first optical component 24. The arms are connected by a polarising beam splitter 26, as described in relation to FIG. 7 above.

A pair of light pulses, having a phase difference determined by the perturbation applied to the first signal, and the signal pulse having an amplitude determined by the amplitude modulation applied by the intensity modulator 90, and having orthogonal polarisation is thus emitted from the transmitter on a output waveguide. The emitted pulses are the same as those emitted from FIG. 9(b).

Figure 9D:
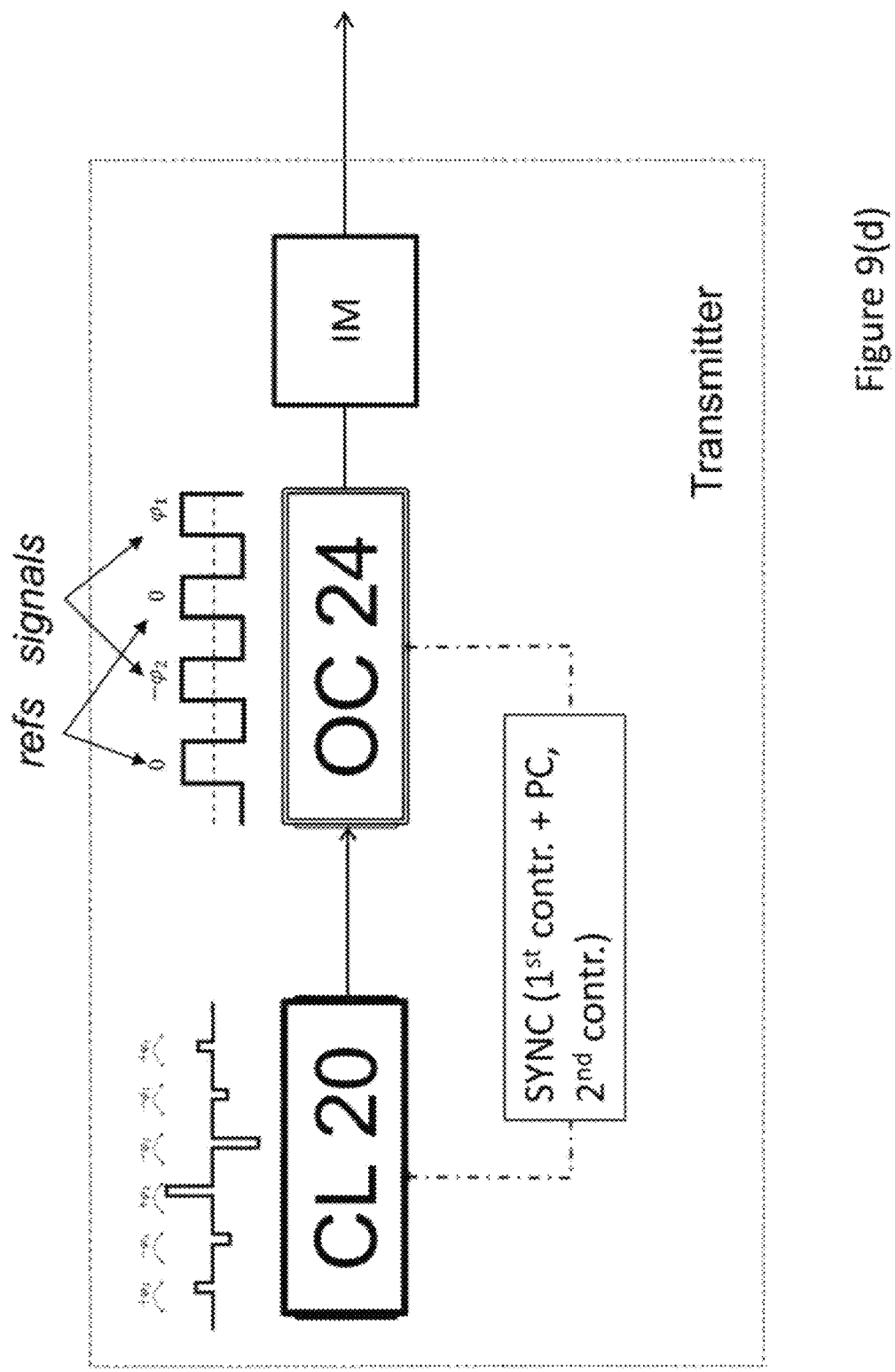
FIG. 9(d) is a schematic illustration of a transmitter for a continuous variable quantum communication system in accordance with an embodiment.

FIG. 9(d) is a schematic illustration of a transmitter for a continuous variable quantum communication system in accordance with an embodiment. In this case, the first controller 140, second controller 141 and phase control element 125 are shown integrated in a single component, but may alternatively be separate components.

The transmitter comprises the coherent light source 20, optical component 24 and intensity modulator 90 as described in relation to FIG. 9(a).

The phase modulation is applied as described in relation to FIG. 6 above. Thus the optical component 24 emits pairs of light pulses, with a phase difference between the first light pulse in the pair and the second light pulse in the pair controlled by the phase shift produced by the perturbation applied to the first signal. The phase difference between the light pulses emitted during the periods of time that the parts of the generated light corresponding to the alternate perturbations are received is substantially zero. Thus the phase difference between the first light pulse in each pair is substantially zero.

The intensity modulator 90 is arranged after the optical component 24, such that the intensity of one of the light pulses in the pair may be modulated.

The first light pulse in each pair is designated as the signal light pulse, the other light pulse is designated the reference light pulse.

The phase control element 125 and the intensity control element 90 are configured to encode information in a continuum of values of the phase difference between the signal and reference light pulse in each pair and the amplitude of the signal light pulse. This will be described in more detail later.

The transmitter may comprise further components.

In the above transmitters, the intensity control element is an intensity modulator. The intensity modulator may be a slow attenuator or a fast modulator. An intensity modulator modulates the intensity of incoming light pulses. The intensity modulator can modulate the intensity to one of a continuous range of values, allowing information to be encoded in a continuum of values of the intensity of the light pulse. An intensity modulator may modulate the intensity of the light by changing the absorption coefficient of the material in the modulator, for example an electro-absorption modulator. An electro-absorption modulator is a semiconductor device for which the voltage applied to the device changes the absorption coefficient, and therefore the intensity of light travelling through the device. In another embodiment the intensity modulator is based on a Mach-Zehnder interferometer. A Mach-Zehnder based intensity modulator changes the phase difference between the two arms of the interferometer to modulate the output intensity. The intensity modulator may modulate the phase as well as the intensity. To encode the correct phase and amplitude, any unwanted additional phase change caused by the intensity modulator is compensated for by applying a smaller/larger phase shift with the phase modulator.

Alternative methods of encoding information in the amplitude of the light pulses are possible.

Figure 10A:
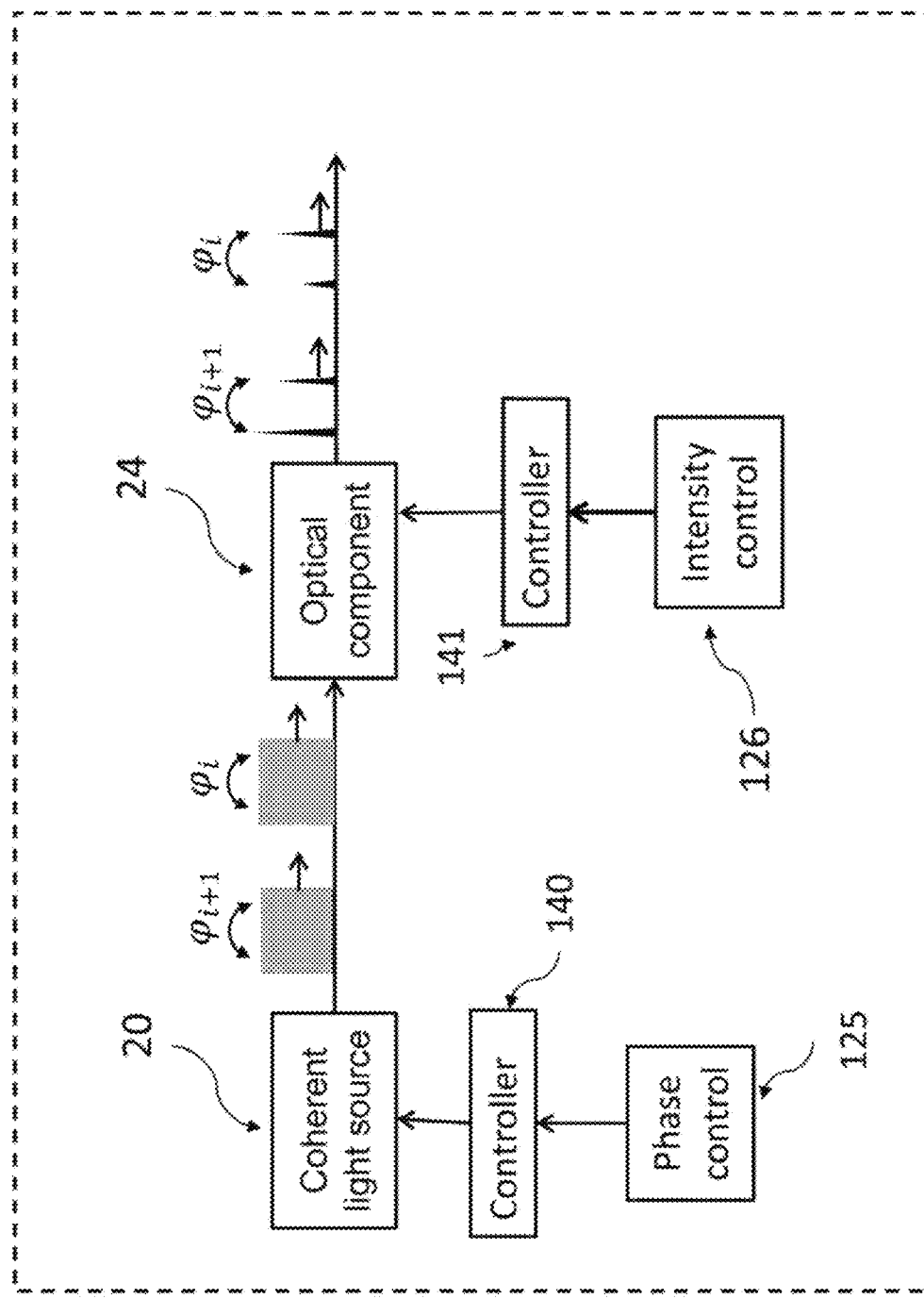
FIG. 10(a) is a schematic illustration of transmitter for a continuous variable quantum communication system in accordance with an embodiment.

FIG. 10(a) is a schematic illustration of transmitter for a continuous variable quantum communication system in accordance with an embodiment, in which amplitude modulation is performed by modulation of the second signal.

The transmitter comprises a coherent light source 20 and a first controller 140 configured to apply a first signal to the coherent light source 20 such that said coherent light source generates coherent light, as described previously. Although coherent light source is shown generating pulses of coherent light, alternatively it may generate continuous wave coherent light. The phase control element 125 is configured to apply perturbations to the first signal, each perturbation producing a phase shift between parts of the generated coherent light, in this case between a first part and a second part of each coherent light pulse.

The coherent light source 20 is configured to supply the generated light to the optical component 24. The coherent light source 20 and optical component 24 may be optically coupled in various ways, as described previously.

The second controller 141 is configured to apply a second signal to said optical component such that a light pulse is emitted during a period of time that a first part of the generated light is received, and a light pulse is emitted during a period of time that a second part of the generated light is received. In this case, a pair of light pulses is emitted for each coherent light pulse injected, the phase difference between the pair being set by the phase modulation applied to the coherent light by the phase control element 125.

The intensity control element 126 is configured to modulate the amplitude of an emitted light pulse, wherein the phase control element 125 and the intensity control element 126 are configured to encode information in a continuum of values of the phase and amplitude of an emitted light pulse.

The intensity control element is configured to modulate the amplitude of the second signal, such that the amplitude of the emitted light pulses is varied.

The intensity control element 126 is configured to modify the second signal applied to the optical component 24. The intensity control element 126 may be a separate element or may be integrated with the second controller 141, the first controller 140 and the phase control element 125 for example.

The intensity control element 126 can be a variable electrical attenuator or several variable electrical attenuators. The attenuator can reduce the intensity of selected current pulses in order to emit light pulses of varied intensity. Alternatively, the current pulse source itself may provide an arbitrary pattern of pulses which vary in intensity. For example, the second controller 141 can be a pattern generator.

Figure 10B:
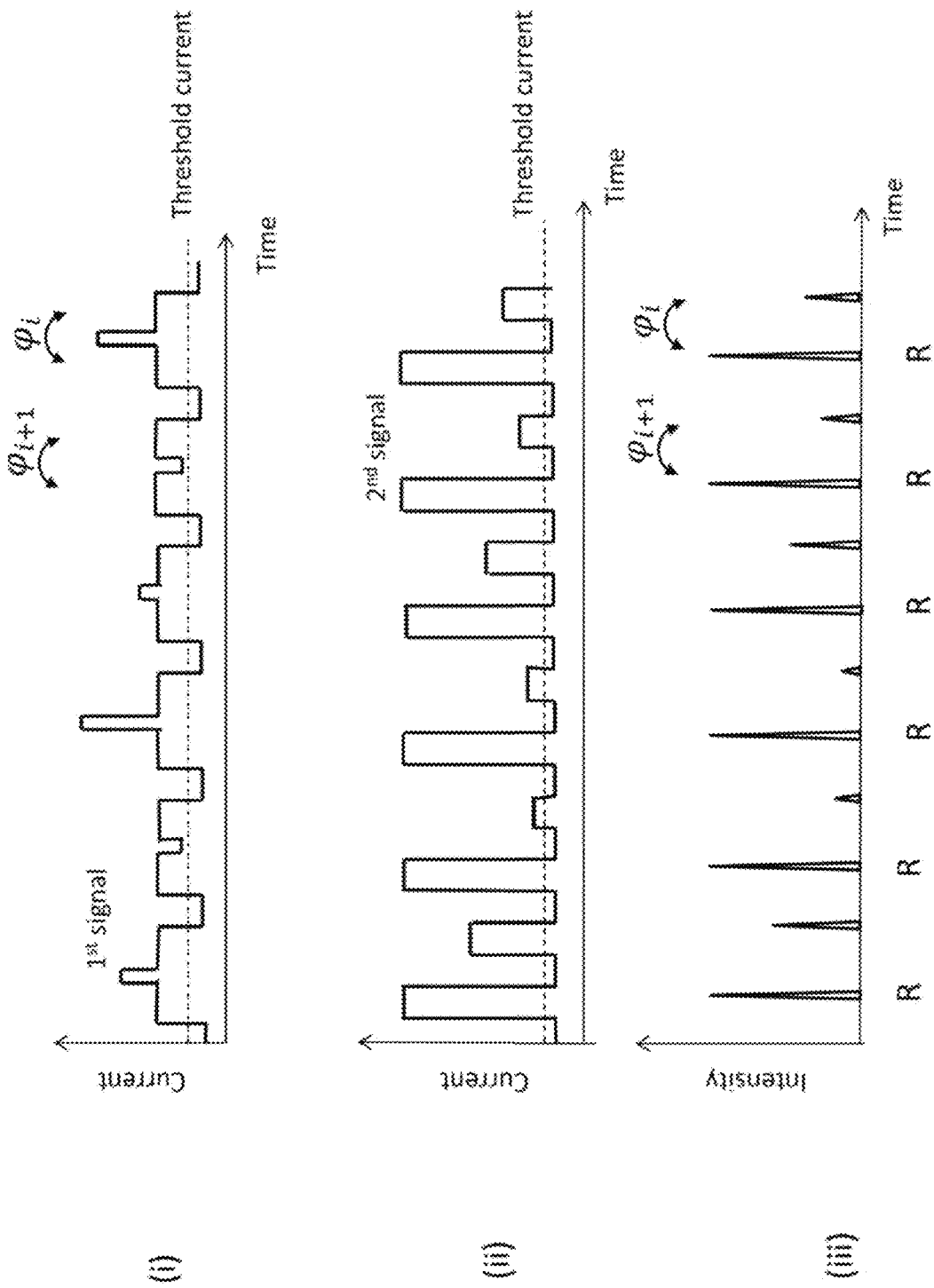
FIG. 10(b)(i) is a schematic illustration of a first signal applied to the coherent light source, FIG. 10(b)(ii) of a second signal applied to the optical component and FIG. 10(b)(iii) of the emitted light pulses.

FIG. 10(*b*)(i) shows the first signal, which in this case is a time varying current in the form of a regular series of square shaped pulses, with a perturbation applied by the phase control element once every pulse. The first signal is applied to the coherent light source 20 by the first controller 140 in order to generate coherent light pulses. The signal may be formed by combining an AC current with a DC bias current via a bias-T.

FIG. 10(*b*)(ii) shows the second signal after modification by the intensity control element 126. The modified signal is then inputted to the AC input of a bias tee and the output current of the bias-T is applied to the optical component 24.

In this case, the coherent light source 20 generates pulses of coherent light. The optical component 24 emits a pair of light pulses corresponding to each coherent light pulse, with the phase difference between each pulse in the pair set by the phase control element 125. The first pulse in the pair is designated the signal pulse, and the second pulse the reference pulse.

Thus the amplitude of the first pulse of each pair of pulses in the second signal is modified, to encode information in the amplitude of the emitted light pulse.

In the case shown, the reference pulse in each pair has the same amplitude. The amplitude of the reference pulses is much larger than the amplitude of the signal light pulses. In an embodiment, the intensity modulation applied to the second signal may correspond to an intensity of the reference light pulses of around $10^8$ photons. The intensity modulation applied to the second signal may correspond to an intensity of the signal light pulses of around 10 to 100 photons.

Other amplitude modulation patterns are possible, for example the amplitude of each pulse may be modulated in a similar manner to the phase modulation shown in FIG. 4.

When applied to the optical component 24, a pulse with an intensity set by the amplitude of the second signal is generated. FIG. 10(*b*)(iii) shows the light pulses emitted from the optical component 24.

Where lasers other than semiconductor lasers are used as the optical component 24, means other than an applied current are used to modulate the intensity of the light pulses. These means include varying the pump power, for example for an optical fibre laser, the optical pumping signal can be varied in order to modulate the intensity of the short laser pulses.

For an optical amplifier used as the optical component 24, intensity modulation can be realised by modulating the electrical switching signal that switches the amplifier between the "on" and "off" state as described. Alternatively, the switching signal source itself may provide an arbitrary pattern of pulses which vary in intensity. The signal applied to an intensity modulator can also be used to modulate the intensity of the emitted light in a similar manner.

FIG. 10(*c*) is a schematic illustration of transmitter for a continuous variable quantum communication system in accordance with an embodiment. In this case the intensity control element 125 is configured to modulate the amplitude of the first signal, such that the amplitude of the generated coherent light is varied.

Varying the intensity of the coherent light varies the intensity of the light pulses emitted from the optical component 24.

Again, the intensity control element 126 may be a separate element or may be integrated with the second controller 141, the first controller 140 and the phase control element 125 for example.

The intensity control element 126 can be a variable electrical attenuator or several variable electrical attenuators. The attenuator can reduce the intensity of selected parts of the first signal in order to generate coherent light with parts of varied intensity. Alternatively, the current source itself may provide an arbitrary pattern of amplitude. For example, the first controller 140 can be a pattern generator.

FIG. 10(*d*)(i) shows the first signal after modification by the intensity control element 126.

In this case, the coherent light source 20 generates pulses of coherent light. The optical component 24 will emit a pair of light pulses corresponding to each coherent light pulse, with the phase difference between the each pulse in the pair set by the phase control element 125. The first pulse in the pair is designated the signal pulse, and the second pulse the reference pulse. Thus the first part of each pulse in the first signal is amplitude modified, to encode information in the amplitude. In the case shown, the second part in each pulse of the first signal has the same amplitude. The amplitude of the reference pulses is much larger than the maximum amplitude of the signal light pulses. In an embodiment, the intensity modulation applied to the first signal may correspond to an intensity of the reference light pulses of around $10^8$ photons.

Other amplitude modulation patterns are possible, for example the amplitude of each part of a constant first signal may be modulated, in a similar manner to the phase modulation shown in FIG. 4.

FIG. 10(*d*)(ii) shows the second signal, which in this case is in the form of a regular series of square shaped pulses, which are applied to the optical component 24 by the second controller 141 in order to emit light pulses. The signal may be formed by combining an AC current with a DC bias current via a bias-T.

FIG. 10(*d*)(iii) shows the light pulses emitted from the optical component 24. The pattern is the same as that for FIG. 10(*b*)(iii)

Again, where lasers other than semiconductor lasers are used as the coherent light source 20, means other than an applied current are used to modulate the intensity of the light. These means include varying the pump power, for example for an optical fibre laser, the optical pumping signal can be varied in order to modulate the intensity of the short laser pulses.

In order to vary the intensity of the generated coherent light, a variable attenuator can reduce the intensity of selected parts of the first signal. When the lower intensity coherent light is supplied to the optical component 24, light pulses of a lower intensity are emitted. Alternatively, the driving circuit of the coherent light source 20 itself can provide an arbitrary pattern of amplitude, removing the need for an attenuator. For example, the first controller 140 can comprise a pattern generator.

Alternatively, the coherent light source 20 can comprise an optical intensity modulator, which can vary the intensity of the generated coherent light before it is supplied to the optical component 24.

The intensity control element in the transmitter may be provided by any of the above described systems.

Figure 11:
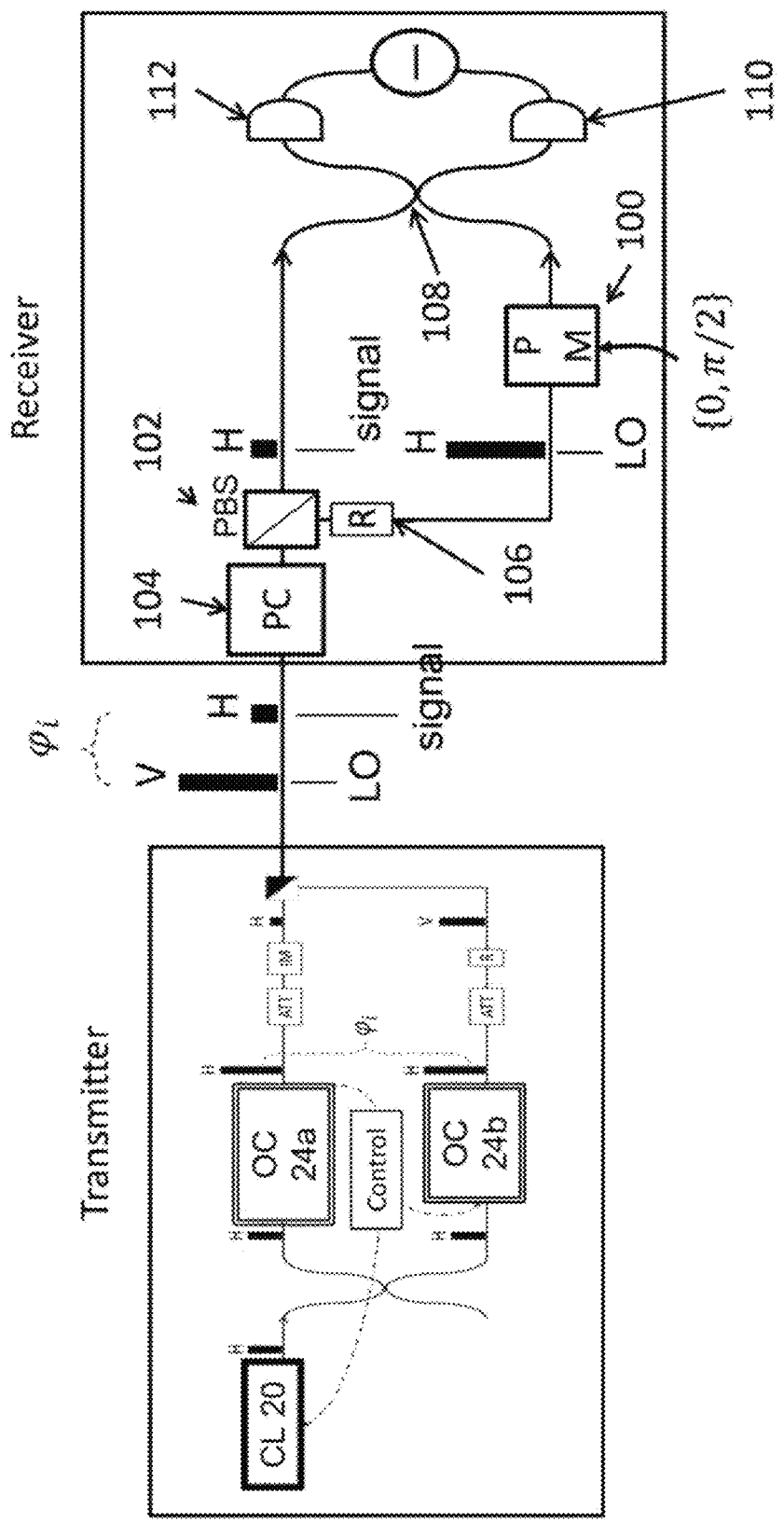
FIG. 11 is a schematic illustration of a continuous variable quantum communication system in accordance with an embodiment.

FIG. 11 is a schematic illustration of a continuous variable quantum communication system in accordance with an embodiment.

In a continuous variable (CV) QKD protocol, the light pulses carry information in a continuum of values of a physical quantity such as the components of the electric field of a coherent state of light.

The system comprises a transmitter and receiver. The transmitter is referred to as Alice and the receiver is referred to as Bob. In this case, the transmitter is a transmitter such as described in relation to FIG. 9(*c*). The phase control element and the intensity control element in the transmitter are configured to encode information in a continuum of values of the phase and amplitude of an emitted light pulse. The phase control element and the intensity control element are configured to modulate the phase and the amplitude of an emitted light pulse to produce a coherent state.

The transmitter comprises a control component. The control component is an integrated component comprising the first controller 141, the phase control element 125 and the second controller 140 and a processor. However, these elements may be provided separately.

The transmitter emits pairs of light pulses. One of the light pulses in each pair is a signal light pulse, and one of the pulses is a reference light pulse. Information is encoded in a continuum of values of the phase difference between the light pulses in the pair, and in the amplitude of the signal light pulse, enabling a continuous variable QKD protocol to be performed.

A Gaussian-modulated coherent states (GMCS) protocol CV-QKD protocol may be implemented with the system as follows.

For each pair of light pulses, the processor generates a first random number X and a second random number P. The random numbers X and P may be generated from a normal distribution centred in zero and with variance V=$\sigma^2$. In an embodiment, the variance is 10 photons. In an embodiment, the variance is 100 photons. In an embodiment, the variance is 150 photons. The normal distributions for X and P are shown in FIG. 12. Each pair of values of X and P are information which is encoded in a signal light pulse, and sent to Bob. Bob then decodes the information and forms a secret key with Alice.

The obtained values of X and P are used to calculate an amplitude value α corresponding to the pair of pulses. The obtained values of X and P are also used to calculate a phase value θ corresponding to the pair of pulses. The amplitude and phase values are calculated from the following relationships:

$$\tan\theta = \frac{P}{X}$$
$$\alpha = \sqrt{P^2 + X^2}$$

Due to these relations, X and P distributed according to a Gaussian of variance $\sigma^2$ can be obtained if θ is randomly selected from a uniform distribution in [0, 2π] and α is randomly selected from the Rayleigh distribution with scale parameter σ. In an alternative embodiment, values for the amplitude α and phase θ are directly generated, without first generating values of X and P. The amplitude α of the emitted signal light pulses is randomly selected from a continuum of non-negative values with a Rayleigh distribution with scale parameter σ. In an embodiment, $\sigma^2$ is 150 photons. In an embodiment, $\sigma^2$ is 100 photons. In an embodiment, $\sigma^2$ is 10 photons. The phase θ of the emitted signal light pulse relative to the reference light pulse is randomly selected from a continuum of values with a uniform distribution in the interval [0, 2π]. The random amplitude and phase selected as in this embodiment correspond to values of X and P following a Gaussian distribution with variance $\sigma^2$.

The phase control element is configured to apply the perturbation to produce a phase shift corresponding to a phase difference of θ between the signal light pulse and the reference light pulse, and the intensity control element is configured to apply an amplitude modulation to the signal light pulse corresponding to an amplitude of α. The amplitude modulation of the signal light pulse corresponds to modulating the signal light pulse such that the absolute value of the amplitude is α. In this way, the information, that is the values of X and P, are encoded in a continuum of values of the phase and amplitude of the signal light pulses.

The value of a is the amplitude of the electrical field, not the intensity of the light pulse. Changing the intensity by a factor of 2 is equivalent to changing the electrical field amplitude by a factor of the square root of 2. Thus the intensity control element will set the intensity of the light pulse to $\alpha^2$.

X and P can be any value from a continuous range of values.

Figure 13:
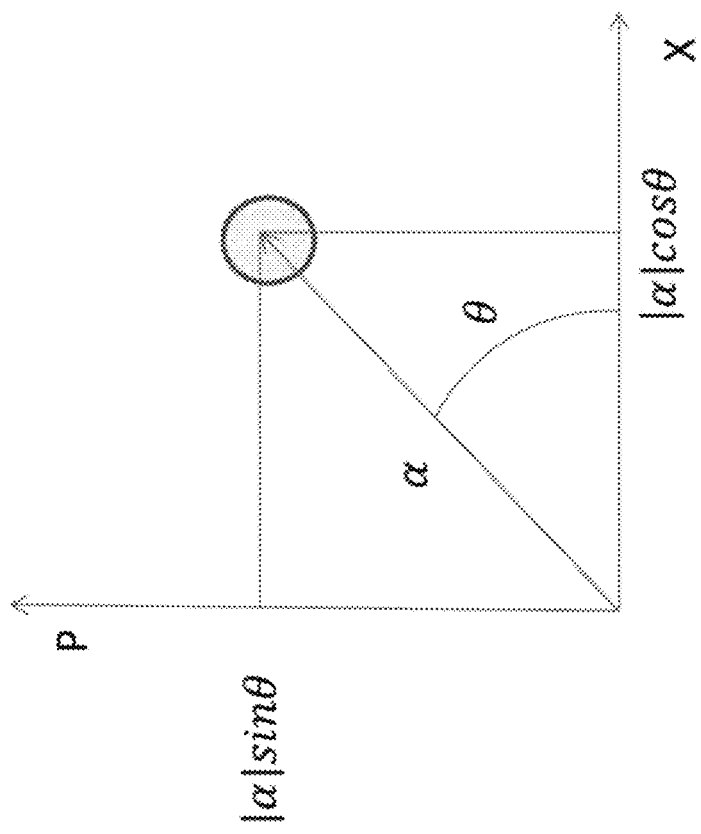
FIG. 13 is a schematic illustration of the coherent state in the phase space X–P.

The obtained values of X and P are thus used to prepare a coherent state in the phase space, represented by a circle with radius 1 in the X–P plane, as shown in FIG. 13.

To prepare the coherent state, the intensity control component is used to set the amplitude of the signal light pulse to a, and the phase control element is used to set the phase difference between the signal light pulse and the reference light pulse to θ.

The values of X and P, i.e. the information encoded on the light pulses can be obtained from the phase of the signal light pulse, relative to the reference light pulse, and the amplitude of the signal light pulse, using the relationship:

$$X = |\alpha|\cos\theta$$

$$P = |\alpha|\sin\theta$$

The encoded light pulses are sent to the receiver. The light pulses may be sent via an optical transmission line. The transmitter thus generates coherent double pulses with a phase difference and having orthogonal polarization travelling down the transmission line.

The receiver is configured to optically combine the signal light pulse and the corresponding reference light pulse, i.e. the two pulses in each pair of light pulses.

The receiver comprises a delay element, configured to cancel any time delay between the signal and reference light pulses and a modulation element, configured to select between measurement of the component of the signal light pulse in-phase with the reference light pulse and the component of the signal light pulse in quadrature with the reference light pulse. A measurement of the component of the signal light pulse in-phase with the reference light pulse corresponds to a measurement of X and a measurement of the component of the signal light pulse in-quadrature with the reference light pulse corresponds to a measurement of P.

In an embodiment, the receiver comprises a polarising beam splitter 102, which directs light pulses with a first polarisation down one optical path and light pulses with a second, orthogonal, polarisation down a second optical path. As the signal light pulses and reference light pulses have orthogonal polarisations, they are separated into different optical paths at the polarising beam splitter 102.

The receiver may comprise a polarisation controller 104. In this case, at the input of the receiver the polarization of the double pulses is restored using the polarization controller 104, before the pulses pass through the polarising beam splitter 102. The optical transmission line may be a single mode optical fibre which allows propagation of the two polarization modes without causing a significant change in path length between the two modes. However, as all single mode fibres may have some birefringent characteristics, it is possible that the polarization of the two modes will rotate when travelling along the transmission line. The polarization controller 104 corrects this rotation, and outputs the polarization corrected double pulses.

The polarization of one of the pulses is flipped by a polarisation rotator 106 at one output of the beam splitter 102, such that the polarization of the pulse when exiting the polarising beam splitter 102 is the same as the polarization of the other pulse in the pair.

The outputs of the polarising beam splitter 102 form two arms of an interferometer. One of the arms has a longer optical path length than the other, such that the delay caused by the difference in length between the two optical paths in the interferometer matches the delay between the emission times of the light pulses in the pairs, such that the light pulses combine when exiting the interferometer, i.e. they exit the interferometer at the same time.

In the case in which the second pulse in the pair is the signal pulse and the first pulse in the pair is the reference pulse, the signal pulse travels the short arm of the interferometer and the reference pulse travels the long arm of the interferometer. Where the second pulse in the pair is the reference pulse and the first pulse in the pair is the signal pulse, the signal pulse travels the long arm of the interferometer and the reference pulse travels the short arm of the interferometer.

The long arm of the interferometer comprises a phase modulator 100. The phase modulator 100 is an example of a modulation element, and is used to select between measurement of the component of the signal light pulse in phase with the reference light pulse and the component of the signal light pulse in quadrature with the reference light pulse. The selection is made by applying a phase shift of 0 or $\pi/2$ to the reference light pulse.

The phase modulator 100 may comprise a crystal, such as a $LiNbO_3$ crystal, in which the refractive index is a function of electric field strength. Alternatively, the phase modulation can be provided by passive means, for example, two fixed phase elements which are each configured to apply a different fixed phase difference and a switch configured to select each of the elements. A controller may control the phase shift applied to each pulse by controlling the switch.

The phase modulator 100 selects between the two measurements by applying a phase shift of 0 or a phase shift of $\pi/2$ to the reference light pulse. Note that the phase shift may alternatively be applied to the signal pulse.

The receiver comprises a second beam splitter 108, configured to optically combine the signal and reference light pulse. The two arms of the interferometer combine at the second beam splitter 108. The outputs of second beam splitter 108 are connected to sa first photon detector 112 and a second photon detector 110. The intensity of the light detected in each photon detector depends on the phase and intensity modulation applied at the transmitter, as well as the phase modulation applied at the receiver.

Photon detectors 110 and 112 may be PIN photodiodes for example.

The phase modulator 100 selects between a measurement of X or P by acting on the phase of the reference light pulse. A phase shift of 0 applied to the reference light pulse corresponds to a measurement of the component of the signal light pulse in-phase with the reference light pulse, which corresponds to a measurement of X. A phase shift of $\pi/2$ corresponds to a measurement of the component of the signal light pulse in quadrature with the reference light pulse, which corresponds to a measurement of P.

For each pair of light pulses, the value of the selected measurement, X or P, is determined from the current measured at the two detectors, from the following relationship:

$$I(t)=I_1(t)-I_2(t) \propto \cos(\theta_s-\theta_{LO})$$

The measurement is a homodyne measurement, and allows either X or P to be measured at the receiver. If $\theta_{LO}$ is set to zero, the current difference is proportional to X; if it is set to $\pi/2$, the current difference is proportional to P. The exact coefficient relating the different in current I(t) and the value of X or P is determined. The value of X or P for each pulse is then calculated from I(t). The receiver may further comprise a processor, configured to determine the value of X or P from the output currents.

After the key information has been transmitted, Bob, at the receiver, then informs Alice, at the transmitter, which of the in-phase or in-quadrature components he measured for each light pulse, allowing Alice and Bob to form a key.

Further post processing can be performed on the generated key. For example, classical procedures such as (i) sifting, (ii) error correction, (iii) privacy amplification and (iv) authentication may be included.

Sifting may involve the following process. Where Bob measures the in-phase component for a particular light pulse, Alice discards the value for P and keeps the value for X. Where Bob measures the quadrature component for a particular light pulse, Alice discards X and keeps P. In this way a key is formed. The "vacuum counts" in this case are not discarded.

In an embodiment, the information assignment during encoding can be modified in order to reduce error. For example, information values may be assigned to areas in a grid in the phase space. Alice then modulates the phase and amplitude with values corresponding to the centre point of the grid area in which the randomly selected values of X and P fall. Multi-dimensional multi-edge low-density parity check (LDPC) error correction can be used to correct any remaining error.

For a particular signal light pulse, if Bob measures X, he will know with high precision the value of X encoded by Alice limited only by a minimum amount of noise, but he will not know P. Eve does not know in advance the direction Bob will use for measurement. If Eve measures along P, Bob will measure a result for X that is completely uncorrelated with Alice's encoding. By comparing a sample section of their keys, Alice and Bob can ascertain the presence of Eve from the error rate.

FIG. 11 shows a CV-QKD setup with polarisation multiplexing and homodyne detection. A π/2 optical hybrid component, which will be described later, can alternatively be used to make the measurement at the receiver.

Figure 14:
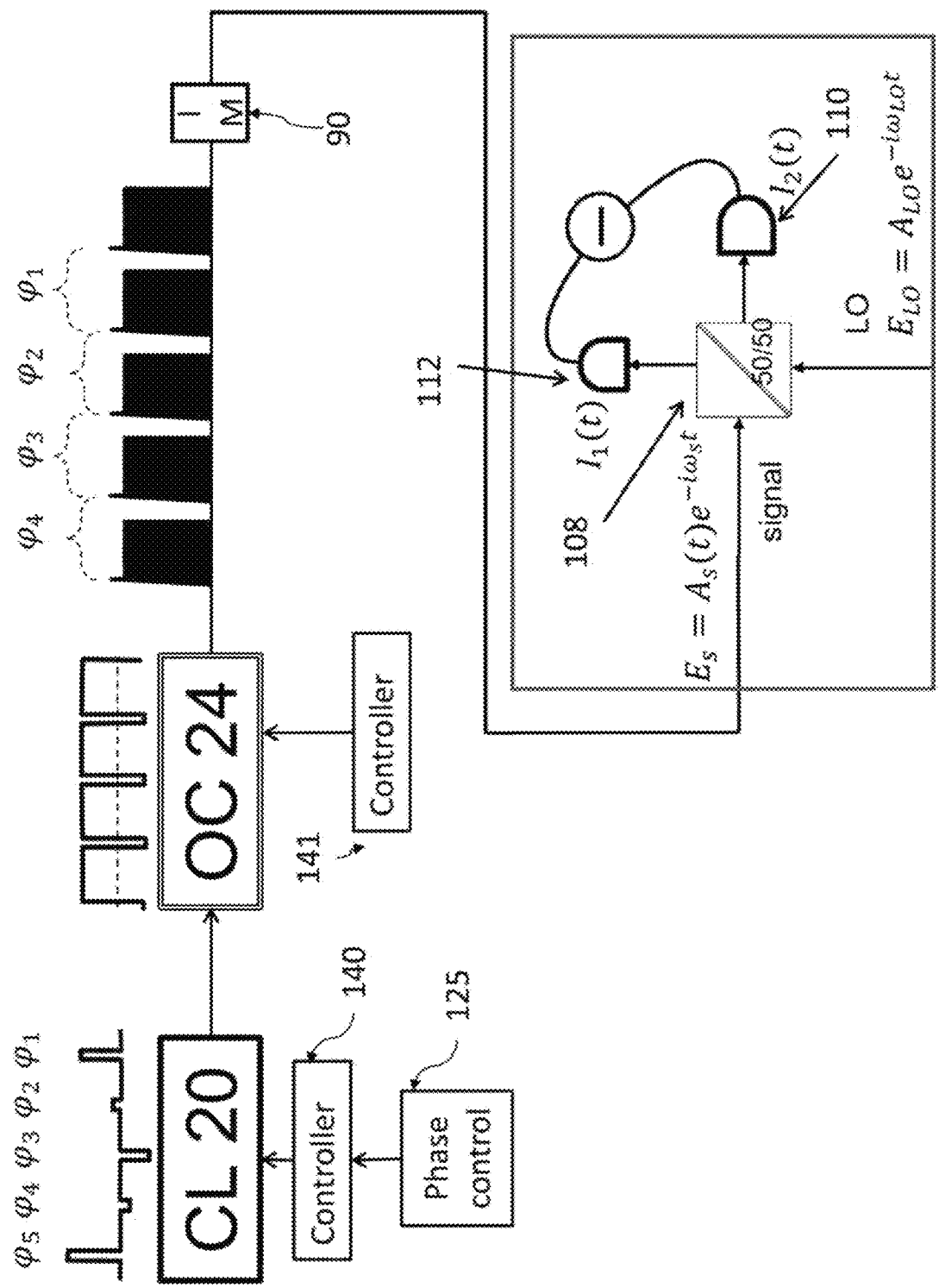
FIG. 14 is a schematic illustration of a continuous variable quantum communication system in accordance with an embodiment.

FIG. 14 is a schematic illustration of a continuous variable quantum communication system in accordance with an embodiment.

The system comprises a transmitter and receiver. In this case, the transmitter is a transmitter such as described in relation to FIG. 9(a). The phase control element and the intensity control element in the transmitter are configured to encode information in a continuum of values of the phase and amplitude of an emitted light pulse. The phase control element and the intensity control element are configured to modulate the phase and the amplitude of an emitted light pulse to produce a coherent state.

The transmitter comprises a processor. The processor may be integrated with the first controller 141, the phase control element 125 and the second controller 140, or these elements may be provided separately.

The transmitter emits a sequence of light pulses. Information is encoded in a continuum of values of the phase difference between the light pulses and amplitude of the light pulses, enabling a continuous variable QKD protocol to be performed.

A CV-QKD protocol may be implemented with the system as follows.

For each light pulse, the processor generates a first random number X and a second random number P. The random numbers X and P may be generated from a normal distribution centred in zero and with variance $V=\sigma^2$, as for the system shown in FIG. 11.

The obtained values of X and P are used to calculate an amplitude value α for each light pulse. The obtained values of X and P are also used to calculate a phase value θ for each light pulse, as before. Alternatively, values of amplitude and phase may be directly generated, as described previously.

The phase control element is configured to apply the perturbation to produce a phase shift corresponding to a phase difference of θ between the light pulse and the previously emitted light pulse, and the intensity control element is configured to apply an amplitude modulation corresponding to an amplitude of α.

The encoded light pulses are sent to the receiver. The light pulses may be sent via an optical transmission line. The transmitter thus generates a sequence of pulses travelling down the transmission line.

The receiver is configured to optically combine the signal light pulse and locally generated continuous wave local reference light or local reference light pulses, labelled LO in the figure. The local reference light or local reference light pulses may be generated using a light source at the receiver. In an embodiment, the local light pulses are generated using a coherent light source and an optical component at the receiver. The coherent light source is optically coupled to the optical component. Light from the coherent light source is injected into the optical component. The optical component generates light when light from the coherent light source is present in the optical component. Alternatively, a single light source may generate the local reference light.

The local reference light is generated with the same polarisation and pulse shape as the received light pulses, and having the same wavelength and temporal stability.

The receiver comprises a beam splitter 108. The received light pulses from the transmitter and the local light are optically combined at the beam splitter 108. The beam splitter 108 is a 50:50 beam splitter. The outputs of the beam splitter 108 are connected to a first photon detector 112 and a second photon detector 110. The difference in the intensities of the light detected in each photon detector depends on the phase and intensity modulation applied at the transmitter, as well as the phase and intensity of the local light.

For each signal light pulse, the value of X and P is determined from the current measured at the two detectors. The output current contains a time-varying term that allows measurement of the components of the signal light pulses both in-phase and in-quadrature with the local reference light:

$$I(t)=I_1(t)-I_2(t) \propto \cos(\Delta\omega t+\theta_s-\theta_{LO})$$

The measurement is a heterodyne measurement, and allows both X and P to be measured at the receiver for each signal light pulse.

The receiver may further comprise a processor (not shown), configured to determine the values of X and P from the output currents.

The processor may be configured to receive information relating to the outputs of the beam splitter 108, for example the values of the output current from the detectors 110 and 112. The processor determines the phase of the local reference light relative to the received light pulse and determines a component of the received signal light pulse in quadrature with the local light and a component of the received signal light pulse in quadrature with the local light.

Further post processing may be performed, as described previously.

Figure 15A:
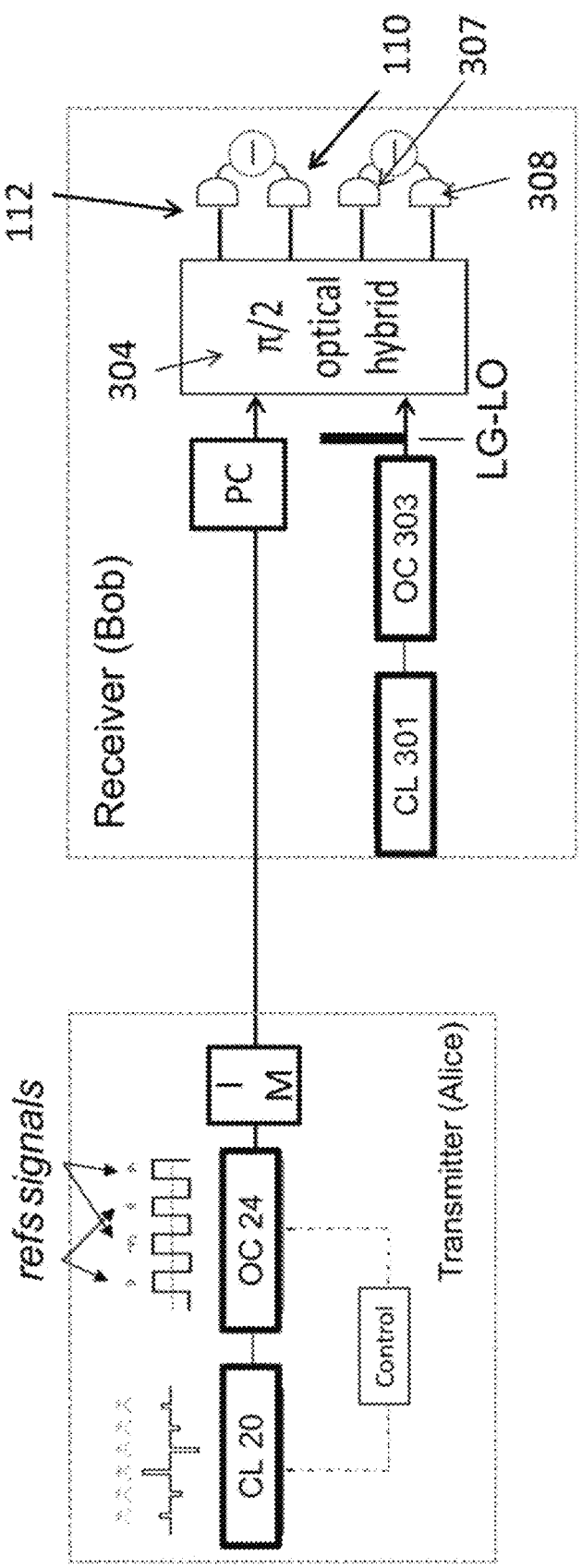
FIG. 15(a) is a schematic illustration of a continuous variable quantum communication system in accordance with an embodiment.

FIG. 15(a) is a schematic illustration of a continuous variable quantum communication system in accordance with an embodiment.

The system comprises a transmitter and receiver. In this case, the transmitter is a transmitter such as described in relation to FIG. 9(d). The phase control element and the intensity control element in the transmitter are configured to encode information in a continuum of values of the phase and amplitude of an emitted light pulse. The phase control element and the intensity control element are configured to modulate the phase and the amplitude of an emitted light pulse to produce a coherent state.

The transmitter comprises a control component. The control component is an integrated component comprising the first controller 141, the phase control element 125 and the second controller 140 and a processor. However, these elements may be provided separately.

The transmitter emits pairs of light pulses. One of the light pulses in each pair is a signal light pulse, and one of the pulses is a reference light pulse. Information is encoded in a continuum of values of the phase difference between the light pulses and amplitude of the signal light pulse, enabling a continuous variable QKD protocol to be performed.

A CV-QKD protocol may be implemented in the system as follows.

For each pair of light pulses, the processor generates a first random number X and a second random number P, which are used to calculate an amplitude value α and a phase value θ as described previously. Alternatively, values of amplitude and phase may be directly generated, as described previously.

The phase control element is configured to apply the perturbation to produce a phase shift corresponding to a phase difference of θ between the signal light pulse and the reference light pulse, and the intensity control element is configured to apply an amplitude modulation to the signal light pulse corresponding to an amplitude of α. As described in relation to FIG. 9(d), the phase difference between the reference light pulses is substantially zero.

The encoded light pulses are sent to the receiver. The light pulses may be sent via an optical transmission line. The transmitter thus generates coherent double pulses with a phase difference and having orthogonal polarization travelling down the transmission line.

The receiver is configured to optically combine the received light pulses and locally generated continuous wave local reference light or local reference light pulses, labelled LO in the figure. The local light or local light pulses may be generated using a light source at the receiver. In an embodiment, the local light pulses are generated using a coherent light source 301 and an optical component 303. The coherent light source 301 is optically coupled to the optical component 303. Light from the coherent light source 301 is injected into the optical component 303. The optical component 303 generates light when light from the coherent light source 301 is present in the optical component 303. Optical component 303 may be a laser, for example a semiconductor laser, an optical amplifier or an intensity modulator. Alternatively, a single light source may generate the local reference light.

The receiver comprises a $\pi/2$ optical hybrid component 304. The received light pulses from the transmitter and the local light are optically combined at the optical hybrid component 304. The received light pulses from the transmitter are inputted into a first input of the $\pi/2$ optical hybrid component 304 and the local reference light is inputted into a second input of the $\pi/2$ optical hybrid component 304.

The $\pi/2$ optical hybrid component 304 is an example of a combining component.

In general, a combining component comprises a first beam combiner and a second beam combiner, and is configured to split the local light into a first part and a second part and split the received light pulses into a first part and a second part, for example at beam splitters. The combining component may comprise a first 50:50 beam splitter and a second 50:50 beam splitter. The local light is inputted into the first 50:50 beam splitter. A first part of the local light is outputted from a first output and a second part of the local light outputted from the second output. The received light pulses are inputted into the second 50:50 beam splitter. A first part of the received light pulses is outputted from a first output and a second part is outputted from a second output.

A phase shift is applied between the second part of the received light pulses and the second part of the local light, for example by a fixed phase element. The phase shift is a phase shift of $\pi/2$. The combining component may comprise a fixed phase element, configured to apply a phase shift of $\pi/2$, at the second output of the first beam splitter.

The first part of the received light pulses and the first part of the local light are combined on the first beam combiner and the second part of the received light pulses and the second part of the local light are combined on the second beam combiner. The first beam combiner may be a third 50:50 beam splitter and the second beam combiner may be a fourth 50:50 beam splitter. The first output of the first beam splitter is optically coupled to a first input of the third beam splitter. The first output of the second beam splitter is optically coupled to the second input of the third beam splitter. The optical path length between the first output of the first beam splitter and the first beam combiner is the same as the optical path length between the first output of the second beam splitter and the first combiner. The second output of the first beam splitter is optically coupled to a first input of the fourth beam splitter. The second output of the second beam splitter is optically coupled to the second input of the fourth beam splitter, via the fixed phase element. The optical path length between the second output of the first beam splitter and the second beam combiner is the same as the optical path length between the second output of the second beam splitter and the second beam combiner, excepting the fixed phase element.

The first light detector 112 and the second light detector 110 are configured to detect the outputs of the first beam combiner. The third light detector 307 and the fourth light detector 308 are configured to detect the outputs of the second beam combiner. For the case of $\pi/2$ optical hybrid component, the outputs of the $\pi/2$ optical hybrid component 304 are connected to a first photon detector 112, a second photon detector 110, a third photon detector 307 and a fourth photon detector 308.

The intensity difference between the light detected in each photon detector depends on the phase and intensity modulation applied at the transmitter, as well as the phase and intensity of the local light.

The receiver further comprises a processor (not shown) configured to receive information relating to the outputs of the first beam combiner and the second beam combiner and determine the phase of the local reference light relative to the received reference light pulses received from the transmitter. From this information, the components of the signal light pulses both in-phase and in-quadrature with the reference light pulses received from the transmitter can be determined. Once the phase difference between local reference light and the received reference light pulses is known, a rotation in the phase space may be performed.

The odd pulses transmitted by Alice are signal pulses and are modulated in phase and used for key extraction. The even pulses are reference pulses, and are not modulated and used for phase estimation.

When Bob performs heterodyne or optical hybrid detection, as in FIGS. 14 and 15(a), the measurements are noisier, and an additional filter may be used to clean the spectrum. Error correction and other post processing procedures can be applied.

A measurement by Eve increases the noise of Bob's measurement. Thus Eve's presence can be detected by comparing a sample of Alice and Bob's key and determining the error ratio of the obtained key.

Both the X and P information can be used to form the key, thus the distillation rate is doubled compared to the case where only one of X and P can be measured for each pulse.

Figure 15B:
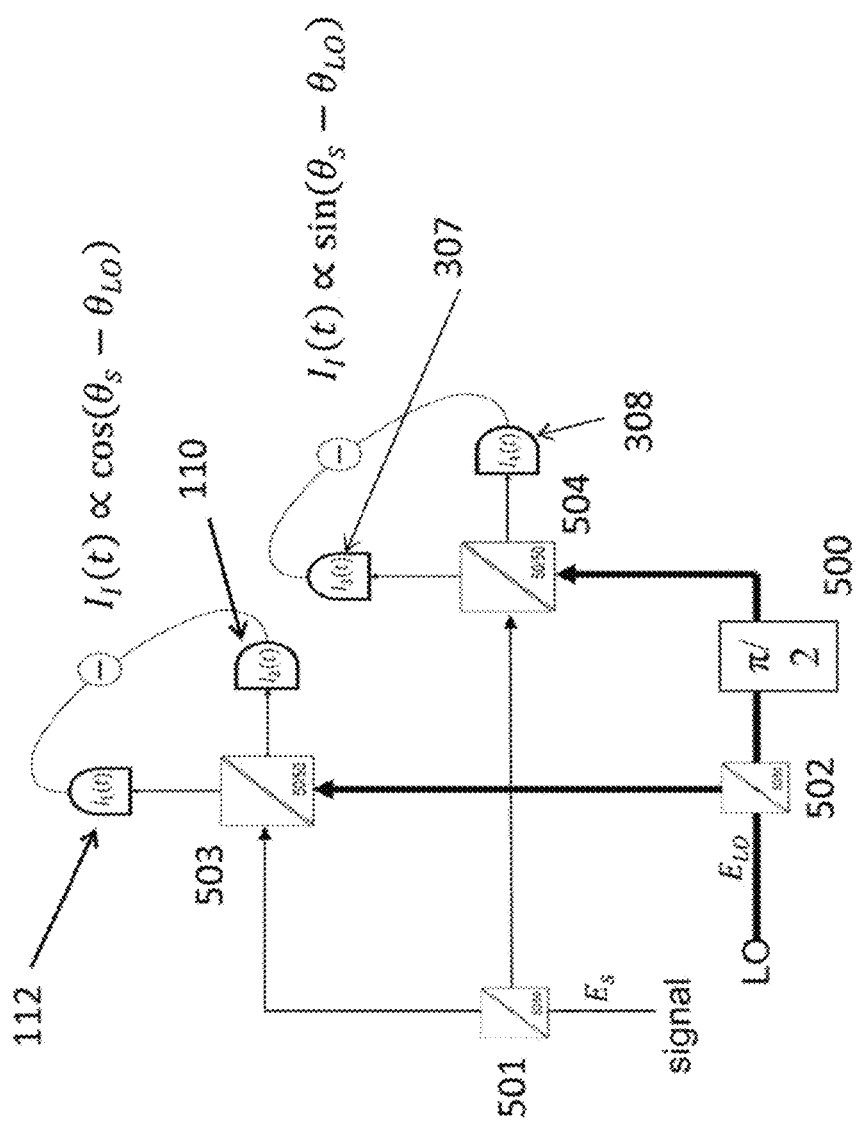
FIG. 15(b) is a schematic illustration of an alternative receiver.

An alternative receiver which may be used with the transmitter of FIG. 11, 14 or 15(a) in an embodiment is shown in FIG. 15(b). The receiver is an intradyne or phase-diversity homodyne or optical hybrid receiver. The receiver comprises a combining component, comprising a first beam splitter 502, a second beam splitter 501, a $\pi/2$ fixed phase element 500, a third beam splitter 503 and a fourth beam splitter 504.

Both the signal light pulses and the reference light are split and then two homodyne measurements are performed, one of the measurements performed with one arm shifted by $\pi/2$, so that both the component in-phase and in-quadrature with the reference light can be measured.

The signal and reference light can originate from the same light source or a different light source.

The signal light pulses are split into a first part and a second part at a first splitting component 501, which may be a 50:50 beam splitter. The reference light is split into a first part and a second part at a second splitting component 502, which may be a 50:50 beam splitter.

The first part of the signal light and the first part of the reference light are optically combined at a third beam splitter 503, and the outputs of the third beam splitter 503 are detected at a first photon detector 112 and a second photon detector 110.

A phase shift of $\pi/2$ is applied to the second part of the reference light at a fixed phase element 500. The second part of the signal light and the second part of the reference light are optically combined at a fourth beam splitter 504, and the outputs of the fourth beam splitter 504 are detected at a third photon detector 307 and a fourth photon detector 308.

Figure 15C:
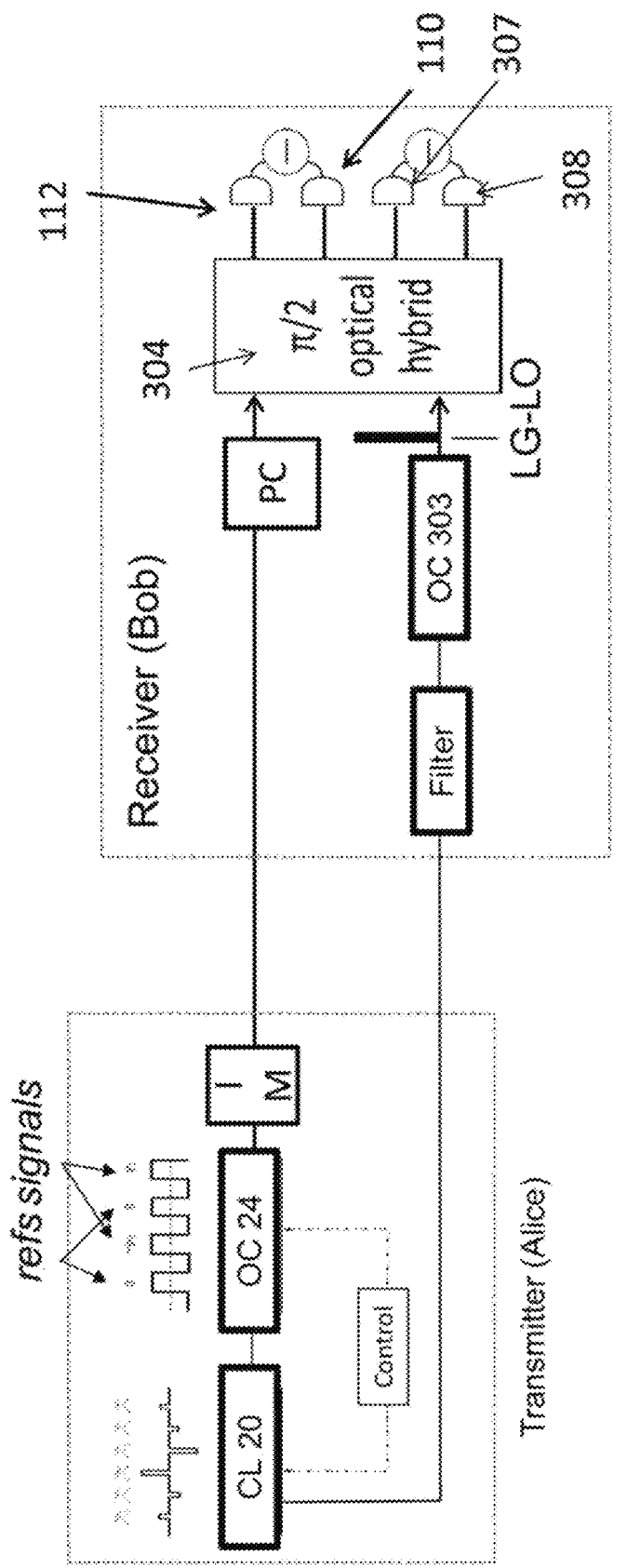
FIG. 15(c) is a schematic illustration of a continuous variable quantum communication system in accordance with an embodiment.

FIG. 15(c) is a schematic illustration of a continuous variable quantum communication system in accordance with an embodiment. The system is the same as shown in FIG. 15(a), however light from the coherent light source 20 in the transmitter is injected into optical component 303 which emits the local reference light, instead of light from a local coherent light source.

This allows better visibility and allows for weaker power of the reference pulses from the coherent light source 20 to be transmitted along the line, as they are regenerated by the OC 303. For example, with this scheme the reference pulse intensity transmitted by Alice can be around $10^4$ photons per pulse whereas in the system of FIG. 11 it may be around $10^8$.

A beam splitter may be included in the transmitter, to split the light from the coherent light source into a first part and a second part. The first part of the coherent light is injected into the optical component 24, which emits signal light pulses. The second part of the coherent light is transmitted to the receiver, where it is injected into optical component 303. Optical component 303 may be a laser, for example a semiconductor laser, an optical amplifier or an intensity modulator.

A filter is included to remove the spurious frequencies caused by the phase modulation applied to the coherent light source 20. Polarisation multiplexing can be used to transmit the coherent light and the signal light pulses on the same channel.

Figure 16:
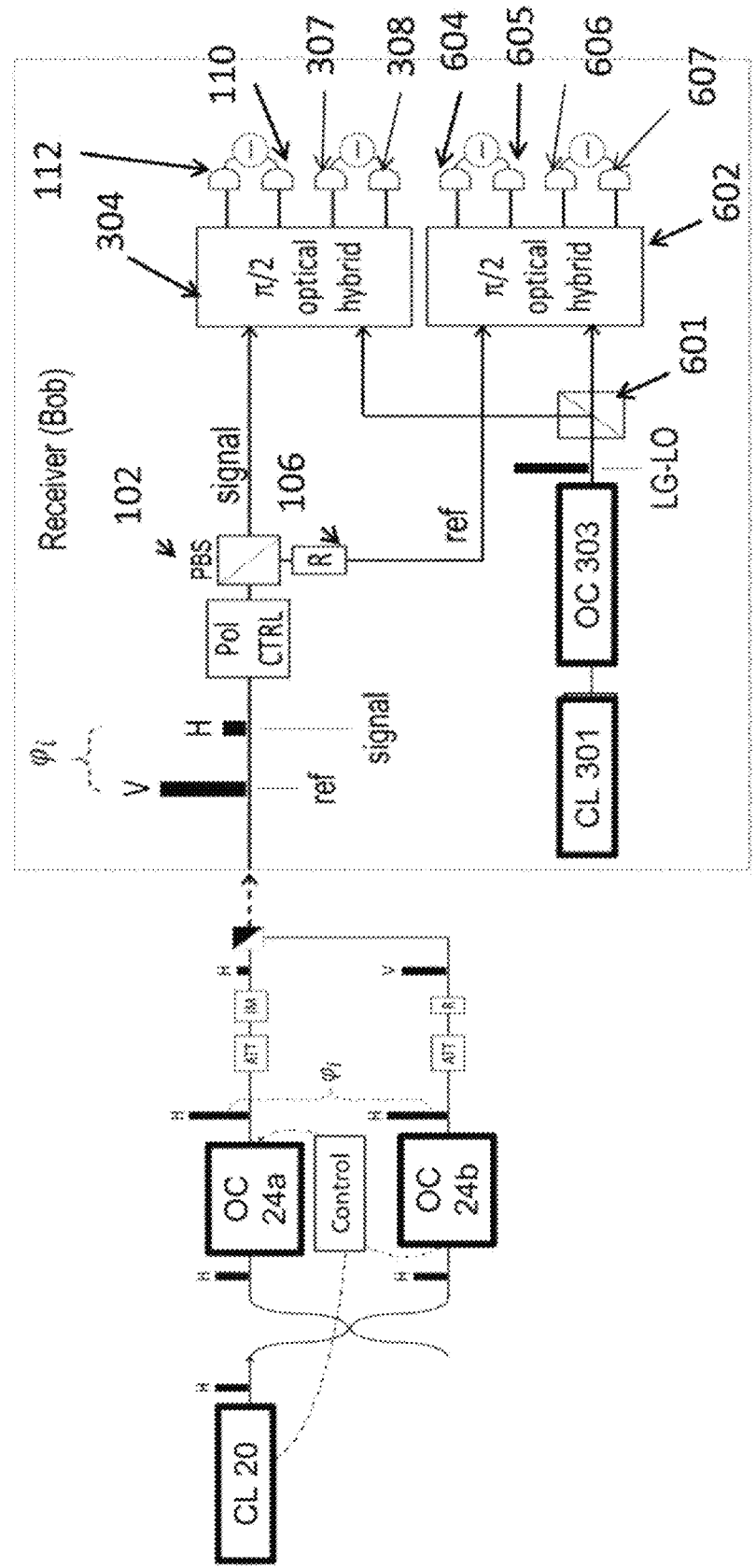
FIG. 16 is a schematic illustration of a continuous variable quantum communication system in accordance with an embodiment.

FIG. 16 is a schematic illustration of a continuous variable quantum communication system in accordance with an embodiment.

The system comprises a transmitter and receiver. In this case, the transmitter is a transmitter such as described in relation to FIG. 9(c). The phase control element and the intensity control element in the transmitter are configured to encode information in a continuum of values of the phase and amplitude of an emitted light pulse. The phase control element and the intensity control element are configured to modulate the phase and the amplitude of an emitted light pulse to produce a coherent state.

The transmitter comprises a control component. The control component is an integrated component comprising the first controller 141, the phase control element 125 and the second controller 140 and a processor. However, these elements may be provided separately.

The transmitter emits pairs of light pulses. One of the light pulses in each pair is a signal light pulse, and one of the pulses is a reference light pulse. Information is encoded in a continuum of values of the phase difference between the light pulses and amplitude of the signal light pulse, enabling a continuous variable QKD protocol to be performed.

A CV-QKD protocol may be implemented in the system as follows.

For each pair of light pulses, the processor generates a first random number X and a second random number P, which are used to calculate an amplitude value $\alpha$ and a phase value $\theta$ as described previously. Alternatively, values of amplitude and phase may be directly generated, as described previously.

The phase control element is configured to apply the perturbation to produce a phase shift corresponding to a phase difference of $\theta$ between the signal light pulse and the reference light pulse, and the intensity control element is configured to apply an amplitude modulation to the signal light pulse corresponding to an amplitude of $\alpha$.

The encoded light pulses are sent to the receiver. The light pulses may be sent via an optical transmission line. The transmitter thus generates coherent double pulses with a phase difference and having orthogonal polarization travelling down the transmission line. A polarisation controller may be included in the receiver as described previously.

The receiver is configured to optically combine the received signal light pulses and locally generated continuous wave local reference light or local reference light pulses, labelled LO in the figure. The local light or local light pulses may be generated using a light source at the receiver. In an embodiment, the local light pulses are generated using a coherent light source 301 and an optical component 303. The coherent light source 301 is optically coupled to the optical component 303. Light from the coherent light source 301 is injected into the optical component 303. The optical component 303 generates light pulses when light from the coherent light source 301 is present in the optical component 303. Alternatively, a single light source may generate the local reference light.

The receiver is configured to optically combine the received reference light pulses and locally generated continuous wave local reference light or local reference light pulses, labelled LO in the figure.

The receiver comprises a first splitting element, configured to direct the signal light pulses to a first optical path and the reference light pulses to a second optical path. The first splitting element may be a polarising beam splitter 102. As the signal light pulse and reference light pulses have orthogonal polarisations, they are separated into different optical paths at the polarising beam splitter 102.

The polarization of the one of the pulses is flipped by a polarisation rotator 106 at one output of the beam splitter 102, such that the polarization of the pulse when exiting the polarising beam splitter 102 is the same as the polarization of the other pulse in the pair.

The receiver further comprises a second splitting element 601, configured to split the local reference light into a first part and a second part. The second splitting element may be a beam splitter.

The receiver comprises a first $\pi/2$ optical hybrid component 304. The received signal light pulses from the transmitter and the first part of the local reference light are optically combined at the first optical hybrid component 304. The received signal light pulses from the transmitter are inputted into a first input of the $\pi/2$ optical hybrid component 304 and the first part of the local reference light is inputted into a second input of the $\pi/2$ optical hybrid component 304.

The $\pi/2$ optical hybrid component 304 is an example of a first combining component.

The receiver comprises a second $\pi/2$ optical hybrid component 602. The received reference light pulses from the transmitter and the second part of the local reference light are optically combined at the second optical hybrid component 602. The received reference light pulses from the transmitter are inputted into a first input of the second $\pi/2$ optical hybrid component 602 and the second part of the local reference light is inputted into a second input of the second π/2 optical hybrid component 602.

The π/2 optical hybrid component 602 is an example of a second combining component.

In general, the first combining component comprises a first beam combiner and a second beam combiner. The first combining component is configured to split the first part of the local reference light into a third part and a fourth part and split the signal light pulses into a first part and a second part, for example at beam splitters. The combining component may comprise a first 50:50 beam splitter and a second 50:50 beam splitter. The first part of the local light is inputted into the first 50:50 beam splitter. A third part of the local light is outputted from a first output and a fourth part of the local light outputted from the second output. The received signal light pulses are inputted into the second 50:50 beam splitter. A first part of the received signal light pulses is outputted from a first output and a second part is outputted from a second output.

A phase shift of π/2 is applied between the second part of the signal light pulses and the fourth part of the local light, for example by a fixed phase element.

The first part of the signal light pulses and the third part of the local reference light is combined on the first beam combiner and the second part of the signal light pulses and the fourth part of the local reference light is combined on the second beam combiner. The first beam combiner may be a third 50:50 beam splitter and the second beam combiner may be a fourth 50:50 beam splitter. The first output of the first beam splitter is optically coupled to a first input of the third beam splitter. The first output of the second beam splitter is optically coupled to the second input of the third beam splitter. The optical path length between the first output of the first beam splitter and the first beam combiner is the same as the optical path length between the first output of the second beam splitter and the first combiner. The second output of the first beam splitter is optically coupled to a first input of the fourth beam splitter. The second output of the second beam splitter is optically coupled to the second input of the fourth beam splitter, via the fixed phase element. The optical path length between the second output of the first beam splitter and the second beam combiner is the same as the optical path length between the second output of the second beam splitter and the second beam combiner, excepting the fixed phase element.

A first light detector 110 and a second light detector 112 are configured to detect the outputs of the first beam combiner. A third light detector 307 and a fourth light detector 308 are configured to detect the outputs of the second beam combiner.

The second combining component comprises a third beam combiner and a fourth beam combiner.

The second combining component is configured to split the second part of the local reference light into a fifth part and a sixth part and split the reference light pulses into a first part and a second part, for example using beam splitters. The combining component may comprise a first 50:50 beam splitter and a second 50:50 beam splitter. The second part of the local light is inputted into the first 50:50 beam splitter. A fifth part of the local light is outputted from a first output and a sixth part of the local light outputted from the second output. The received reference light pulses are inputted into the second 50:50 beam splitter. A first part of the received reference light pulses is outputted from a first output and a second part is outputted from a second output.

A phase shift of π/2 is applied between the second part of the reference light pulses and the sixth part of the local light, for example by a fixed phase element.

The first part of the reference light pulses and the fifth part of the local reference light is combined on the first beam combiner and the second part of the reference light pulses and the sixth part of the local reference light are combined on the second beam combiner. The first beam combiner may be a third 50:50 beam splitter and the second beam combiner may be a fourth 50:50 beam splitter. The first output of the first beam splitter is optically coupled to a first input of the third beam splitter. The first output of the second beam splitter is optically coupled to the second input of the third beam splitter. The optical path length between the first output of the first beam splitter and the first beam combiner is the same as the optical path length between the first output of the second beam splitter and the first combiner. The second output of the first beam splitter is optically coupled to a first input of the fourth beam splitter. The second output of the second beam splitter is optically coupled to the second input of the fourth beam splitter, via the fixed phase element. The optical path length between the second output of the first beam splitter and the second beam combiner is the same as the optical path length between the second output of the second beam splitter and the second beam combiner, excepting the fixed phase element.

A fifth light detector 604 and a sixth light detector 605 are configured to detect the outputs of the third beam combiner. A seventh light detector 606 and an eighth light detector 607 are configured to detect the outputs of the fourth beam combiner.

The difference in the intensity of the light detected in each photon detector depends on the phase and intensity modulation applied at the transmitter, as well as the phase and intensity of the local light.

The receiver further comprises a processor (not shown) configured to receive information relating to the outputs of the first beam combiner, the second beam combiner, the third beam combiner and the fourth beam combiner and determine the phase of the local reference light relative to the reference light pulses and the phase of the local reference light relative to the signal light pulses. From this information, the components of the signal light pulses both in-phase and in-quadrature with the reference light pulses received from the transmitter can be determined.

In an embodiment, the optical hybrid components may be replaced with two receivers such as shown in FIG. 15(*b*).

Figure 17:
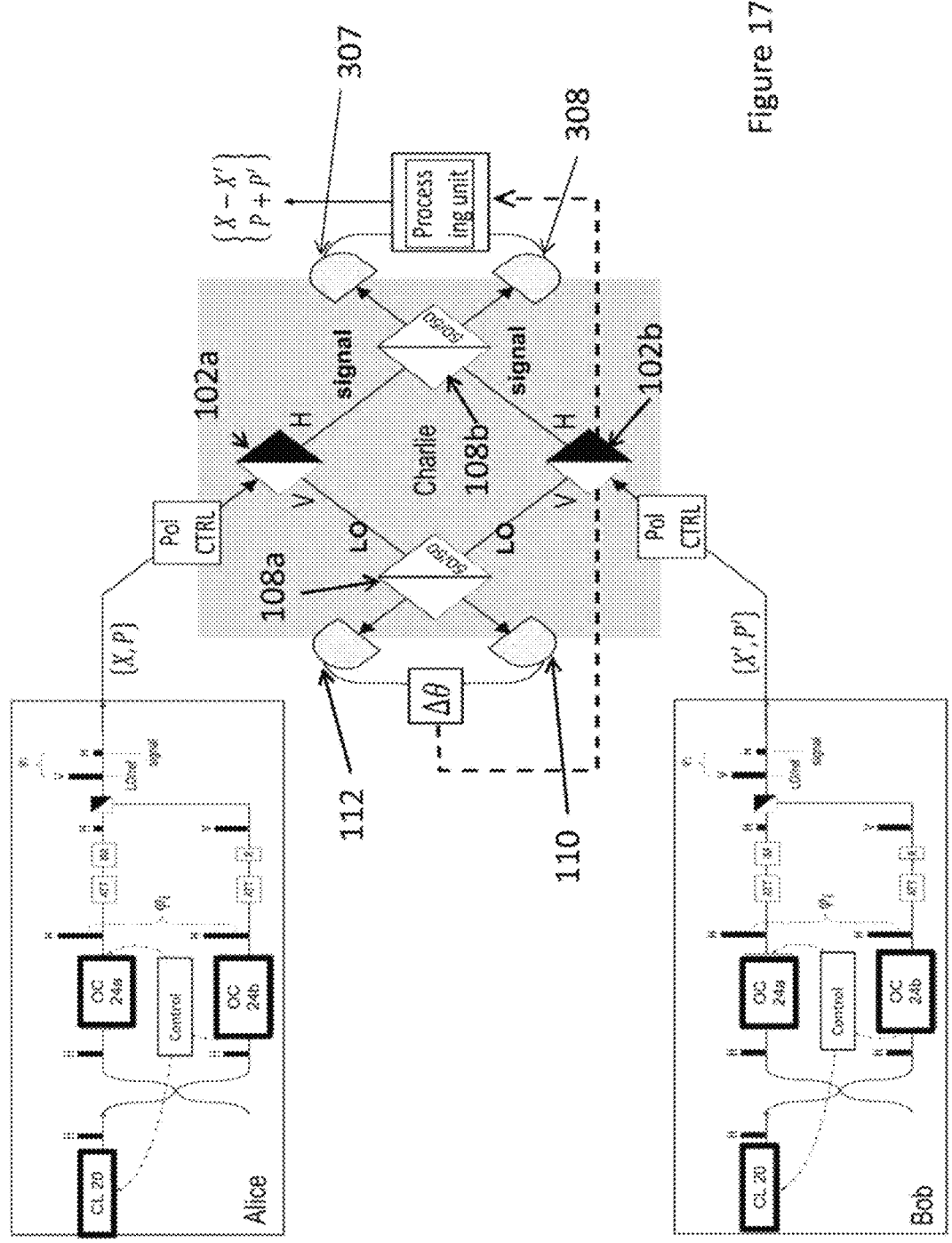
FIG. 17 is a schematic illustration of a continuous variable quantum communication system in accordance with an embodiment.

FIG. 17 is a schematic illustration of a continuous variable quantum communication system in accordance with an embodiment. A Measurement Device Independent-QKD protocol may be performed with this system.

The system comprises a first transmitter (Alice) and a second transmitter (Bob). Alice and Bob set the amplitude and phase of their emitted light pulses as specified by their respective two random numbers {X,P} and {X',P'}, as described previously. Alice and Bob prepare their states in a Gaussian-modulated coherent state, as described previously. Alternatively, values of amplitude and phase may be directly generated, as described previously.

The transmitter at Alice may be a transmitter as in FIG. 9(*c*), and the transmitter at Bob may be a transmitter as in FIG. 9(*c*) for example.

The emitted light pulses are sent to a third device (Charlie). The third device comprises a first polarising beam splitter 102*a*, which directs the signal light pulses from Alice down a first optical path and the reference light pulses from Alice, which have orthogonal polarisation to the signal light pulses, down a second optical path. The third device further comprises a second polarising beam splitter 102b, which directs the signal light pulses from Bob down a third optical path and the reference light pulses from Bob, which have orthogonal polarisation to the signal light pulses, down a fourth optical path. Polarisation controllers may be included before the beam splitters to correct any changes in polarisation from the transmission line.

The third device further comprises a third beam splitter 108a and a fourth beam splitter 108b. The reference light pulses from Bob and the reference light pulses from Alice are optically combined at the third beam splitter 108a. The signal light pulses from Bob and the signal light pulses from Alice are optically combined at the fourth beam splitter 108b.

A first light detector 112 and a second light detector 110 detect the outputs from the third beam splitter 108a. This allows the phase difference $\Delta\phi$ between the paths connecting Alice to Charlie and Bob to Charlie to be calculated. This information is sent to the processing unit, or processor.

A third light detector 307 and a fourth light detector 308 detect the outputs from the fourth beam splitter 108b. The output of the detection is also sent to the processing unit.

This, combined with the information $\Delta\phi$ previously received, allows the calculation of the values X–X' and P+P'. The processing unit may be configured to determine the phase difference $\Delta\phi$ between the reference light pulse from the first transmitter and the reference light pulse from the second transmitter from the information relating to the output of the third beam combiner 108a, or may simply receive the phase difference $\Delta\phi$ as an input. From the phase difference $\Delta\phi$ and the received information regarding the output from the fourth beam splitter 108b, the processing unit determines the difference between the component of the signal light pulse from the first transmitter in phase with the reference light pulse from the first transmitter and the component of the signal light pulse from the second transmitter in phase with the reference light pulse from the second transmitter (X–X') and determines the sum of the component of the signal light pulse from the first transmitter in quadrature with the reference light pulse from the first transmitter and the component of the signal light pulse from the second transmitter in quadrature with the reference light pulse from the second transmitter (P+P').

These values are announced by Charlie on a public channel. From this announcement, Alice and Bob know what the other user has encoded. For example, Alice knows X because she encoded it. From the announced value X–X', she can then infer Bob's value X'.

The security is guaranteed because Charlie (or equivalently Eve) only knows X–X' and P+P', but he doesn't know the separate values X, X', P, P', to which the information is associated.

The first beam splitter 102a, second beam splitter 102b, third beam splitter 108a and fourth beam splitter 108b, and connections between them are stabilised against environmental fluctuations so that the phase difference between all the paths is constant in time. This can be achieved for example using a PLC (Planar Lightwave Circuit) design. An additional filter may be included to clean the spectrum.

Coherent detection for CV technology can be performed with room-temperature, compact, high-speed detectors.

Transmitters as described above may be realised with no phase modulators.

In an embodiment, faster phase encoding with better interference visibility is enabled.

Furthermore, direct phase modulation can be realised with a low driving voltage.

In an embodiment, the system runs at a 1 Mb/s key rate using 1 MHz clock.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A transmitter for a continuous variable quantum communication system, the transmitter comprising:
    a coherent light source;
    a first controller, configured to apply a first signal to said coherent light source such that said coherent light source generates coherent light;
    a phase control element, configured to apply perturbations to said first signal, each perturbation producing a phase shift between parts of the generated coherent light;
    a first optical component, configured to produce optical intensity modulation, wherein said coherent light source is configured to supply said generated light to said optical component;
    a second controller, configured to apply a second signal to said optical component such that a light pulse is emitted during a period of time that a first part of the generated light is received, and a light pulse is emitted during a period of time that a second part of the generated light is received; and
    an intensity control element, configured to modulate the amplitude of emitted light pulses;
    wherein the phase control element and the intensity control element are configured to encode information in a continuum of values of the phase and the amplitude of emitted light pulses.

2. The transmitter according to claim 1, wherein the phase control element and the intensity control element are configured to modulate the phase and the amplitude of an emitted light pulse to produce a coherent state.

3. The transmitter according to claim 1, further comprising:
    a processor, configured to:
        generate a first random number and a second random number; and
        calculate a first amplitude from the first random number and the second random number and a first phase from the first random number and the second random number;
    wherein the phase control element is configured to apply a perturbation to produce a phase shift corresponding to the first phase and the intensity control element is configured to apply an amplitude modulation corresponding to the first amplitude.

4. The transmitter according to claim 1, the transmitter further comprising:
    a second optical component configured to produce optical intensity modulation, wherein said coherent light source is configured to supply said generated light to said second optical component; and
    a third controller, configured to apply a third signal to said second optical component such that a light pulse is emitted during a period of time a second part of the generated light is received;
wherein the second controller is configured to apply the second signal to said first optical component such that a light pulse is emitted during a period of time that a first part of the generated light is received.

5. The transmitter according to claim 1, wherein the intensity control element is configured to modulate the amplitude of the first signal, such that the amplitude of the generated coherent light is varied.

6. The transmitter according to claim 1, wherein the intensity control element is configured to modulate the amplitude of the second signal, such that the amplitude of the emitted light pulses is varied.

7. The transmitter according to claim 1, wherein the intensity control element is an intensity modulator.

8. The transmitter according to claim 1, wherein the duration of the emitted light pulses is greater than 10 ns.

9. The transmitter according to claim 3 wherein
the first signal is a periodic signal and the coherent light source generates pulses of coherent light, and wherein the phase control element is configured to apply a perturbation to the first signal once each period, producing a phase shift between a first part of the generated coherent light pulse and a second part of the generated coherent light pulse, and wherein the light pulses emitted during the periods of time that said first part of the generated light pulses is received are reference light pulses and the light pulses emitted during the periods of time that said second part of the generated light pulses is received are signal light pulses.

10. The transmitter according to claim 3, wherein the first controller is configured to apply the first signal to said coherent light source such that said coherent light source generates continuous wave coherent light and wherein the phase control element is configured to apply perturbations such that alternate perturbations cancel previous phase shifts.

11. A continuous variable quantum communication system comprising the transmitter of claim 3 and a receiver, the transmitter configured to send the emitted light pulses to the receiver, the receiver configured to optically combine a signal light pulse and reference light.

12. The transmitter according to claim 9, wherein the second controller is configured to apply the second signal to the first optical component such that a light pulse is emitted during a period of time that a first part of the generated light pulse isreceived and a light pulse is emitted during a period of time that a second part of the generated light pulse is received.

13. The transmitter according to claim 10, wherein a phase difference between the light pulses emitted during the periods of time that the parts of the generated light corresponding to the alternate perturbations are received is substantially zero,wherein these light pulses are the reference light pulses and the light pulses emitted during remaining periods of time are the signal light pulses.

14. The system according to claim 11, wherein the first signal is a periodic signal and the coherent light source generates pulses of coherent light, and wherein the phase control element is configured to apply a perturbation to the first signal once each period, producing a phase shift between a first part of the generated coherent light pulse and a second part of the generated coherent light pulse, and wherein the light pulses emitted during the periods of time that said first part of the generated light pulses is received are reference light pulses and the light pulses emitted during the periods of time that said second part of the generated light pulses is received are signal light pulses, wherein the receiver comprises:
a delay element, configured to cancel a delay between the signal and reference light pulses; and
a modulation element, configured to select between measurement of an in-phase component and an in-quadrature component.

15. The system according to claim 11, wherein the first controller is configured to apply the first signal to said coherent light source such that said coherent light source generates continuous wave coherent light and wherein the phase control element is configured to apply perturbations such that alternate perturbations cancel previous phase shifts, wherein a phase difference between the light pulses emitted during the periods of time that the parts of the generated light corresponding to the alternate perturbations are received is substantially zero, wherein these light pulses are the reference light pulses and the light pulses emitted during remaining periods of time are the signal light pulses, wherein the receiver comprises:
a light source, configured to generate local reference light;
a combining component, comprising a first beam combiner and a second beam combiner, the combining component configured to:
split the local reference light into a first part and a second part and split the received light pulses into a first part and a second part;
apply a first phase shift between the second part of the received light pulses and the second part of the local reference light;
combine the first part of the received light pulses and the first part of the local reference light on the first beam combiner; and
combine the second part of the received light pulses and the second part of the local reference light on the second beam combiner;
a first light detector and a second light detector, configured to detect outputs of the first beam combiner;
a third light detector and a fourth light detector, configured to detect outputs of the second beam combiner; and
a processor, configured to:
receive information relating to the outputs of the first beam combiner and the second beam combiner;
determine the phase of the local reference light relative to the received reference light pulse; and
determine a component of the signal light pulse in quadrature with the received reference light pulse and a component of the signal light pulse in quadrature with the received reference light pulse.

16. The system according to claim 11, wherein the first signal is a periodic signal and the coherent light source generates pulses of coherent light, and wherein the phase control element is configured to apply a perturbation to the first signal once each period, producing a phase shift between a first part of the generated coherent light pulse and a second part of the generated coherent light pulse, and wherein the light pulses emitted during the periods of time that said first part of the generated light pulses is received are reference light pulses and the light pulses emitted during the periods of time that said second part of the generated light pulses is received are signal light pulses, wherein the receiver comprises:
a first splitting element, configured to direct the signal light pulses to a first optical path and the reference light pulses to a second optical path;

a light source, configured to generate local reference light;

a second splitting element, configured to split the local reference light into a first part and a second part;

a first combining component, comprising a first beam combiner and a second beam combiner, the first combining component configured to:
- split the first part of the local reference light into a third part and a fourth part and split the signal light pulses into a first part and a second part;
- apply a first phase shift between the second part of the signal light pulses and the fourth part of the local reference light;
- combine the first part of the signal light pulses and the third part of the local reference light on the first beam combiner; and
- combine the second part of the signal light pulses and the fourth part of the local reference light on the second beam combiner;

a first light detector and a second light detector, configured to detect outputs of the first beam combiner;

a third light detector and a fourth light detector, configured to detect outputs of the second beam combiner;

a second combining component, comprising a third beam combiner and a fourth beam combiner, the second combining component configured to:
- split the second part of the local reference light into a fifth part and a sixth part and split the received reference light pulses into a first part and a second part;
- apply a first phase shift between the second part of the received reference light pulses and the sixth part of the local reference light;
- combine the first part of the received reference light pulses and the fifth part of the local reference light on the first beam combiner; and
- combine the second part of the received reference light pulses and the sixth part of the local reference light on the second beam combiner;

a fifth light detector and a sixth light detector, configured to detect outputs of the third beam combiner;

a seventh light detector and a eighth light detector, configured to detect outputs of the fourth beam combiner; and a processor, configured to:
- receive information relating to the outputs of the first beam combiner, the second beam combiner, the third beam combiner and the fourth beam combiner;
- determine the phase of the local reference light relative to the received reference light pulse;
- determine the phase of the local reference light relative to the signal light pulse; and
- determine a component of the signal light pulse in quadrature with the received reference light pulse and a component of the signal light pulse in quadrature with the received reference light pulse.

17. A quantum communication method, comprising:

applying perturbations to a first signal, applying the first signal to a coherent light source such that said coherent light source generates coherent light, each perturbation producing a phase shift between parts of the generated coherent light;

supplying the coherent light to an optical component configured to produce optical intensity modulation;

applying a second signal to said optical component such that a light pulse is emitted during a period of time that a first part of the generated light is received, and a light pulse is emitted during a period of time that a second part of the generated light is received;

applying an amplitude modulation, wherein information is encoded in a continuum of values of the phase and amplitude of an emitted signal light pulse;

sending emitted signal light pulses to a receiving unit; and optically combining the signal light pulses and reference light at the receiving unit to decode the information.

* * * * *